(12) United States Patent
Kajita et al.

(10) Patent No.: US 7,746,495 B2
(45) Date of Patent: Jun. 29, 2010

(54) IMAGE READING DEVICE AND IMAGE PROCESSING METHOD UTILIZING THE SAME

(75) Inventors: Koji Kajita, Yokohama (JP); Toshihiro Kadowaki, Kawasaki (JP); Seishi Ejiri, Kawasaki (JP); Soichi Yamamuro, Tokyo (JP); Masaya Kondo, Yokohama (JP); Takekazu Kumagai, Yokohama (JP); Takeshi Tsukamoto, Kawasaki (JP); Masaru Saruwatari, Kawasaki (JP); Masaki Toyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 209 days.

(21) Appl. No.: 11/548,228

(22) Filed: Oct. 10, 2006

(65) Prior Publication Data
US 2007/0097425 A1 May 3, 2007

Related U.S. Application Data

(62) Division of application No. 10/361,903, filed on Feb. 11, 2003, now Pat. No. 7,136,182, which is a division of application No. 09/502,215, filed on Feb. 11, 2000, now Pat. No. 6,590,673, which is a division of application No. 08/690,393, filed on Jul. 26, 1996, now Pat. No. 6,069,706.

(30) Foreign Application Priority Data

| Jul. 31, 1995 | (JP) | ................................... | 7-194999 |
| Aug. 8, 1995 | (JP) | ................................... | 7-221162 |
| Jan. 25, 1996 | (JP) | ................................... | 8-010933 |

(51) Int. Cl.
*G06F 15/00* (2006.01)
*H04N 1/32* (2006.01)
*H04N 1/00* (2006.01)

(52) U.S. Cl. .................. 358/1.15; 358/442; 358/402
(58) Field of Classification Search ................ 358/1.15, 358/1.1, 1.2, 1.16, 442, 402, 444, 468; 379/100.01, 379/100.12; 345/156, 160, 163, 168
See application file for complete search history.

(56) References Cited

U.S. PATENT DOCUMENTS

| 4,007,362 A | 2/1977 | Sindermann | ................. 235/151 |
| 4,760,463 A | 7/1988 | Nonoyama et al. | ........... 358/280 |
| 4,839,829 A * | 6/1989 | Freedman | .................... 715/751 |

(Continued)

FOREIGN PATENT DOCUMENTS

JP 04-051653 2/1992

(Continued)

*Primary Examiner*—Madeleine A Nguyen
(74) *Attorney, Agent, or Firm*—Fitzpatrick, Cella, Harper & Scinto

(57) ABSTRACT

An image processing apparatus provided with a reader for reading an original image, a connection unit for connection with a network to which plural computers are connected, and a transfer unit for transferring the image data, read by the reader, to a computer through the connection unit, the apparatus comprising a specifying unit for specifying a desired one among the computers connected through the connection unit, and a designation unit for designating image reading by the reader, wherein the transfer unit is adapted to transfer the image data, read by the reader in response to the designation by the designation unit, to a computer specified by the specifying unit.

9 Claims, 37 Drawing Sheets

U.S. PATENT DOCUMENTS

| | | | |
|---|---|---|---|
| 4,995,873 A | 2/1991 | Knight | 604/391 |
| 5,153,737 A | 10/1992 | Kobayashi | 358/296 |
| 5,168,444 A | 12/1992 | Cukor et al. | 705/1 |
| 5,220,674 A * | 6/1993 | Morgan et al. | 709/223 |
| 5,227,893 A | 7/1993 | Ett | 358/400 |
| 5,249,060 A | 9/1993 | Ishikawa et al. | 358/296 |
| 5,305,056 A * | 4/1994 | Salgado et al. | 399/11 |
| 5,307,462 A | 4/1994 | Hastings | 395/275 |
| 5,384,835 A | 1/1995 | Wheeler et al. | 379/95 |
| 5,461,488 A | 10/1995 | Witek | 358/402 |
| 5,467,434 A * | 11/1995 | Hower et al. | 358/1.15 |
| 5,530,907 A | 6/1996 | Pavey et al. | 710/69 |
| 5,548,722 A * | 8/1996 | Jalalian et al. | 709/220 |
| 5,552,901 A | 9/1996 | Kikuchi et al. | 358/468 |
| 5,579,126 A | 11/1996 | Otsuka | 358/403 |
| 5,579,447 A * | 11/1996 | Salgado | 358/1.9 |
| 5,608,544 A | 3/1997 | Yamanishi | 358/453 |
| 5,642,288 A | 6/1997 | Leung et al. | 700/223 |
| 5,666,489 A * | 9/1997 | Fite et al. | 709/220 |
| 5,682,549 A | 10/1997 | Tanaka et al. | 710/8 |
| 5,720,015 A * | 2/1998 | Martin et al. | 358/1.15 |
| 5,764,866 A | 6/1998 | Maniwa | 395/114 |
| 5,790,270 A | 8/1998 | Sugiura et al. | 358/448 |
| 5,825,505 A * | 10/1998 | Toyoda et al. | 358/400 |
| 5,838,459 A | 11/1998 | Hashimoto | 358/402 |
| 5,841,550 A | 11/1998 | Johnson | 358/402 |
| 5,901,228 A | 5/1999 | Crawford | 705/34 |
| 5,907,835 A | 5/1999 | Yokomizo et al. | 707/1 |
| 5,935,217 A | 8/1999 | Sakai et al. | 709/249 |
| 5,987,225 A * | 11/1999 | Okano | 358/1.13 |
| 5,999,708 A | 12/1999 | Kajita | 395/114 |
| 6,134,017 A | 10/2000 | Schlank et al. | 358/1.15 |
| 6,301,016 B1 | 10/2001 | Matsueda et al. | 358/407 |
| 6,639,693 B1 | 10/2003 | Ejiri et al. | 358/434 |
| 7,057,753 B1 | 6/2006 | Kajita et al. | 358/1.15 |

FOREIGN PATENT DOCUMENTS

| | | |
|---|---|---|
| JP | 04-156162 | 5/1992 |
| JP | 04-287563 | 10/1992 |
| JP | 5-014577 | 1/1993 |
| JP | 5-014580 | 1/1993 |
| JP | 05-122331 | 5/1993 |
| JP | 05-183674 | 7/1993 |
| JP | 5-252327 | 9/1993 |
| JP | 05-300303 | 11/1993 |
| JP | 05-316276 | 11/1993 |
| JP | 05-347682 | 12/1993 |
| JP | 6-078074 | 3/1994 |
| JP | 06-119338 | 4/1994 |
| JP | 6-152892 | 5/1994 |
| JP | 6-252921 | 9/1994 |
| JP | 06-261164 | 9/1994 |
| JP | 06/266636 | 9/1994 |
| JP | 07-038701 | 2/1995 |
| JP | 7-073082 | 3/1995 |
| JP | 7-095334 | 4/1995 |
| JP | 7-121326 | 5/1995 |
| JP | 7-123224 | 5/1995 |
| JP | 07-147615 | 6/1995 |
| JP | 7-162629 | 6/1995 |
| JP | 7-221960 | 8/1995 |
| JP | 7-321980 | 12/1995 |

* cited by examiner

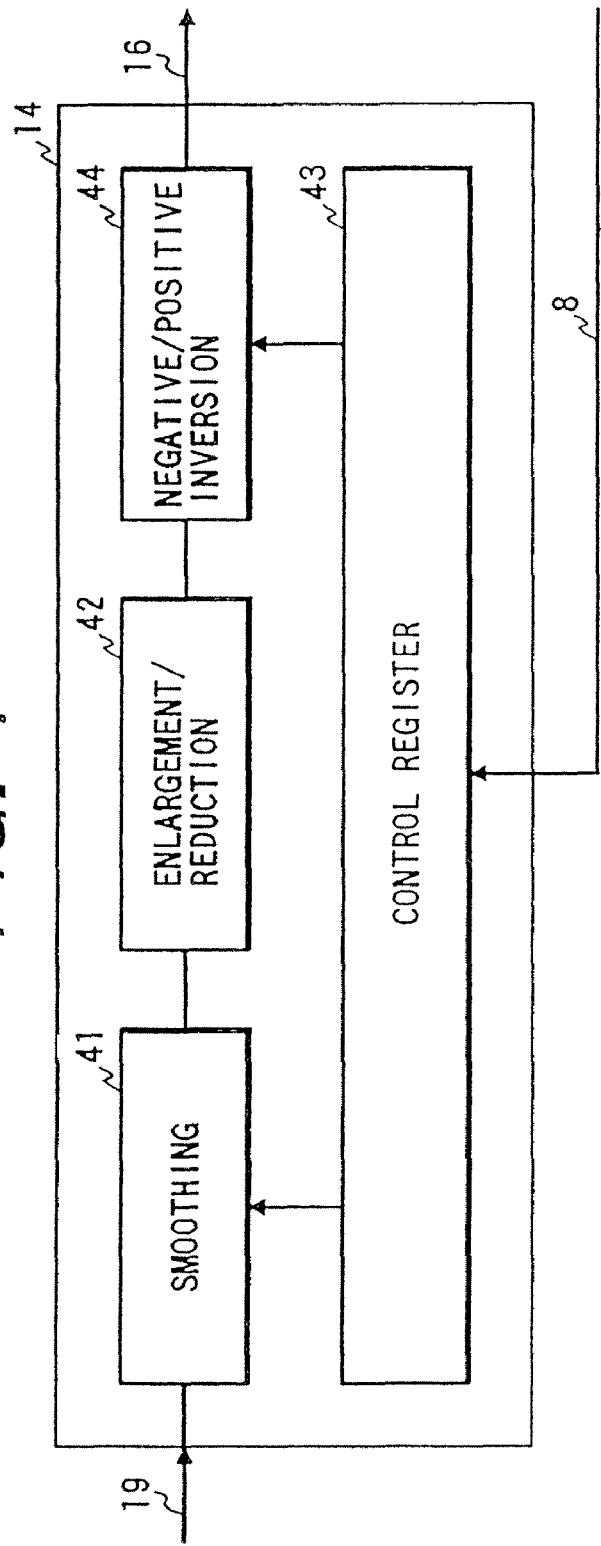

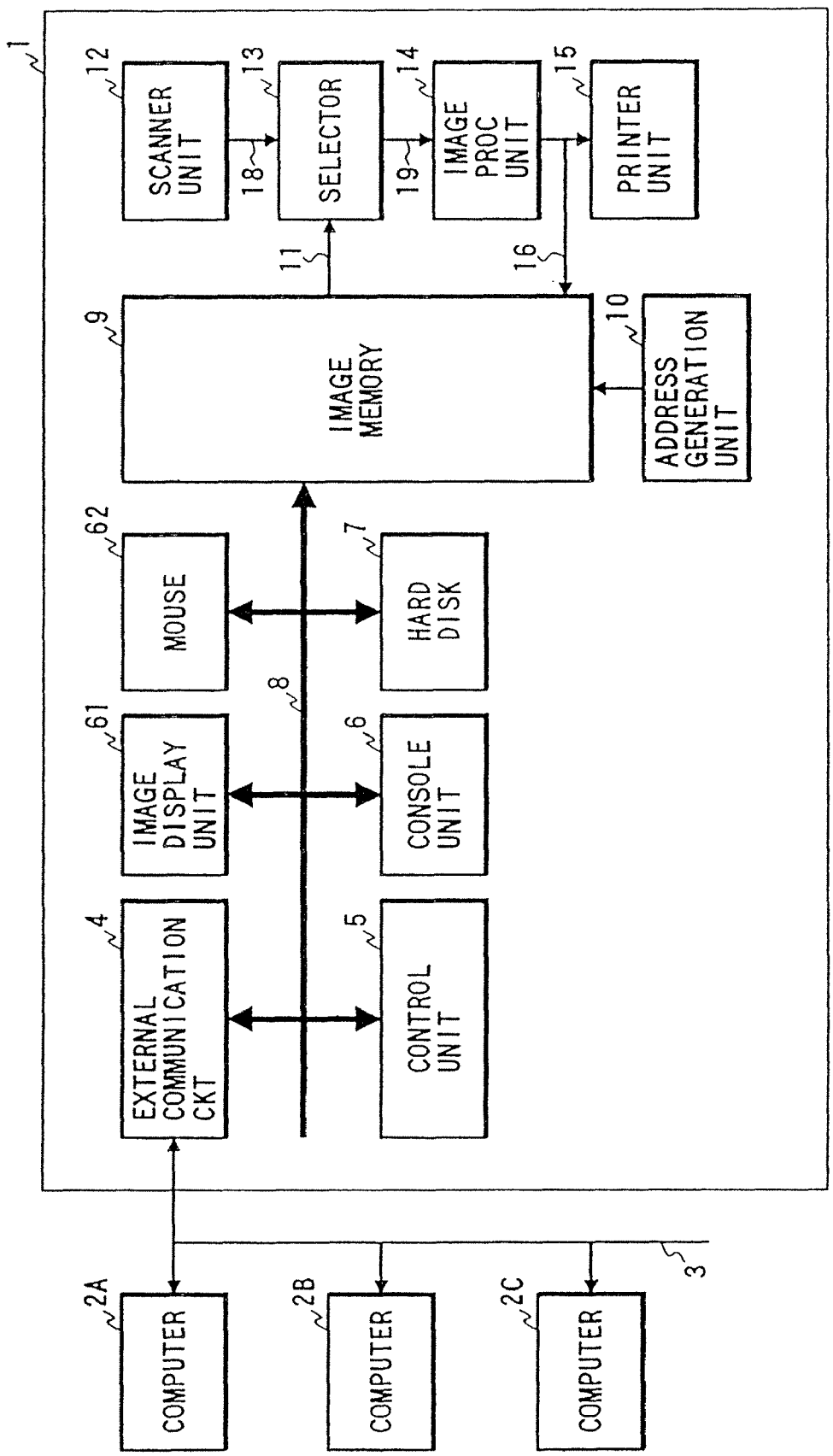

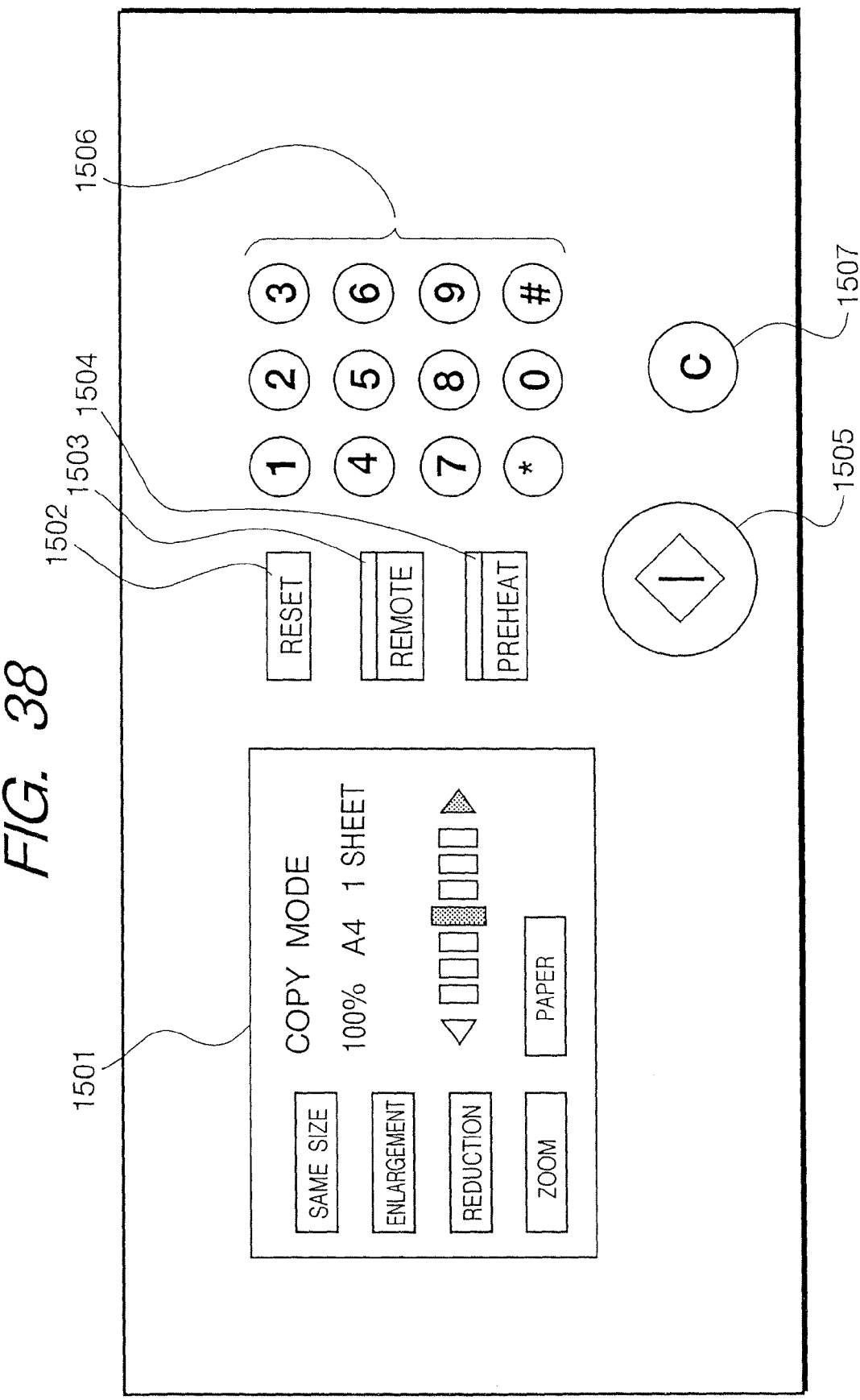

IMAGE READING DEVICE AND IMAGE PROCESSING METHOD UTILIZING THE SAME

This application is a division of application Ser. No. 10/361,903 filed Feb. 11, 2003, which is a division of application Ser. No. 09/502,215 filed Feb. 11, 2000, which is a division of application Ser. No. 08/690,393 filed Jul. 26, 1996.

BACKGROUND OF THE INVENTION

1. Field of the Invention

The present invention relates to an image reading device for reading an image and sending image data to an externally connected host computer or the like, and an image processing method utilizing such device.

2. Related Background Art

The conventional image reading device (image scanner) for sending the read image to the computer is usually connected to a single computer and operates according to instructions therefrom. Also the image reading device itself is positioned close to the computer. This is because the SCSI (small computer system interface) usually employed for connecting the computer and the image reading device cannot utilize a very long cable, and also because cumbersome operations are required, such as visiting the both plural times, if they are physically distant, as the original document has to be set on the image reading device while the operation thereof has to be made on the computer.

Such conventional configuration is extremely inconvenient in case plural users wish to use the computer connected to the image reading device. The image reading cannot be executed if the computer is used for another job, and the computer cannot be used for other jobs if the priority is given to the image reading. As a result, the computer becomes inevitably assigned exclusively to the image reading device, and it is therefore difficult for the plural users to simultaneously use the computer connected to such image reading device. Also additional works are required for transferring the image, taken into such computer, to other computers belonging to such users.

It is also conceivable to connect the image reading device and the computer by means of a network such as Ethernet, and such configuration allows to effect the image reading operation by the computer connected to the network or another available computer. On the other hand, the significantly large physical distance between the two, resulting from such network connection, results in another inconvenience. As an example, in case of using an image reading device, located on the fifth floor of a building, from a computer located on the second floor, it is quite difficult to smoothly and promptly effect the setting of the original document on the image reading device and the operation on the computer. More specifically there are required cumbersome operations of at first setting the original on the image reading device on the fifth floor, then operating the computer on the second floor, and returning to the fifth floor for fetching the original after image reading.

Such drawback becomes more serious in case the image reading device is realized as an additional function of a copying apparatus. For example, in case such device is frequently used for local document copying in the copying apparatus, if the original is left unremoved for a long time, there may be hindered the user of the apparatus for copying during such time or the original may be undesirably removed by another person utilizing the copying apparatus.

In this manner, the conventional image reading device, not designed in consideration of the operation characteristics in case of effecting the image reading operation and the image data output operation etc. respectively in physically distant locations, requires cumbersome operations when the image reading device is connected with the computer through the network.

Also the functions of the image reading device cannot be fully exploited by the external computer or by the image reading device itself, since the convenience of use of other additional functions such as the copying function has not been considered.

SUMMARY OF THE INVENTION

An object of the present invention is to provide an image reading device not associated with the above-mentioned drawbacks.

Another object of the present invention is to provide an image reading device capable of transferring read image data to a desired computer, by an instruction made on the image reading device.

Still another object of the present invention is to provide an image reading device capable, in case transferring the read image data to an external computer, of preventing prolonged occupation thereof.

Still another object of the present invention is to provide an image reading device with improved operation characteristics.

Still another object of the present invention is to provide an image reading device enabling effective utilization of the functions thereof.

Still other objects of the present invention, and the features thereof, will become fully apparent from the following detailed description, which is to be taken in conjunction with the attached drawings.

BRIEF DESCRIPTION OF THE DRAWINGS

FIG. 7 is a detailed block diagram of an image process unit 14 in the first, second and third embodiments;

FIG. 8 is a view showing packet communication with a computer in the first, second and third embodiments;

FIG. 9 is a block diagram of a copying apparatus in the second embodiment of the present invention;

FIG. 38 is an external view of an operation unit of the copying apparatus 300 of the fifth embodiment.

DESCRIPTION OF THE PREFERRED EMBODIMENTS

Now the present invention will be clarified in detail by preferred embodiments thereof shown in the attached drawings.

First Embodiment

At first there will be explained a first embodiment of the present invention.

Figure 2:
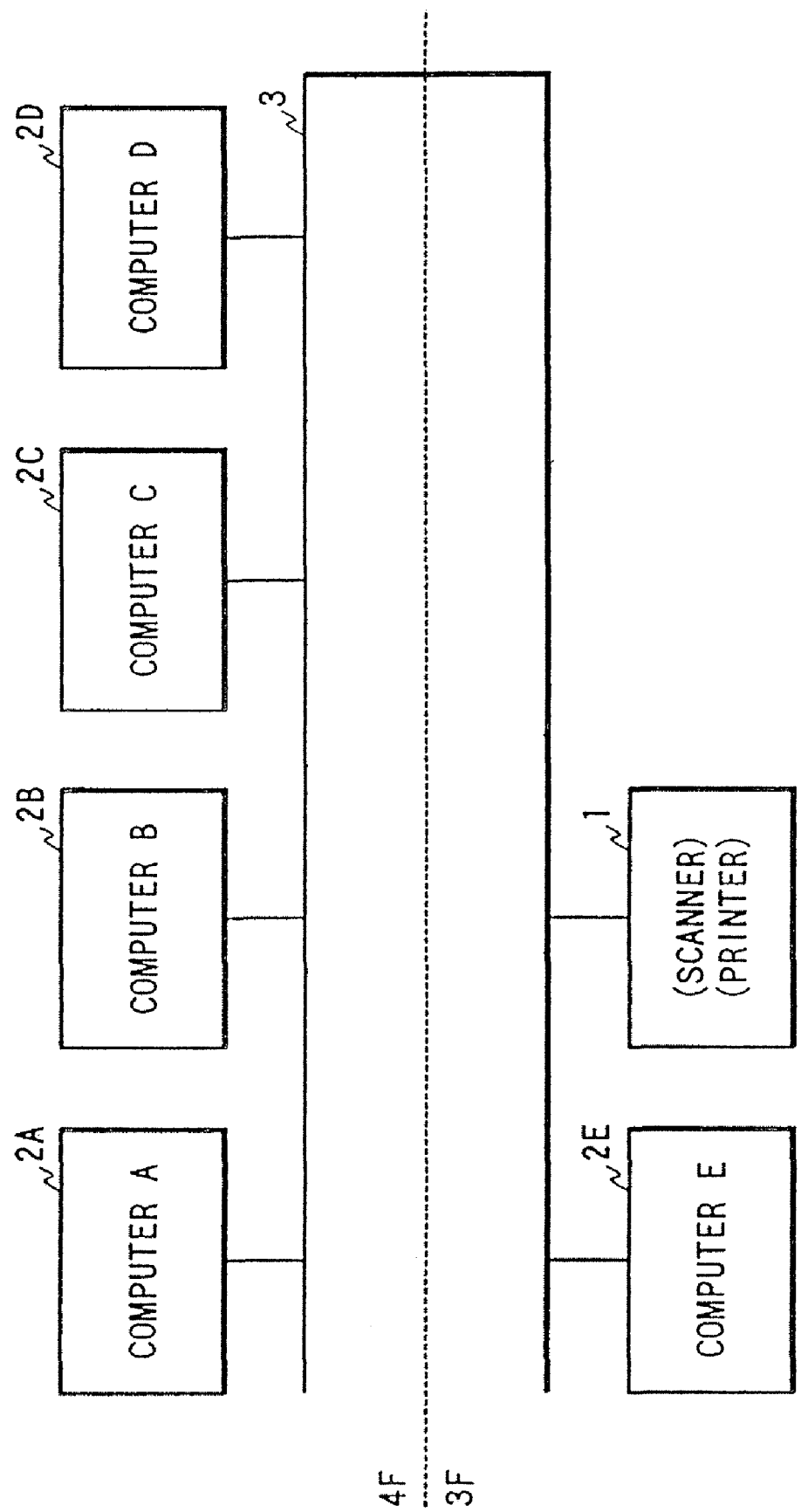
FIG. 2 is a view showing a network connection in the above-mentioned embodiment.

FIG. 2 is a view showing the entire configuration of an image reading system constituting a first embodiment of the present invention. A copying apparatus 1 is a composite machine provided, in addition to the known function of reading and printing the original image, with a remote scanner function of transmitting the read image to the exterior and a printer function of printing the image received from the exterior. The copying apparatus 1 is connected with other computers with a network 3. In the present embodiment, the network 3 is composed of an Ethernet. However, there may be employed other networks as long as plural computers can be connected by such networks. In addition to the copying apparatus 1, plural computers 2A to 2E are connected to the network 3. Such network 3 is a local area network used for mutually connecting computers on a floor or in a building, for example the computers on the fourth floor of a building, shown in the upper half of FIG. 2 and those on the third floor of this building, shown in the lower half.

In such network connection, each equipment on the network has an ID number or a system name, by which the equipment can be distinguished from others. In the present embodiment, for the purpose of simplicity of explanation, each equipment is identified by a system name. For example the computer 2A has a system name A, and the computer 2B has a system name B.

In case the copying apparatus 1 is used as a local copying machine, the operator brings the original to the copying apparatus 1, then executes the copying operation thereon and returns with the original and the obtained copy. In case the copying apparatus 1 is used as a remote printer, the operator sends the print data to the copying apparatus 1 from his own computer through the network 3, and visits the copying apparatus 1 to take the obtained print. In case the copying apparatus 1 is used as a remote scanner, the operator brings the original to the copying apparatus 1, then reads and sends the original image to the computer of the operator by means of the operation unit of the copying apparatus 1, then returns with the original and utilizes the image data on his computer.

Figure 3:
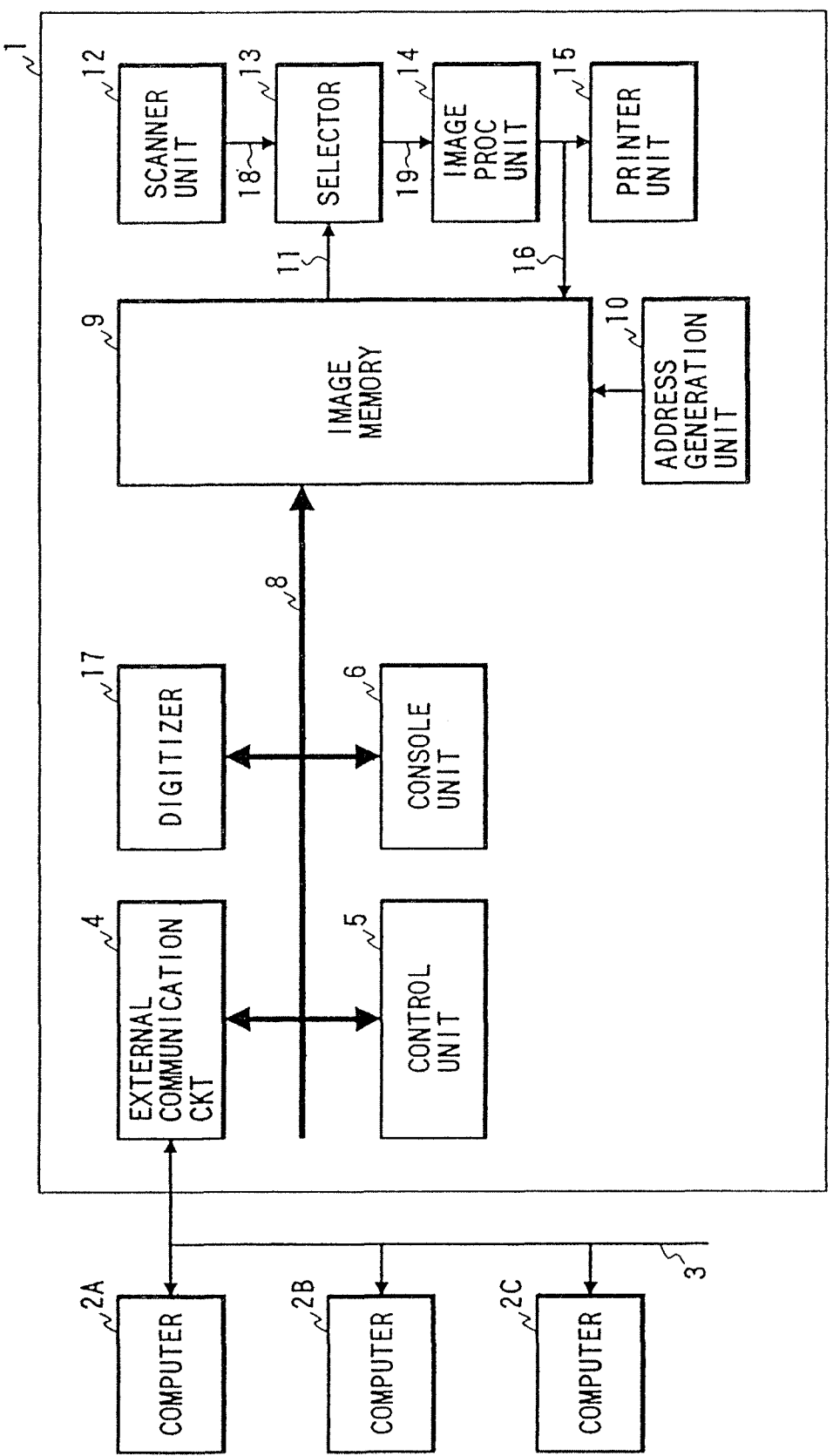
FIG. 3 is a block diagram of the copying apparatus of the first embodiment.

FIG. 3 is a block diagram of the copying apparatus 1 in the first embodiment of the present invention. In case the copying apparatus 1 is used as a local copying machine, the original placed on an unrepresented original table is scanned with a scanner unit 12 to obtain electrical signals, which are transmitted through a selector 13, subjected to various digital image processes in an image process unit 14 and subjected to image formation in a printer unit 15.

In case the copying apparatus 1 is used as a printer, image data supplied for example from the computer 2A are transmitted through an external communication circuit 4 and a CPU bus 8 and are developed into a raster image in an image memory 9, under the control of a control unit 5. Then the printer unit 15 is activated, and the image data read from the image memory 9 are supplied through the selector 13 and the image process unit 14 to the printer unit 15 for image formation.

In case the copying apparatus 1 is used as a remote scanner, the original placed on the unrepresented original table is scanned with the scanner unit 12 to obtain electrical signals, which are transmitted through the selector 13, and subjected to various digital image processes in the image process unit 14, and thus processed image data 16 are stored as a raster image in the image memory 9. Then the image data, read from the image memory 9, are supplied through the CPU 8 and the external communication circuit 4 and transmitted for example to the computer 2A under the control of the control unit 5.

An address generation unit 10 generates, based on unrepresented image synchronization signals, addresses for the image memory 9 for reading of the image data 11 at the printing operation and for writing the image data 16 at the reading operation.

An operation unit 6 is used by the operator for various operation as will be explained later. A digitizer 17 is provided for designating an area on the original, as will be explained later.

Figure 4:
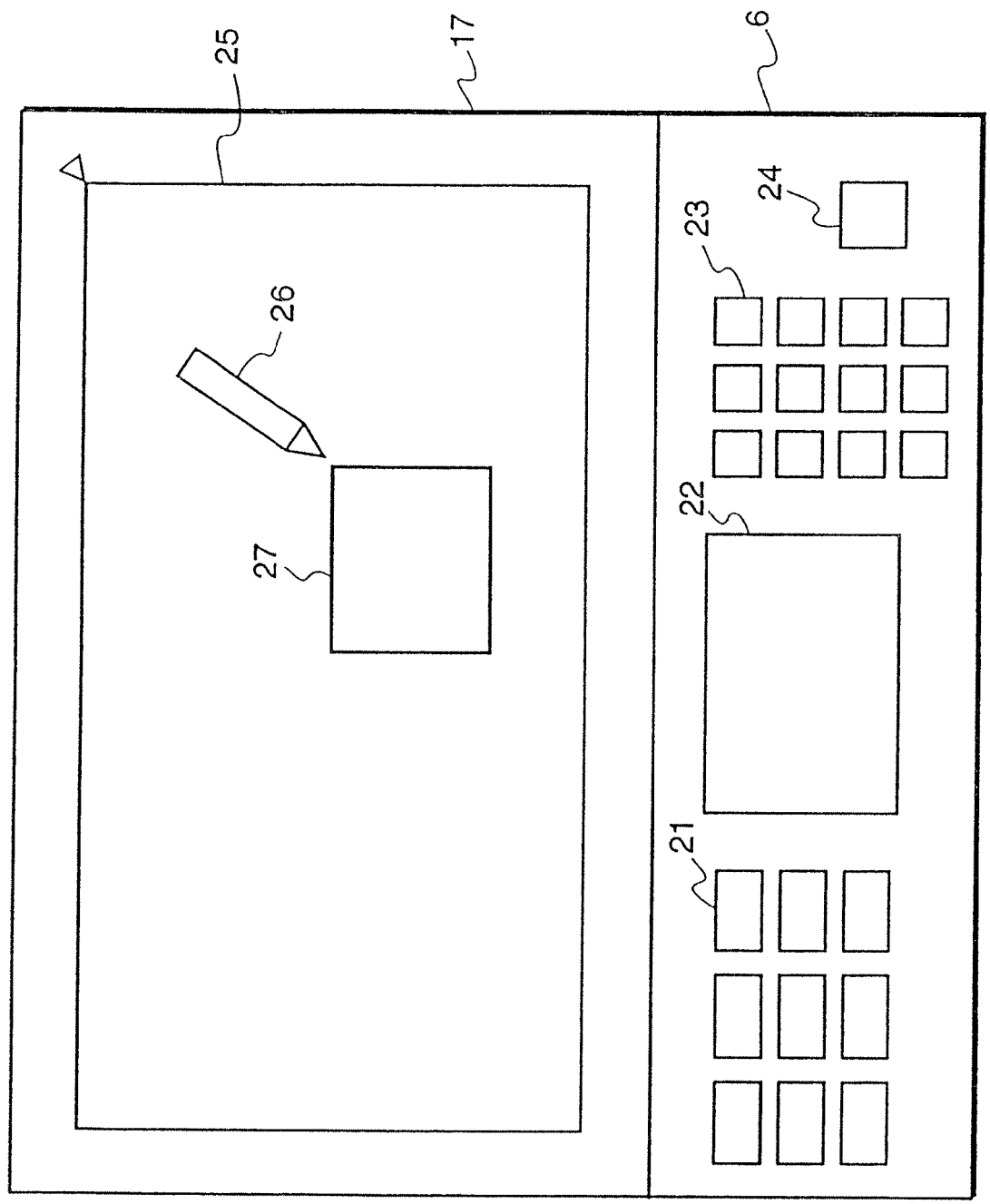
FIG. 4 is an external view of an operation unit and a digitizer in first, second and third embodiments.

FIG. 4 is an external view of the operation unit 6 and the digitizer 17 of the image reading apparatus of the present embodiment. This drawing also represents a plan view of the scanner unit of the copying apparatus 1, with an original pressure plate in the closed state. The operation unit 6 is provided in front, and the digitizer 17 is provided on the original pressure plate. The operation unit 6 is provided with a large-sized liquid crystal display unit 22, numeral keys 23, a copy start key 24, and function keys 21 including a scan key and an area designation key. The liquid crystal display unit 22, capable of displaying arbitrary characters, displays various messages for achieving interactive operations.

The digitizer 17, often utilized in the digital copying machines, is used for designating an area. For the area designation, an original is placed with its image-bearing face upwards on an original placing area 25, with the upper right corner of the original impinging on a reference position, and two diagonal points of a desired rectangular area 27 are designated with a pen 26. Inside the original placing area 25 there is provided a circuit (not shown) for detecting the position of the designating pen, and the information of the designated area can be obtained from the detected coordinates. FIG. 4 shows a closed state of the original pressure plate. In the actual original reading operation, this pressure plate is opened, and the original is placed with its face downwards, and with its upper left corner impinging on a reference position.

Figure 5:
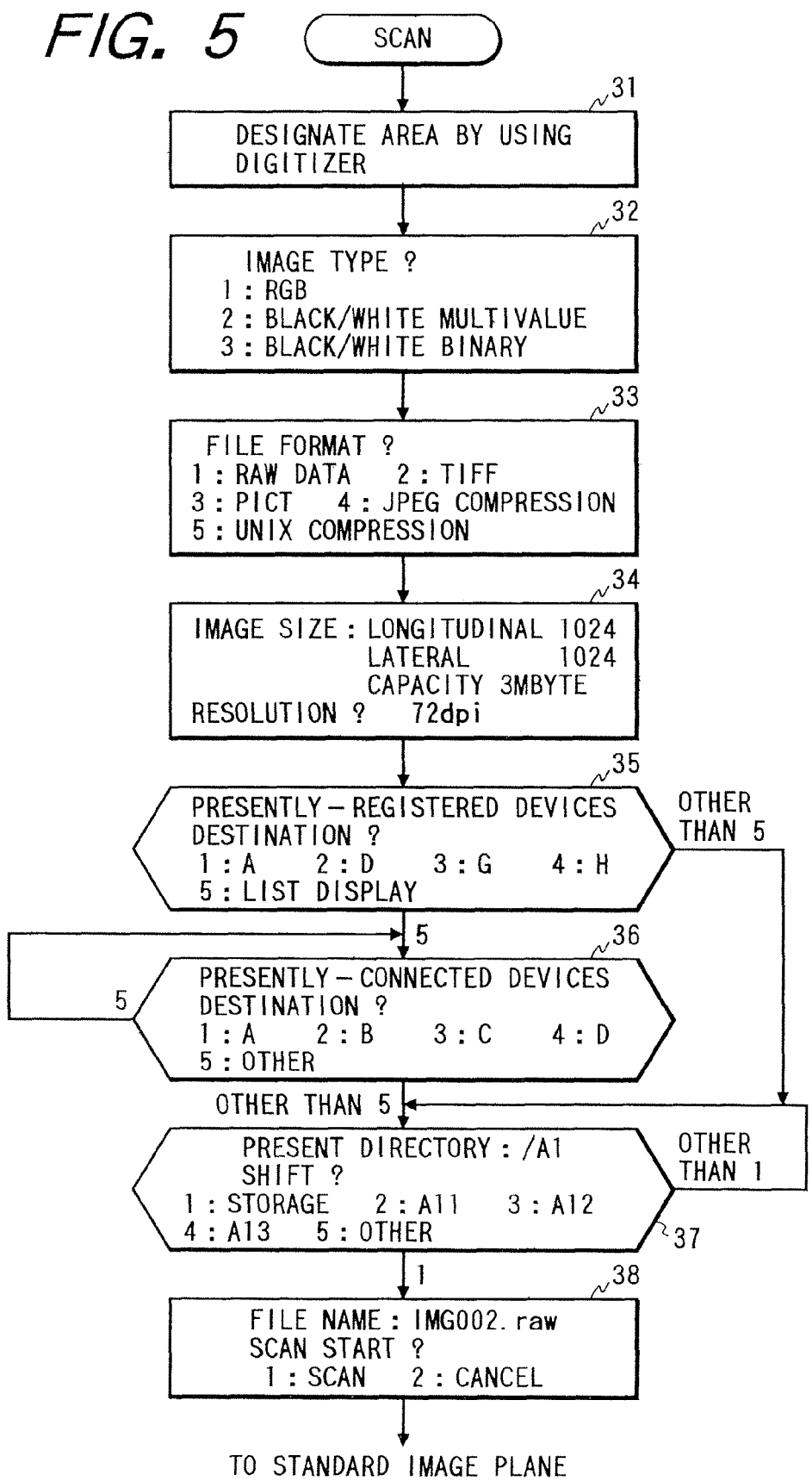
FIG. 5 is a view showing the shift of display on a display unit 22 in a reading operation in the first, second and third embodiments of the present invention.

FIG. 5 shows the messages displayed according to the process on the liquid crystal display unit 22 of the operation unit 6, when the copying apparatus 1 is used as a remote scanner. At first, when a scan key is depressed among the function keys 21 of the operation unit 6, there is displayed an image frame 31, requesting the designation of an area to be read on the original with the digitizer 17. Though not illustrated in FIG. 5, it is also possible to read the entire area of the original table or to read fixed size such as A4 or A3, without relying on the digitizer 17.

Then an image frame 32 requests the designation of an image type to be read. In the present embodiment, there can be selected three image types, namely an RGB type representing a full-color image, a black-and-white multi-value type in which each pixel is represented by 8 bits between black and white, and a black-and-white binary type in which each pixel is represented by one bit, i.e. black or white. These image types can be selected by the numeral keys 23 on the operation unit 6.

In a next image frame 33, selection is made on the format to be used in the transfer of the read image data to a computer. In the image frame 33, the RAW DATA means transfer of the read original data, without addition of header etc. TIFF (tag image file format) and PICT are formats already well known in the computer technology, containing the information of the image size etc. in the header. JPEG COMPRESSION means data transfer to the computer after the JPEG compression, which is already known as a standard compression method. UNIT COMPRESSION means data transfer to the computer after the UNIX compression, which is also known as a standard compression method. There may also be employed other known image formats. In this manner the image frame 33 requests selection of one of various formats.

In a next image frame 34, the image resolution is designated. The scanner unit of the present embodiment is provided with an array of plural reading elements arranged as to read the image with a resolution of 400 dpi. On the image frame 34 there can be selected a resolution not exceeding 400 dpi. A resolution lower than 400 dpi can be realized by skipping the image read with 400 dpi. The resolution is entered by the numeral keys 23 and fixed by an unrepresented OK key. On this image frame, there is also displayed the image size, which is represented by the vertical size, the horizontal size and the total size of the image. These sizes vary according to the area size designated on the image frame 31, the image type designated on the image frame 32, and the file format designated on the image frame 33. The illustrated image frame 34 indicates that an area of 1024×1024 pixels read in the RGB type with a resolution of 72 dpi and transferred in the raw data format requires a data capacity of 3 Mbytes (1024×1024×3). A high resolution provides an image of a higher resolution but increases the image size, leading to a larger disk capacity for data storage and a longer data transfer time.

On a next image frame 35, there is selected a computer as the destination of the read image data. On this image frame, selection is made among the listed computers 1 to 4 registered in advance. For example, "1:A" corresponds to the computer A in FIG. 2. In the illustrated example, there are displayed actual system names, but it is also possible to display contracted names if the actual system names are too long, or to display other names different from the actual system names. Though the image frame 35 only shows four computers in the list, it is also possible to display a larger number of computers by scrolling or by page switching.

Upon selecting "5: LIST DISPLAY" on the image frame 35, there is displayed an image frame 36 showing the list of equipment currently connected to the network, and a computer is selected in the list, as the destination of the read image. In the network protocol, there is provided a mechanism for inquiring the connected equipment, and the equipment connected to the network 3 are investigated by such mechanism. It is also possible to investigate the equipment connected to the network 3, by monitoring the sources and the destinations of the data flowing on the network 3.

When one of the computers A to D is selected, the display shifts to an image frame 37, requesting the designation of a directory for image storage within the destination computer. The image frame 37 at first displays a default directory as the current directory (for example A1). Storage is selected if such directory is acceptable. If another directory is desired, the selection is moved to a desired one among the displayed list of subdirectories. After the movement, the display returns to the image frame 37, on which the storage is selected.

A next image frame 38, displaying the file name for data storage, requests the last instruction whether or not to execute the image reading. When the operator places the original on the unrepresented original table and selects the reading, the image reading operation is initiated and the image data of the designated area, file format, image size and resolution are transferred to the designated directory of the designated computer, and then the display returns to the standard image frame. In the present embodiment, the file name is automatically generated and consists of a prefix "IMG", followed by a serial number indicating the order of image reading, and ".raw" indicating that the file format is raw data.

Figure 6:
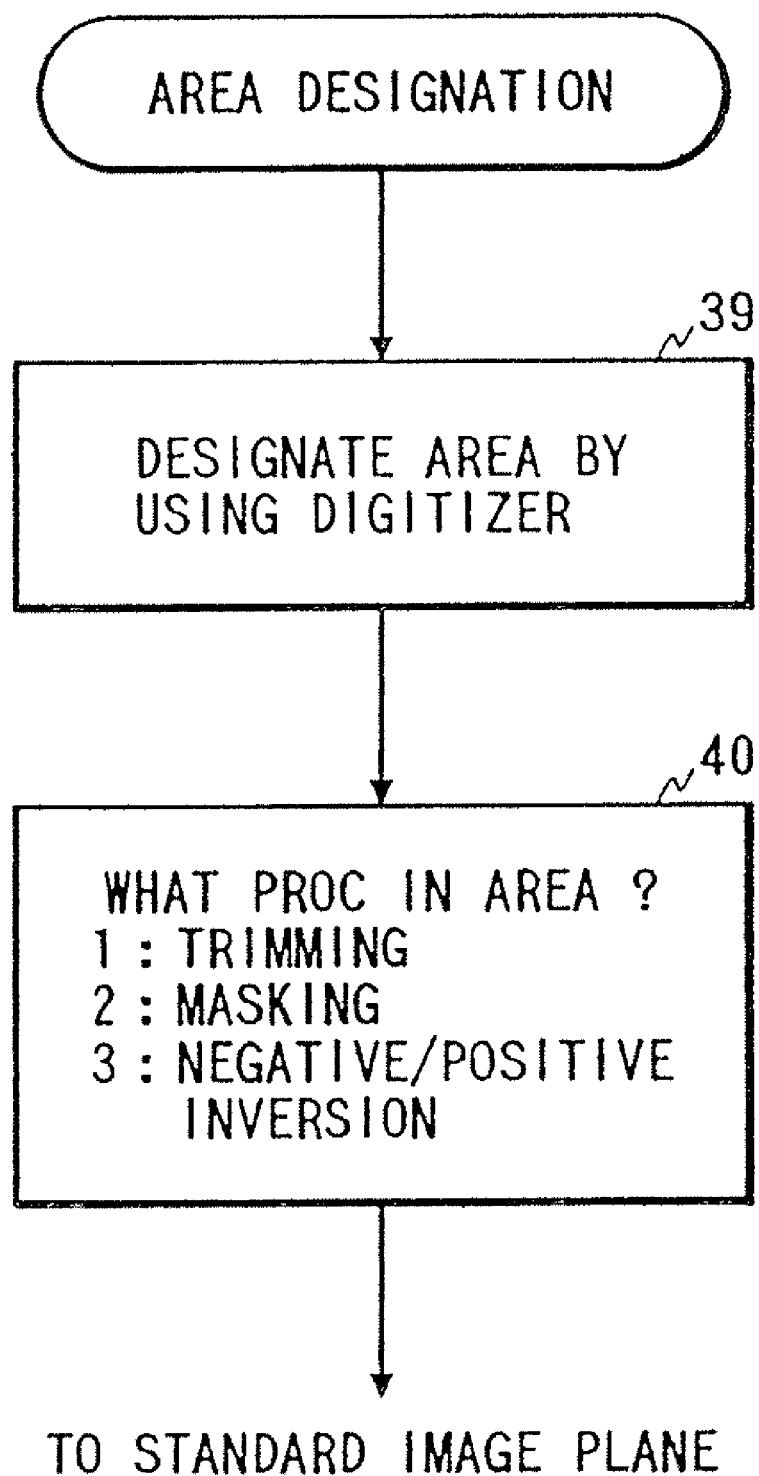
FIG. 6 is a view showing the shift of display on a display panel, in a copy area designating operation in a copying process in the first, second and third embodiments.

FIG. 6 shows the message displayed on the liquid crystal display unit 22 of the operation unit 6, for copying area designation prior to the copying operation, in case the copying apparatus 1 is used as the local copying machine. After depression of an area designation key within the function keys 21 on the operation unit 6, there is displayed the image frame 39 on which an area is designated on the original with the digitizer 17. Then, on an image frame 40, there is selected a mode of the image processing to be applied to the image within the designated area. Trimming means a mode of copying the image of the designated area only. MASKING means a mode of copying the image except for the designated area. NEGATIVE/POSITIVE INVERSION means a mode of image formation with negative/positive inversion of the image in the designated area. After such designation, there is conducted another designation such as of the copy number with the numeral keys, and the copy start key 24 is depressed to initiate the copying operation with the designated mode. As explained in the foregoing, the operation unit 6, the liquid crystal display unit 22 and the numeral keys 23 therein are also used for the mode designation for the reading operation and the start of the reading operation in the use as the remote scanner, and also for the mode designation and the start of copying operation in the use as the local copying machine. Besides the digitizer 17 is used for area designation in the reading operation in the use as the remote scanner and also for that in the copying operation in the use as the local copying machine. In this manner the configuration of the apparatus can be simplified.

FIG. 7 is a detailed block diagram of the image process unit 14. Image data 19 transferred from the scanner unit 12 or the image memory 9 are at first subjected to a smoothing process in a smoothing circuit 41. This process reduces the image frequency in order to avoid moiree fringes in case of an image reduction in an enlargement/reduction circuit 42 to be explained later, and is only applied in case of the image reduction. Then the enlargement/reduction circuit 42 enlarges or reduces the image size, or does not change the image size. A next negative/positive inversion circuit 44 effects data inversion in case of negative/positive inversion, but the data are simply passed in case such inversion is not required. A control register 43 retains the parameters for the smoothing circuit 41 and the enlargement/reduction circuit 42, and parameters indicating whether or not to effect smoothing, rate of enlargement or reduction and whether or not to effect negative/positive inversion are set therein by the control unit 5 through the CPU bus 8. The image process unit is used for the image processing of the read image data in the use as the remote scanner, and also for the image processing of the read image data in the use as the local copying machine. For example, in case of image reading with 400 dpi as, the remote scanner, the image data are simply passed by the circuits in the image process unit 14. On the other hand, if the reading resolution is less than 400 dpi, the image data are subjected to the smoothing in the smoothing circuit 41, then passed by the negative/positive inversion circuit, and are subjected to a reduction process to the designated resolution by the enlargement/reduction circuit 42. In the local copying operation, in case of equal-size copying, the data are passed by the smoothing circuit 41 and the enlargement/reduction circuit 42. On the other hand, in case of a reduction copying, the data are subjected to the smoothing process in the smoothing circuit 41 and then to the reduction process in the enlargement/reduction circuit 42. In case of an enlarged copying, the data are passed by the smoothing circuit 41 and subjected to an enlargement process in the enlargement/reduction circuit 42. In the copying operation, the negative/positive inversion circuit 44 is so set as to effect the negative/positive inversion only when the negative/positive inverted copying is instructed. For the purpose of simplicity, FIG. 7 only shows simple image processing, but other image processing circuits such as a color conversion circuit, can also be used in common in the reading operation for the local copying and in the use as the remote scanner.

In the following there will be explained the data flow on the network 3, with reference to FIG. 8.

In FIG. 8, A to E correspond to the computers shown in FIG. 2, and S corresponds to the copying apparatus 1. Also "No. 1" etc. indicate packet numbers.

Though simplified in FIG. 8 for the purpose of clarity, the data exchange on the network 3 is conducted in the unit of a packet. Large data are transmitted after division into plural packets, which are reconstructed in the receiving side. Also plural transmission are executed in parallel manner, on time-shared basis. The time sharing is executed in the unit of a packet. For example, in FIG. 8, at first a first packet of the scan data is transferred from the copying apparatus 1 to the computer A in 51A. Then, in 51B, another packet is transferred from the computer B to C. In 51C, a second packet of the scan data is transferred from the copying apparatus 1 to the computer A. Similarly other packets are transferred in 51D and 51E, and a third packet of the scan data is transferred from the copying apparatus 1 to the computer A in 51F. In this manner plural transmissions are executed in apparently parallel manner. Such operating mode allows to prevent the network 3 from being occupied by a particular communication.

FIG. 8 does not show the case of collision of plural transmissions for the purpose of simplicity, but the ordinary network protocol has a method for copying with such situation.

Though not shown in FIG. 8, each packet contains information on the transmitting source, the destination and the ordinal number of the packet.

Figure 1:
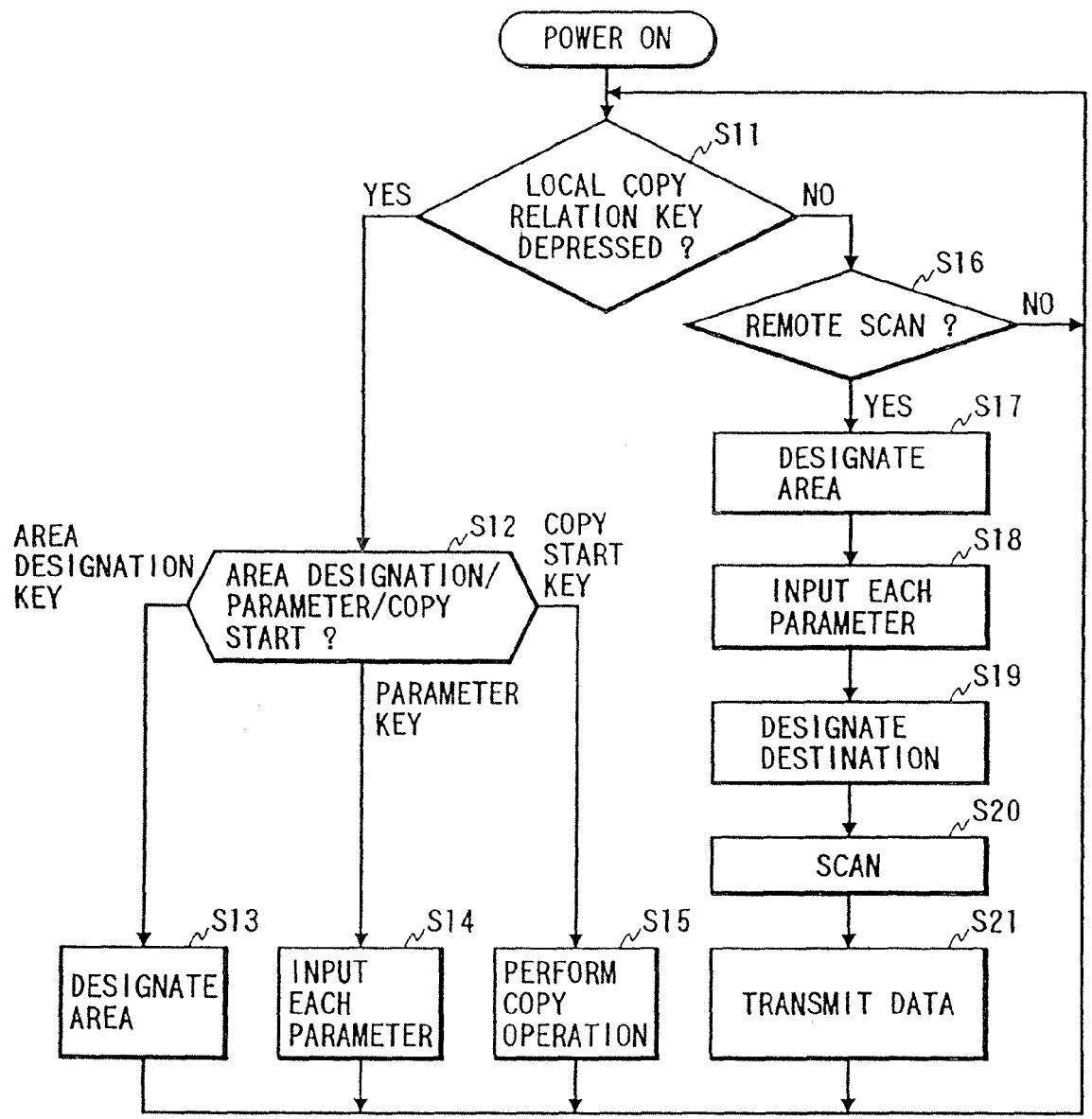
FIG. 1 is a flow chart showing the control sequence of a copying apparatus constituting a first embodiment of the present invention.

FIG. 1 is a flow chart showing the control sequence of the copying apparatus of the first embodiment of the present invention. After the power supply is turned on, a step S11 discriminates whether a key relating to the local copying has been depressed on the operation unit 6. If depressed, a step S12 further discriminates whether the depressed key is an area designation, a parameter key such as numeral keys 23, or a copy start key, and the sequence branches to a step S13, S14 or S15 according to the result of discrimination. If the area designation key is depressed, the sequence proceeds to a step S13 to effect area designation for local copying and designation of the process in the designated area according to a flow explained in FIG. 6, and the sequence then returns to the step S11. On the other hand, if a parameter key such as the numeral keys 23 is depressed, the sequence proceeds to a step S14 to execute a process corresponding to the depressed key, and the sequence then returns to the step S11. For example, if the numeral keys 23 are depressed in a standard state of the local copying mode, such key depressions are regarded as an instruction for the number of copies, according to which the copy number is renewed. Also in case the copy start key is depressed, the sequence proceeds to a step S15 to effect a local copying operation with the area designation and the parameters set in this state.

On the other hand, if the step S11 identifies that the keys relating to local copying have not been depressed on the operation unit 6, a step S16 discriminates whether a scan start key has been depressed. If not the sequence returns to the step S11, but, if depressed, there is executed a reading operation of steps S17 to S20 in the use as the remote scanner, according to the flow shown in FIG. 5. At first a step S17 effects designation of the area to be read, by means of the digitizer 17. Then a step S18 effects input of parameters of the image type, file format, resolution, image size etc. as explained in the image frames 32 to 34 in FIG. 5. Then, a step S19 designates the designation computer to which the read image data are to be transferred and the directory therein, as explained in the image frames 35 to 37 in FIG. 5. Then a step S20 instructs the start of reading operation in an image frame 38 in FIG. 5 and reads and stores the image of the original on the original table into the image memory 9. In this operation a parameter is set, according to the resolution designated in the image frame 34 in FIG. 5, in the enlargement/reduction circuit of the image process unit 14, then the image reduction is executed by a hardware and the image with the converted resolution is stored in the image memory 9. Then a step S21 reads the image data from the image memory 9 and transfers the image data to the directory of the computer designated in the image frames 35 to 37 in FIG. 5, and the sequence then returns to the step S11.

The image data are divided into plural packets as shown in FIG. 8, and are transmitted in discontinuous manner in the unit of a packet. In the reading of the image data from the image memory 9 and transmission to the destination computer, the data are converted by a predetermined software so as to obtain the designated area, image type and file format.

As the image memory 9 is so constructed as to store the image data of the maximum original size, the transmission of a designated area is achieved by reading the image data of a necessary area only.

The image memory 9 stores the RGB data. Therefore, if the image type is RGB type, the image data are not particularly processed, but, in case of black-and-white multi-value image type, the image data are converted according to an equation $W=(R+G+B)/3$. In case of the black-and-white binary image type, thus converted data are further binarized.

Also in case of the raw data file format, the image data are not particularly processed but, in case of the TIFF or FICT file format, the header information is added according to each format. Also in case of the JPEG or UNIX compression, the image data are compressed according to respective compression method and the compressed data area transferred to the destination number.

The present embodiment allows to effect various operations relating to the copying apparatus 1 collectively in the copying apparatus 1 thereby reducing the frequency of the visits of the operator to the distant computers. Consequently various operations can be made smoother and easier.

Second Embodiment

In the following there will be explained a second embodiment of the present invention, with reference to FIGS. 9, 10 and 11.

The copying apparatus of the second embodiment of the present invention is different from the first embodiment in the area designating means and the method of transferring the image to the computer. Therefore the present embodiment will be explained in the following with emphasis on such differences, with reference to FIGS. 9 and 10 respectively instead of FIGS. 1 and 3 showing the first embodiment and further to FIG. 11.

FIG. 9 is a block diagram of a copying apparatus 1 constituting a second embodiment of the present invention. It is firstly different from the first embodiment in that the area designating means is composed of an image display unit 61 and a mouse 62, instead of the digitizer 17. In the present embodiment, in the area designation in the process shown in FIGS. 5 and 6, the process of area designation on the original placed on the digitizer 17 is replaced by a process of placing the original in the ordinary original reading position and depressing a preview key (not shown) on the operation unit 6, whereby the image read by the scanner unit 12 is stored in the image memory 9 through a path same as in the reading operation in the first embodiment. Then the data in the image memory 9 are moved to and displayed on the image display unit 61 under the control of the control unit 5. Subsequently the operator designates an area on the image with the mouse 62, while watching the displayed image. Such image display and area designation thereon are already well known in the technology of personal computer and will not, therefore, be explained in detail.

A second difference from the first embodiment lies in a fact that, in contrast to the first embodiment where the image data are directly transferred from the image memory 9 to the external equipment, the present embodiment is provided with a hard disk 7 and the image data are once moved from the image memory 9 to the hard disk 7 and then transferred therefrom to the external computer. Such configuration additionally requires the hard disk 7 and the data transfer time thereto, but brings about an advantage that the image memory 9 can be used for other purposes after the data transfer to the hard disk 7, so that the occupied time of the image memory 9 can be reduced. In the present embodiment, the image memory 9 is composed of dynamic RAM (DRAM). On the other hand, the hard disk is non-volatile and has a large capacity, so that the cost per byte is lower. In general, the hard disk is not adequate for use as the image memory, because of the lower access speed. On the other hand, the DRAM is suitable for use as the image memory, because of the higher access speed, but is disadvantageous in the volatility that the stored content is lost when the power supply is cut off, and is a higher cost per byte. For these reasons, the volatile DRAM is used for the image memory requiring high speed and non-volatile hard disk is used for storing the data obtained by image reading and those for printing. However the image memory 9 may be composed of a high-speed non-volatile memory if such memory becomes available in the future.

Figure 10:
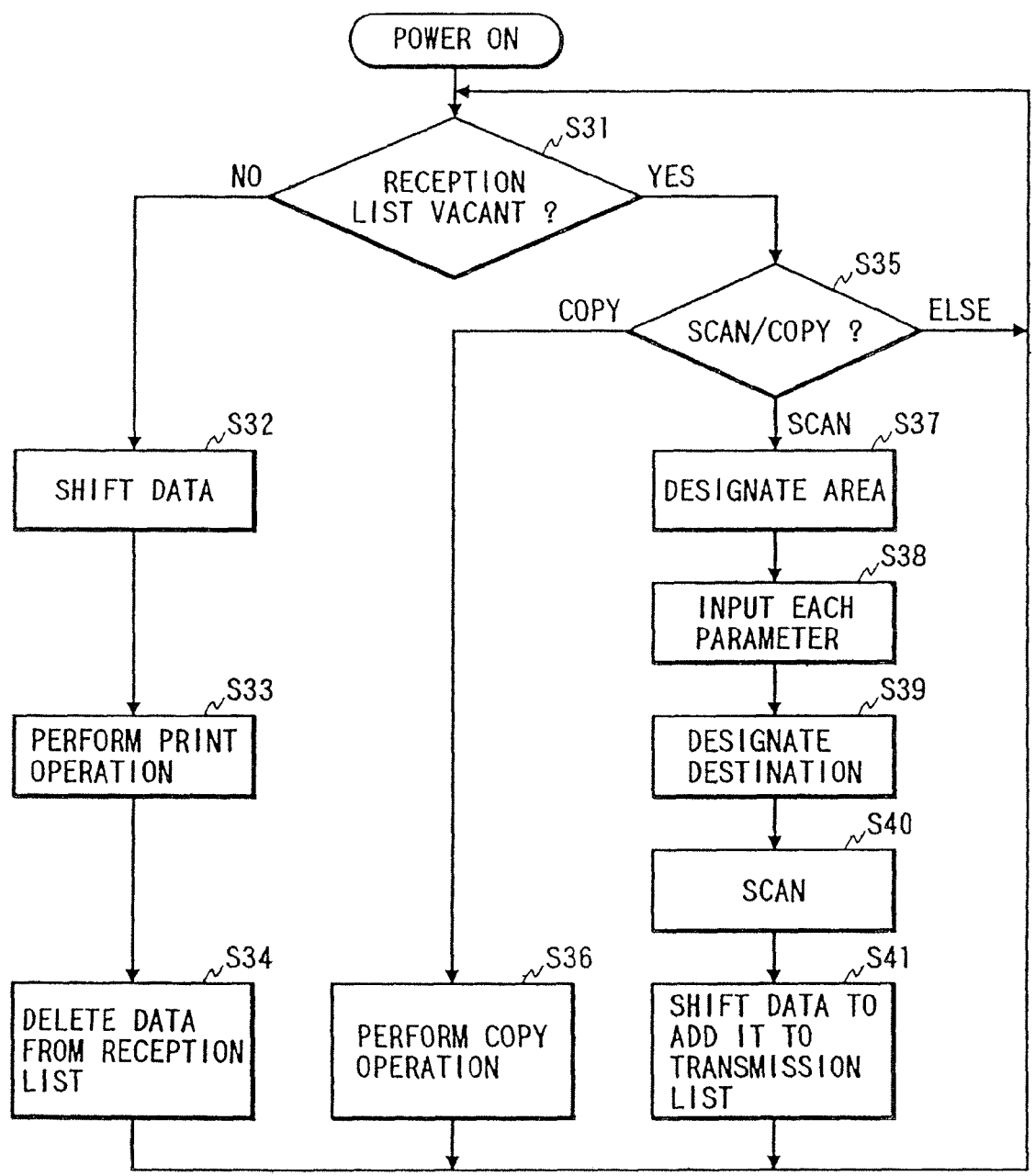
FIG. 10 is a flow chart showing the control sequence of the copying apparatus of the second embodiment.

FIG. 10 is a flow chart showing the main control sequence of the present embodiment. At first a step S31 discriminates whether a reception list for the remote printer is empty. The reception list for the remote printer holds the print request in case print data are transferred from the computer, and a non-empty list means that an unprocessed print request from the computer still remains.

The data to be printed are stored in the hard disk 7 as will be explained later. If the step S31 identifies a non-empty state of the reception list, a step S32 transfers the print data from the hard disk 7 to the image memory 9 and a step S33 executes a printing operation. Then a step S34 deletes the print request, for which the printing operation has been completed, from the reception list and also deletes the print data on the hard disk 7.

On the other hand, if the step S31 identifies an empty state of the reception list, the sequence proceeds to a step S35 to discriminate whether the scan start key or the copy start key in the operation unit 6 has been depressed, and, if not, the sequence returns to the step S31. If the copy start key has been depressed, a step S36 executes a local copying operation as in the first embodiment. Though not shown in FIG. 10, the area designation and the input of parameters for the copying operation are also conducted as in the first embodiment, with the operation unit 6 or with the image display unit 61 and the mouse 62. On the other hand, if the step S35 identifies the depression of the scan key, the steps S37 to S40 are executed according to the process shown in FIG. 5, as in the first embodiment. The area designation in the step S37 is executed with the image display unit 61 and the mouse 62, instead of the digitizer 17. The steps S38 to S40 are same as the steps S18 to S20 of the first embodiment, shown in FIG. 1. A step S41 reads the image data from the image memory 9 and stores the image data in the hard disk 7, instead of the transmission to the computer. Then the name of the destination is registered in a transmission list, which holds the information of the untransmitted scan data, as will be explained later. After the data transfer to the hard disk 7, the sequence returns to the step S31.

Also in this embodiment, the conversion of the resolution is conducted, as in the first embodiment, by the hardware in the image process unit 14 in the reading operation in the step S40. Also the area process, the image type conversion and the file format conversion are executed by a software process, at the data transfer to the hard disk 7 in the step S41.

Figure 11:
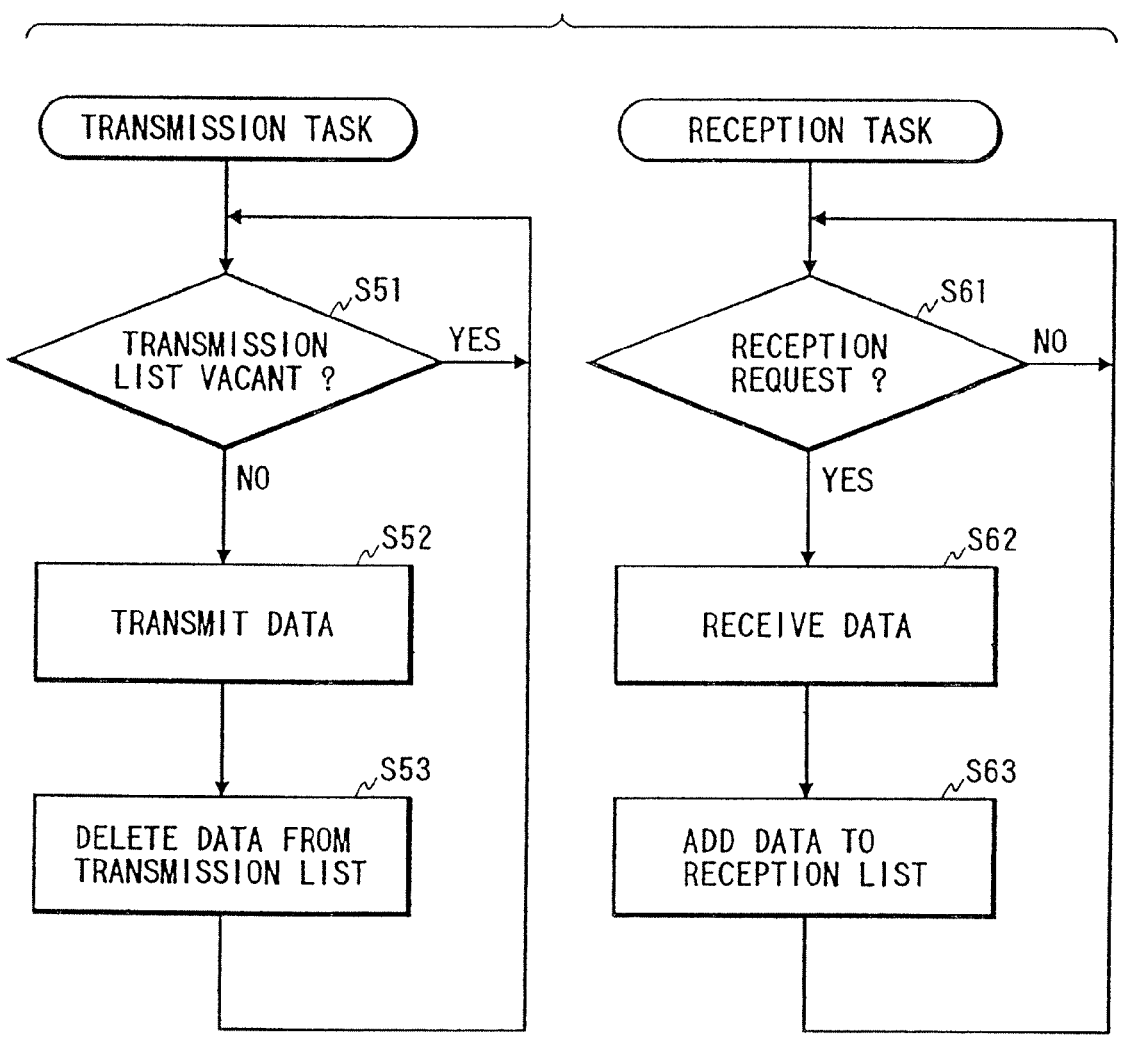
FIG. 11 is a flow chart of a transmission task and a reception task in the copying apparatus of the second embodiment.

FIG. 11 is a flow chart showing sub control routines in the present embodiment. The control of the copying apparatus 1 proceeds in so-called multi-task mode, in which plural tasks are executed in apparently parallel manner. FIG. 10 shows the control sequence of a main task, but a transmission task and a reception task proceed in parallel manner as shown in FIG. 11. The transmission task executes the transmission of the scan data, read by the scanner.

At first a step S51 discriminates whether a transmission list is empty. If empty, indicating that there are no scan data to be transmitted, the sequence returns to the step S51. If not empty, a step S52 reads the image data from the hard disk 7, divides the image data into plural packets and transmits these packets to the computer of the designated destination. When the transmission is completed in normal manner, a step S53 deletes the scan data from the transmission list, also deletes the image data from the hard disk 7, and the sequence returns to the step S51.

Though not shown in FIG. 11, if the transmission is unsuccessful, the deletion from the list is not conducted, and the transmission is re-tried afterwards. In such case, the transmission is ranked at the last of the transmission list, and the transmission is re-tried only after the lapse of a predetermined time. When a destination computer is selected on the image frame 35 in FIG. 5 from the registered list, the power supply of such destination computer may be turned off. However, owing to such retrying system, the operation can be repeated and the scan data can be transmitted as soon as the power supply of the destination computer is turned on. Also the data can be transferred afterwards in case the destination computer is used for another purpose and busy. Furthermore, even if the destination computer has a low reception rate, the data can be transferred from the hard disk 7 with a low rate in the background operation, and another reading, printing or copying operation can be executed during such data transfer.

The reception task executes the reception of the print data.

At first a step S61 discriminates whether there is a reception request from the computer, and, if not, the sequence returns to the step S61, but, if there is a reception request, a step S62 receives the print data and stores the received data in the hard disk 7, and a step S63 makes an addition to the reception list.

Such parallel proceeding of the main task for the printing, copying and reading operations, the transmission task for the transmission of the scan data and the reception task for the reception of the print data allows to reduce the occupied time of the apparatus in each operation, such as by effecting the next reading, printing or copying operation in the course of the transmission of the scan data or in the course of reception of the print data, thereby enabling effective exploitation of each function and significantly improving the utilization rate of the system.

In the present embodiment, the operation unit 6 and the image display unit 61 are constructed separately, but it is also possible to effect various operations with the image display unit 61 and the mouse 62. Such configuration can realize a graphical user interface and significantly improves the operation characteristics. For example, the display of the list shown in FIG. 5 may be achieved in a scrolled display, thereby eliminating the limitation on the number of displayable items. However, the configuration of the present embodiment has an advantage that the image display unit 61 and the mouse 62 may be provided as optional equipment.

In the foregoing first and second embodiments, the basic portions such as the scanner unit and the printer unit and the additional portions such as the image memory are integrally constructed, but same advantages can also be obtained in case the system is divided into an image reading apparatus and an image processing apparatus as in the third embodiment to be explained later.

Third Embodiment

In the following there will be explained a third embodiment of the present invention, with reference to FIGS. 12, 13, 14 and 15.

The present embodiment is different from the foregoing first embodiment only in that the copying apparatus 1 is separated into a copying apparatus 102 for reading the image and an image processing apparatus 101, and in the image transfer method to the computer. Consequently the present embodiment will be explained in the following with emphasis on such differences, by referring to FIGS. 14, 12 and 13 instead of FIGS. 1, 3 and 5, and also to FIG. 15.

Figure 12:
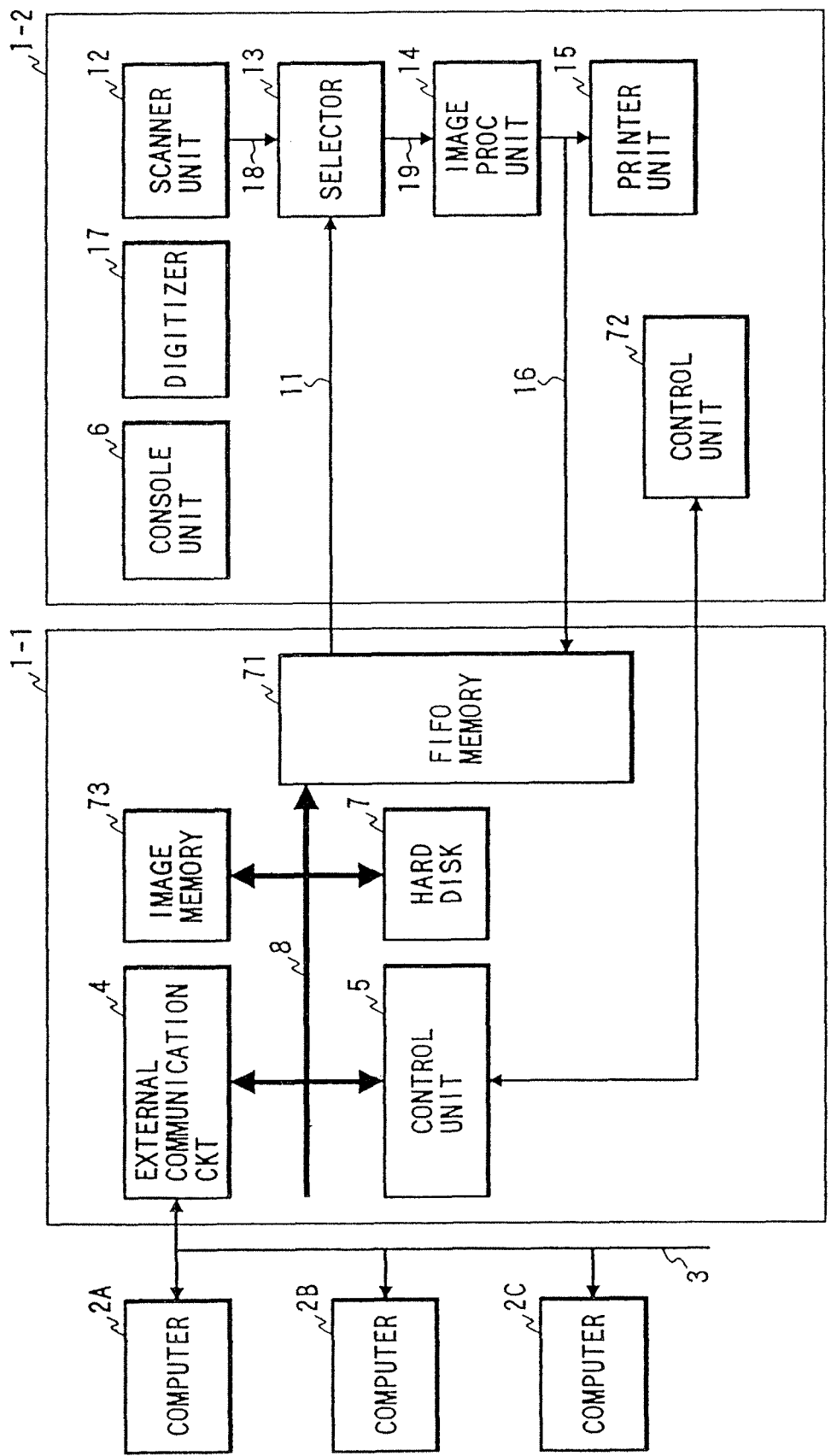
FIG. 12 is a block diagram of a copying apparatus and image processing apparatus, constituting an image reading system of the third embodiment of the present invention.

FIG. 12 is a block diagram of a copying apparatus 1-2 and an image processing apparatus 1-1, constituting a third embodiment of the present invention. This embodiment is different, firstly, from the first embodiment in that the copying apparatus 1 therein is separated into the copying apparatus 1-2 and the image processing apparatus 1-1. The scanner unit 12, the printer unit 13, the digitizer 17 constituting the area designation means, and the operation unit 6 are provided in the copying apparatus 1-2. On the other hand, the image memory 73, the hard disk 7 and the external communication circuit 4 are provided in the image processing apparatus. Such split configuration is based on a fact that the image memory 73, the hard disk 7 and the external communication circuit 4 are unnecessary and merely raise the cost in case the copying apparatus 1-2 is used singly as a stand-alone equipment. By constructing the copying apparatus 1-2 as explained in the foregoing, for the use as a stand-alone equipment and by adding the image processing apparatus 1-1 when the copying apparatus 1-2 is used also as a scanner or a printer, it is rendered possible to achieve simplification of the configuration and cost reduction in case the copying apparatus is used singly, and to achieve easier supply of the merchandises matching the needs of the users.

A second difference from the first embodiment lies in facts that the read image data 16 are stored in a FIFO (first-in-first-out) memory 71, from which the stored data are transferred by the control unit 5 to the image memory 73, and that, in the printing operation, the control unit 5 transfers the image data from the image memory 73 to the FIFO memory 71, from which the image data 11 are transferred to the copying apparatus 1-2. The FIFO memory 71 has a capacity of one or several lines, and is so controlled that the data readout is conducted before the FIFO memory 71 becomes full by the data write-in. Such configuration can be realized when the processing speed of the CPU bus 8 is sufficiently higher than the transfer rate of the video image data 11, 16. With such configuration, the image memory 73 can be constructed same as the ordinary memory accessible by the CPU, without the necessity of data write-in/read-out in synchronization with the addresses generated corresponding to the image synchronization signals, so that the circuitry can be simplified. Also the FIFO memory 71, not requiring addresses, can be easily controlled.

As a third difference from the first embodiment, the third embodiment is provided with a hard disk 7 as in the second embodiment and the data, read in the scanner, are transferred to such hard disk 7. Also in this embodiment, the image memory 73 is composed of a volatile DRAM.

Figure 13:
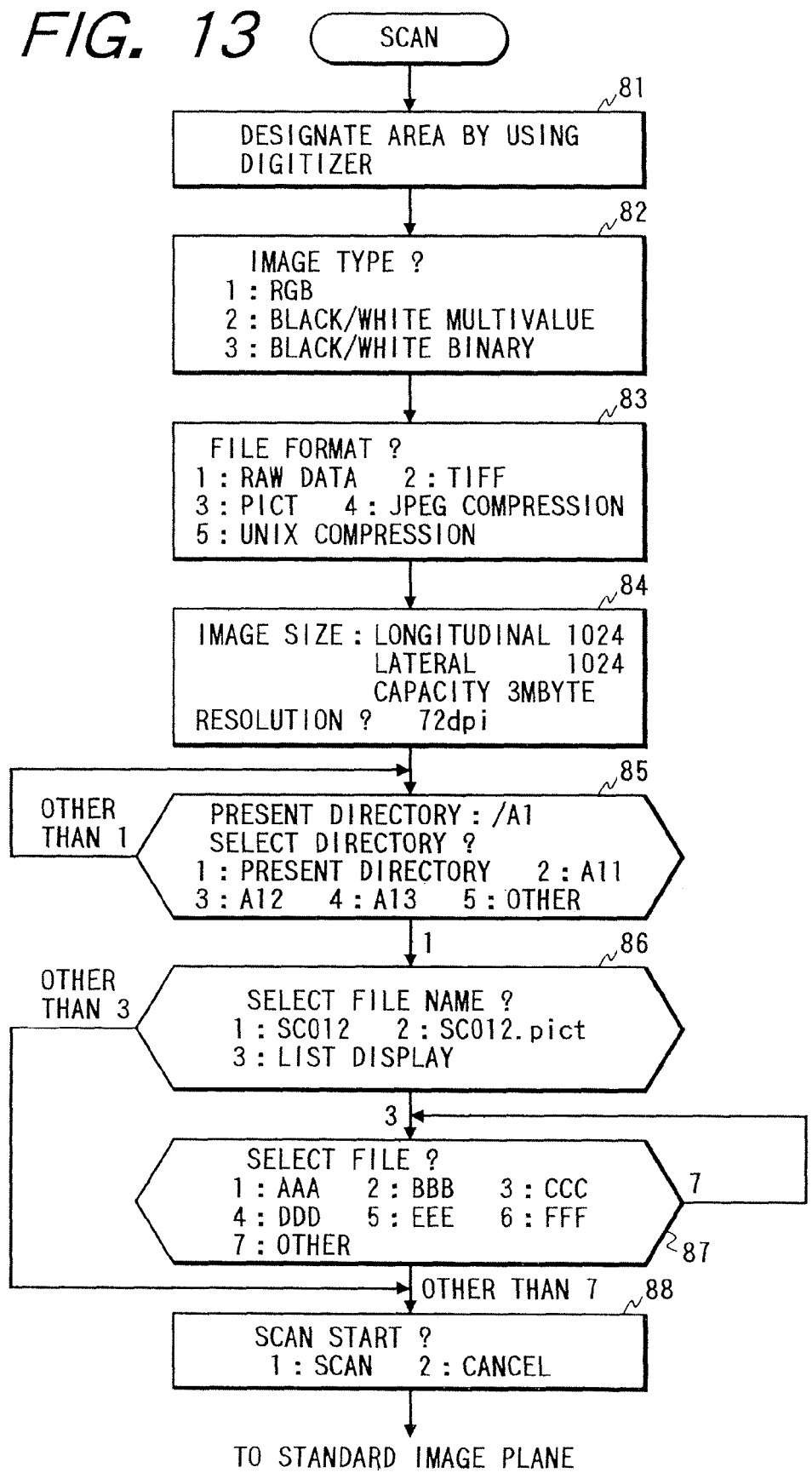
FIG. 13 is a view showing the shift of display on a display unit 22 in a reading operation in the third embodiment.

FIG. 13 shows the messages displayed on the liquid crystal display unit 22 of the operation unit 6 in the copying apparatus 1-2, in the use thereof as a remote scanner. FIG. 13 corresponds to FIG. 5 in the first embodiment, and, in the following, the process in FIG. 13 will be explained only in the points different from that in FIG. 5, as both processes are mutually common in many aspects. In FIG. 13, image frames 81 to 84 are same as the image frames 31 to 34 in FIG. 5 relating to the first embodiment. Image frames starting from 85 designate the subdirectory and the file name, to be used for data storage, in the hard disk 7 of the image processing apparatus 1-1, instead of the destination computer and its subdirectory. At first an image frame 85 is used for selecting a subdirectory of the hard disk 7 of the image processing apparatus 1-1. At first there is displayed a default directory, and, upon selection of another directory, the display moves to such selected directory and the image frame 85 is displayed again. Upon selection of a directory, the display shifts to an image frame 86 for entering a file name. In the present embodiment there are automatically displayed certain candidate names among which the selection is made, but it is also possible to provide a keyboard and to directly enter a file name with such keyboard. Upon selecting LIST DISPLAY on the image frame 86, the display shifts to an image frame 87 showing a list of the image files in the current directory and the selection can be made from such list. In such case, the already existing scan image is overwritten. A next image frame 88 requests the last instruction whether or not to execute the image reading. When the operator places the original on the unrepresented original table and selects the scanning operation, the image reading operation is initiated and the image data of the designated area, file format, image size and resolution are transferred to the designated directory in the hard disk 7 of the image processing apparatus 1-1 with the designated file name, and the display then returns to the standard image frame.

Figure 14:
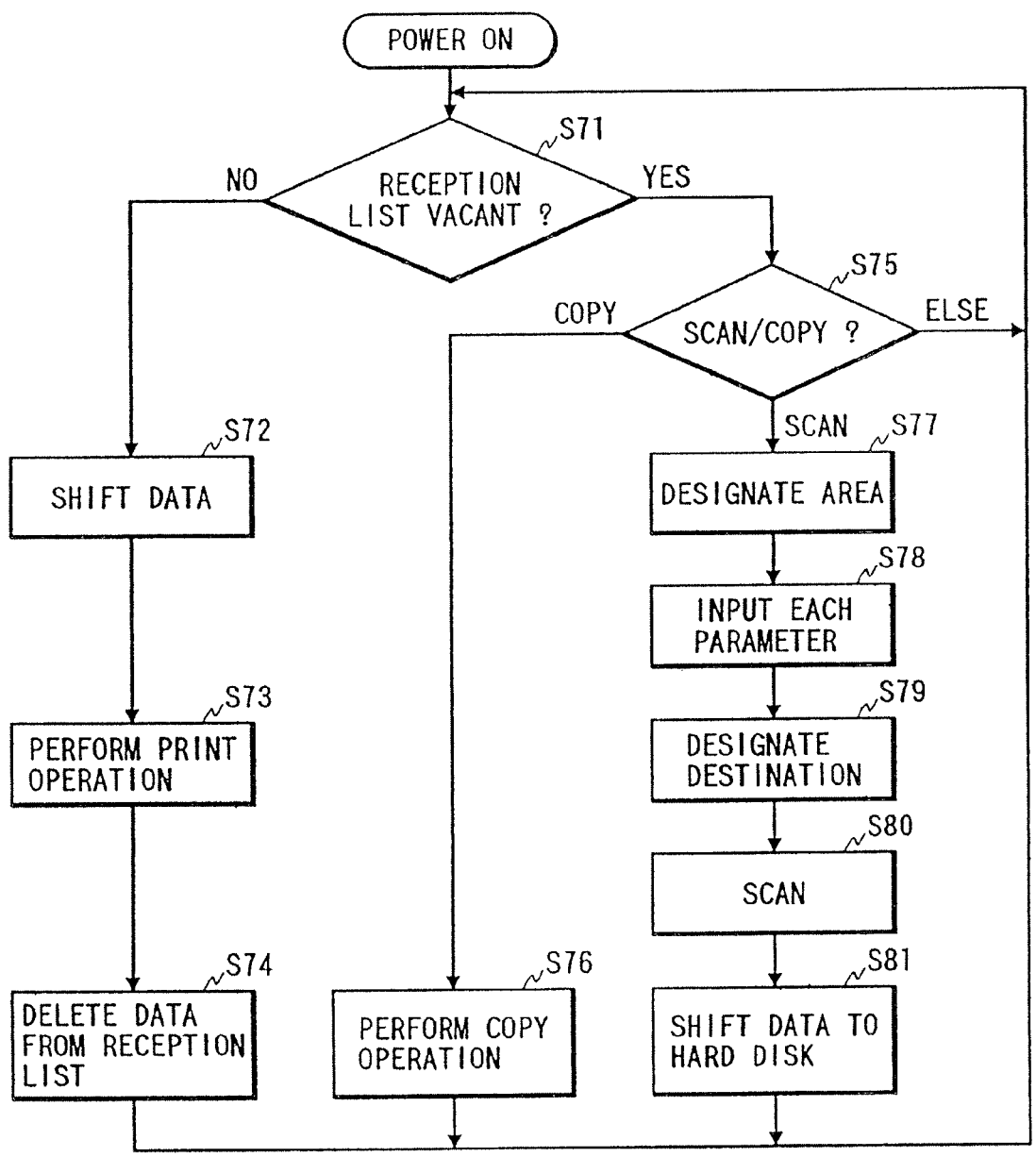
FIG. 14 is a flow chart showing the control sequence of a copying apparatus of the third embodiment.

FIG. 14 is a flow chart showing the main control sequence of the present embodiment. As it is similar to the control sequence of the foregoing second embodiment, there will be explained, in the following, only the differences from the flow shown in FIG. 10. Steps S71 to S80 are same as the steps S31 to S40 of the second embodiment, shown in FIG. 10. A step S81 effects transfer of the image data from the image memory to the hard disk 7 as in the second embodiment, but without registration in the transmission list. Thus, after the data transfer to the hard disk 7, the sequence immediately returns to the step S71.

Also in the present embodiment, the conversion of resolution is executed by a hardware in the image process unit 14, at the reading operation in the step S70. Also the area processing and the conversion of the image type and the file format are executed by a software at the data transfer to the hard disk 7 in the step S71.

Figure 15:
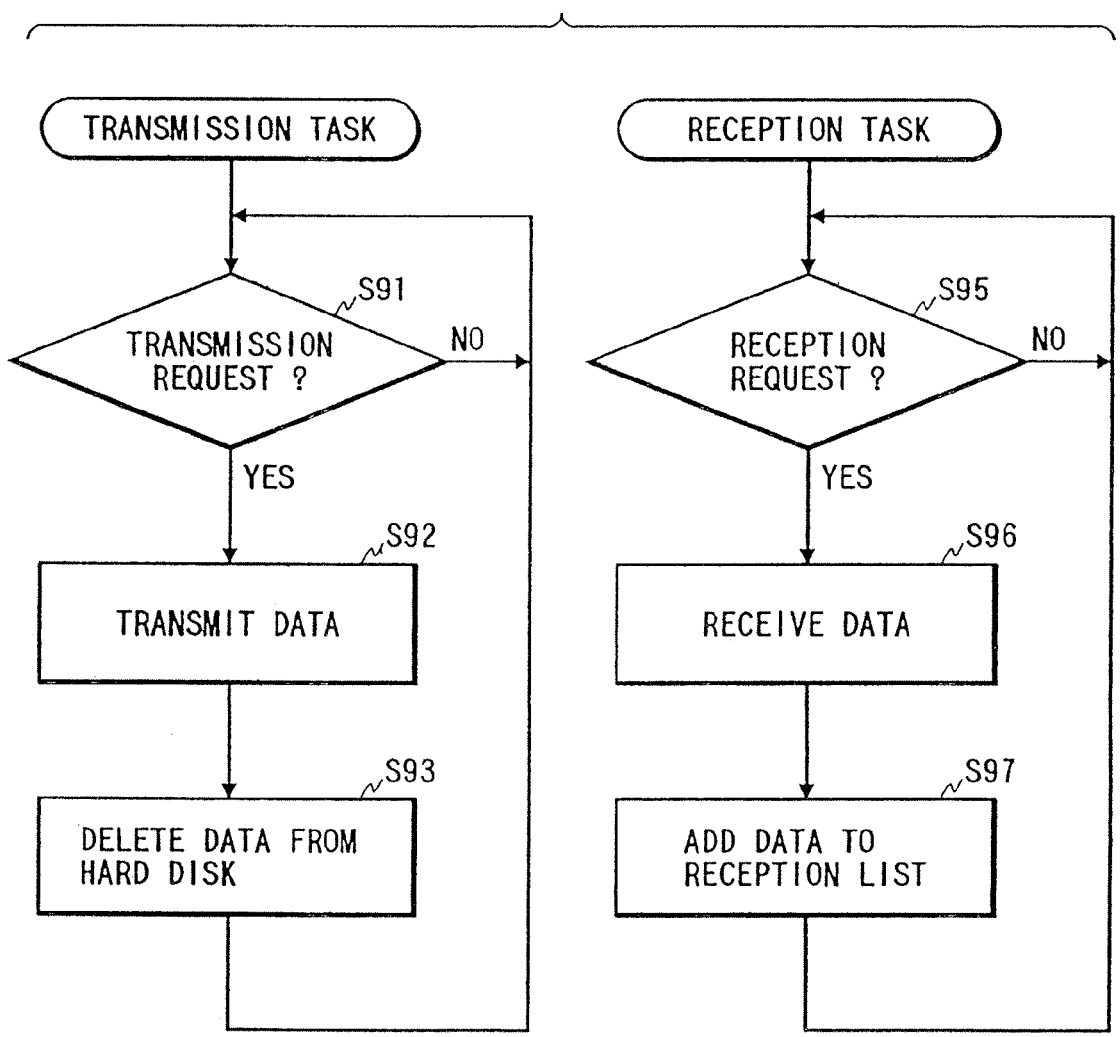
FIG. 15 is a flow chart of a transmission task and a reception task in the copying apparatus of the third embodiment.

FIG. 15 is a flow chart showing sub control routines of the present embodiment. As these routines are similar to those of the second embodiment, there will only be explained the differences from those of the second embodiment shown in FIG. 11. In the transmission task in the second embodiment, after the original reading, there are automatically executed registration on the transmission list and the data transfer to the computer, but, in the present embodiment, the data transfer to the computer is executed according to a request therefrom.

At first a step S91 discriminates whether there is a transmission request for the scan data from the computer, and, if not, the sequence returns to the step S91, but, if the request is present, a step S92 transmits the requested scan data to the computer that has issued the request. After the transmission, a step S93 deletes the image data from the hard disk 7.

In the reception task, steps S95 to S97 are same as the steps S61 to S63 of the second embodiment shown in FIG. 11.

By transferring the data to the hard disk 7 in the course of the reading operation under the instruction from the operation unit 6, the image memory 73 can be promptly liberated, so that there can be provided an advantage similar to that in the second embodiment.

Also the data transfer to the computer in response to the instruction therefrom provides an advantage that the image data can be fetched at a convenient timing therefor.

In the present embodiment, the image reading apparatus 1-2 and the image processing apparatus 1-1 are constructed separately, but they may also be constructed integrally as in the foregoing first and second embodiments.

In the present embodiment, the area designation is conducted by the digitizer 17 on the image frame 81 shown in FIG. 13, but it may also be achieved by an image display unit and a mouse as in the second embodiment. Also in the present embodiment, the area designation is executed on the image frame 81 and the image reading operation is executed on the image frame 88, but it is also possible to invert the sequence to at first execute the image reading thereby storing the image data in the image memory 73, then to prepare display data from such image data and to effect the area designation under the observation of the displayed data. In such case, after the area designation, the image data corresponding to the designated area are stored in the hard disk 7.

Also in the present embodiment, the area, resolution, image type and format are designated from the operation unit 6 of the copying apparatus 1-1, but such designations may be wholly or partly given from the host computer. For example it is also possible to store the RGB raw data of 400 dpi of the maximum original size in a compressed form in the hard disk 7 under the instruction from the operation unit 6 and to send other instructions from the computer of the user, thereby effecting conversion to the area, resolution, image type and format designated in the copying apparatus 1 and transfer to the host computer. Such operation mode provides an advantage that the image need not be read again in case of an alteration in the area, resolution, image type or format.

In the second and third embodiments, the image data are converted into the designated area, resolution, image type and format prior to the storage in the hard disk 7, but it is also possible to store the data in another form in the hard disk and to effect such conversion at the data transfer to the computer. For example the data may be stored in the hard disk 7 with a resolution of 400 dpi and converted to another resolution at the transfer to the computer, and such operation mode provides an advantage that the image need not be read again in case of an alteration in the resolution. It is furthermore possible to store the data in the hard disk 7 in a compressed form and to convert the data into the designated format at the transfer to the computer, and such operation mode provides an advantage that the file capacity required for storage in the hard disk 7 can be reduced.

Also in the second and third embodiments, the image data are automatically deleted after the data transfer to the computer, but such data deletion may be dispensed with. It is also possible to effect such deletion after the lapse of a predetermined time, or from the oldest image in case the number of the read image exceeds a predetermined number, or by a manual instruction.

Also in the second and third embodiments, there is formed a read image on the hard disk 7, but it is also possible to automatically form plural read images thereon. For example it is also possible to form an image of a higher resolution and an image of a lower resolution from an image and to transfer the image of lower resolution. In this case the computer is enabled to effect image editing by the image of lower resolution and to fetch the image of higher resolution for replacing the image of lower resolution, if necessary.

In the foregoing first, second and third embodiments, the conversion of resolution is executed by a hardware and the conversion of image type and file format is executed by a software, but it is also possible to effect the conversion of resolution by a software and/or to effect the conversion of image type and file format by a hardware. Also in the third embodiment, the conversion of resolution is executed in the copying apparatus 1-2 while the conversion of image type and file format is executed in the image processing apparatus 1-1, but these operations may be mutually exchanged.

Also in the first, second and third embodiments, the image memory is so constructed as to store the RGB data of the image of the maximum original size, obtained after the conversion of resolution, but it may also be so constructed as to store the data of the designated area only, or to store the data without conversion of resolution and to effect such conversion afterwards by a software. It is furthermore possible to convert the image type by a hardware and to store the image data corresponding to the designated image type.

Also in the first, second and third embodiments, there has been explained a system consisting of an image reading apparatus and computers mutually connected with a local area network, but such system may be applied also to a wire area network, for example connecting the branch stores located within Japan. In such case it becomes possible to directly send that from the scanner of a branch A to the computer of a branch B.

Also in the first, second and third embodiments there has been explained the case of sending the scanned image data to a computer connected by a network, but such embodiments may also be applied to a configuration for sending the data to one of plural printers connected by the network.

In the first, second and third embodiments, explanation has been given to the scanner and the printer, but there may also be employed other image input/output devices such as a film reader or a film recorder. The effect of the present invention is significant particularly in case of the film reader, because it requires various processes in the reading device, such as film setting, designation of the film type etc. Also there is known a product capable of achieving a film scanner function by attaching a film projector to the copying apparatus, and the effect of the present invention is even larger in such product since the film projector has to be set on the reading apparatus.

Fourth Embodiment

In the following there will be explained an embodiment provided with a server machine for managing the users and the data on the LAN.

Figure 16:
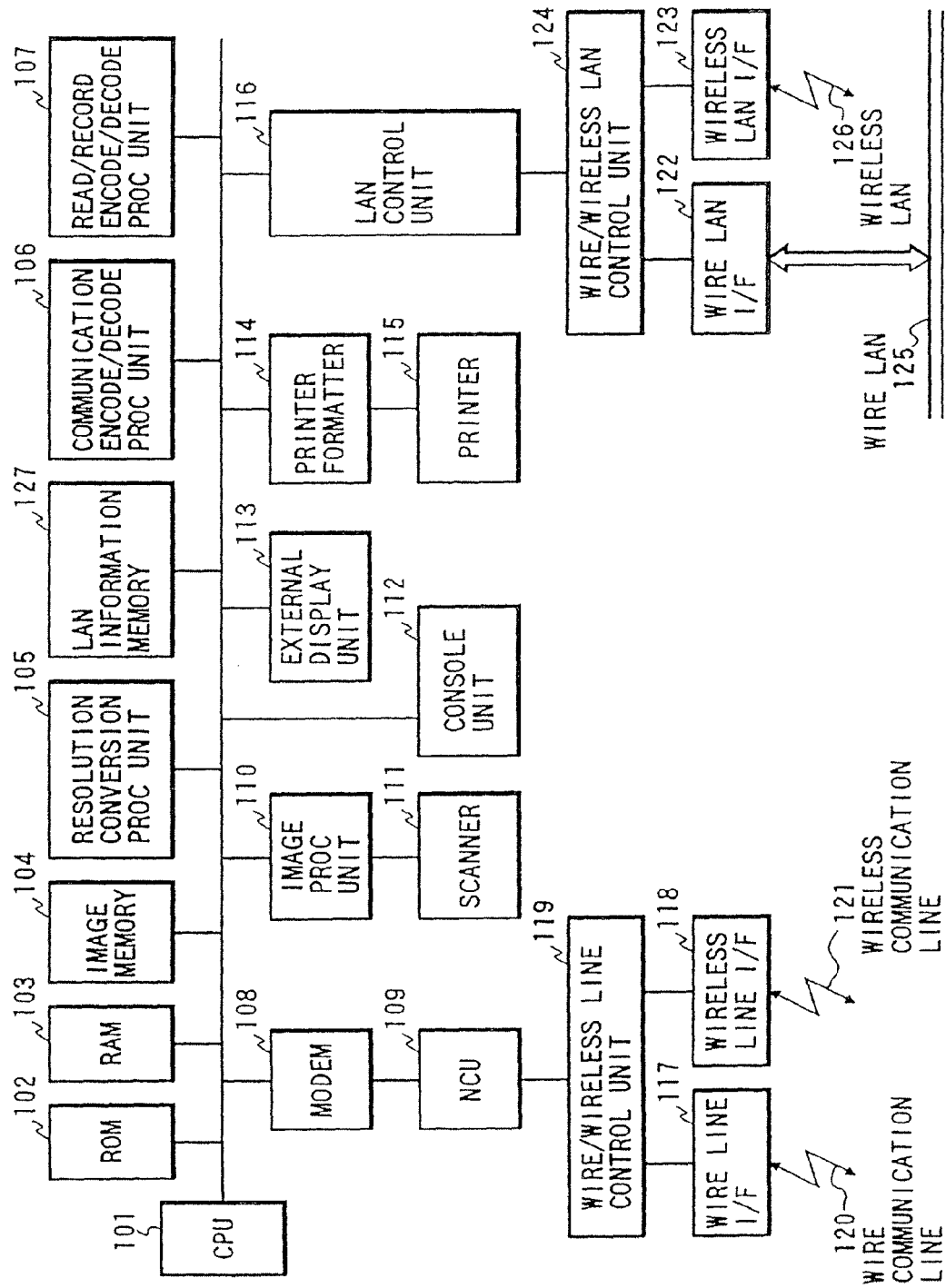
FIG. 16 is a schematic block diagram of a facsimile apparatus constituting a fourth embodiment of the present invention.

FIG. 16 is a block diagram of a facsimile apparatus constituting a fourth embodiment of the present invention. In FIG. 16 there are shown a CPU 101 constituting a system control unit for controlling the entire apparatus; a ROM 102 storing control programs for the CPU 101; a ROM 103 composed for example of a SRAM storing variables for program control and also serving for storage of the set values registered by the operator and the management data of the apparatus and also for work memories; an image memory 104 composed for example of a DRAM and serving to store the image data; and a resolution conversion unit 105 for controlling the conversion of resolution, such as millimeter-inch conversion of the raster data.

There are further provided a communication encoding/decoding unit 106 adapted, in case the encoding method for the image reading is different from that for the transmission, to effect encoding for communication and to decode the received encoded data into data for recording; a reading/recording encoding/decoding unit 107 for encoding and decoding the image data at the image reading and at the recording; a MODEM 108 for effecting modulation and demodulation of the signal to be transmitted or received in the facsimile communication; an NCU 109 for sending a selection signal (dialing pulses or tone dialer) to a wired communication line 120 through a wired line interface 117 or to a wireless communication line 121 through a wireless line interface 118, and also for effecting automatic call reception by detecting a call tone; and a wired/wireless line control unit 119 for controlling the wired line interface 117 and the wireless line interface 118.

There are further provided a scanner 111 composed of an image sensor, an original transport mechanism etc. and adapted to optically read the original in the unit of a line to provide electrical image data; and an image process unit 110 for effecting correction on the image data, obtained in the scanner 111, to provide high-quality image data.

An operation unit 112 is composed for example of a keyboard and is used for various input operations by the operator. An external display unit 113 is composed for example of an LCD or LED's and displays various information for the user.

A printer formatter 114 servers, in printing the file data for example from a work station, to analyze the code data such as the printer description language for conversion into the image data. A printer 115 visibly records the received image or the file data on the recording sheet.

A wired LAN interface 122 and a wireless LAN interface 123 respectively connect the present facsimile apparatus to a wired LAN 125 and a wireless LAN 126, and are controlled by a wired/wireless LAN control unit 124. A LAN control unit 116 executes data processing for data exchange with a server or with terminals on the wired LAN 125 or the wireless LAN 126.

A LAN information memory 127 stores information on the user or the client on the LAN (wired LAN 125 and wireless LAN 126). The above-mentioned information is displayed on the external display unit 113 by the operation of the operation unit 112 and is selected by the operator. The operation unit 112 includes address selection means on the LAN.

Figure 17:
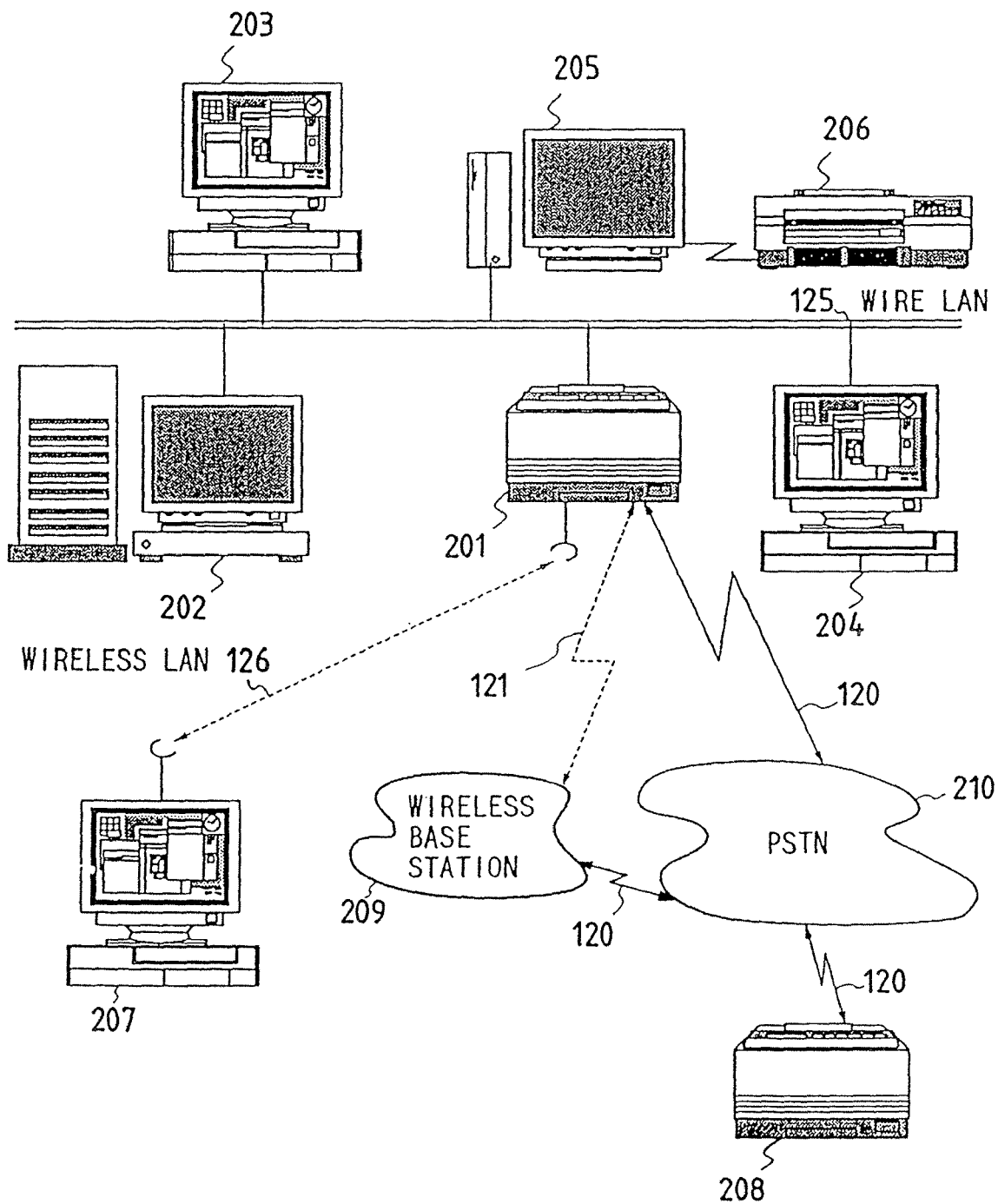
FIG. 17 is a view showing an example of network connection of the facsimile apparatus shown in FIG. 16.

FIG. 17 is a schematic view showing the form of connection of the facsimile apparatus shown in FIG. 16.

201 indicates a facsimile apparatus shown in FIG. 1, directly connectable with the wired LAN 125 and the wireless LAN 126.

A server machine 202 is provided in the wired LAN 125 and the wireless LAN 126 (hereinafter collectively called LAN) to which the above-mentioned facsimile apparatus is connected, and manages the files and protocols on the LAN. Also the process and the data for user management on the LAN are provided on the server machine 202. Besides the server machine 202 is provided with a large memory capacity.

There are further shown client machines (information processing terminals 203, 204 connected to the wired LAN 125; a printer server 205 for receiving a print request from the client machine and effecting output control to the printer; a printer 206 for printing the image data; a client machine 207 connected to the wireless LAN 126; a facsimile apparatus 208 for effecting communication with the facsimile apparatus 201 through a wired communication line 120; and a PSTN (public switched telephone network) 210 to which the facsimile apparatus 201, 208 and a wireless station 209 are connected through the wired communication line 120.

The wireless LAN 126 is composed of facsimile apparatus and client machines respectively provided with wireless LAN interfaces.

A wireless communication line 121 connects the facsimile apparatus 201 and the wireless station 209 through a wireless line interface 118.

Figure 18:
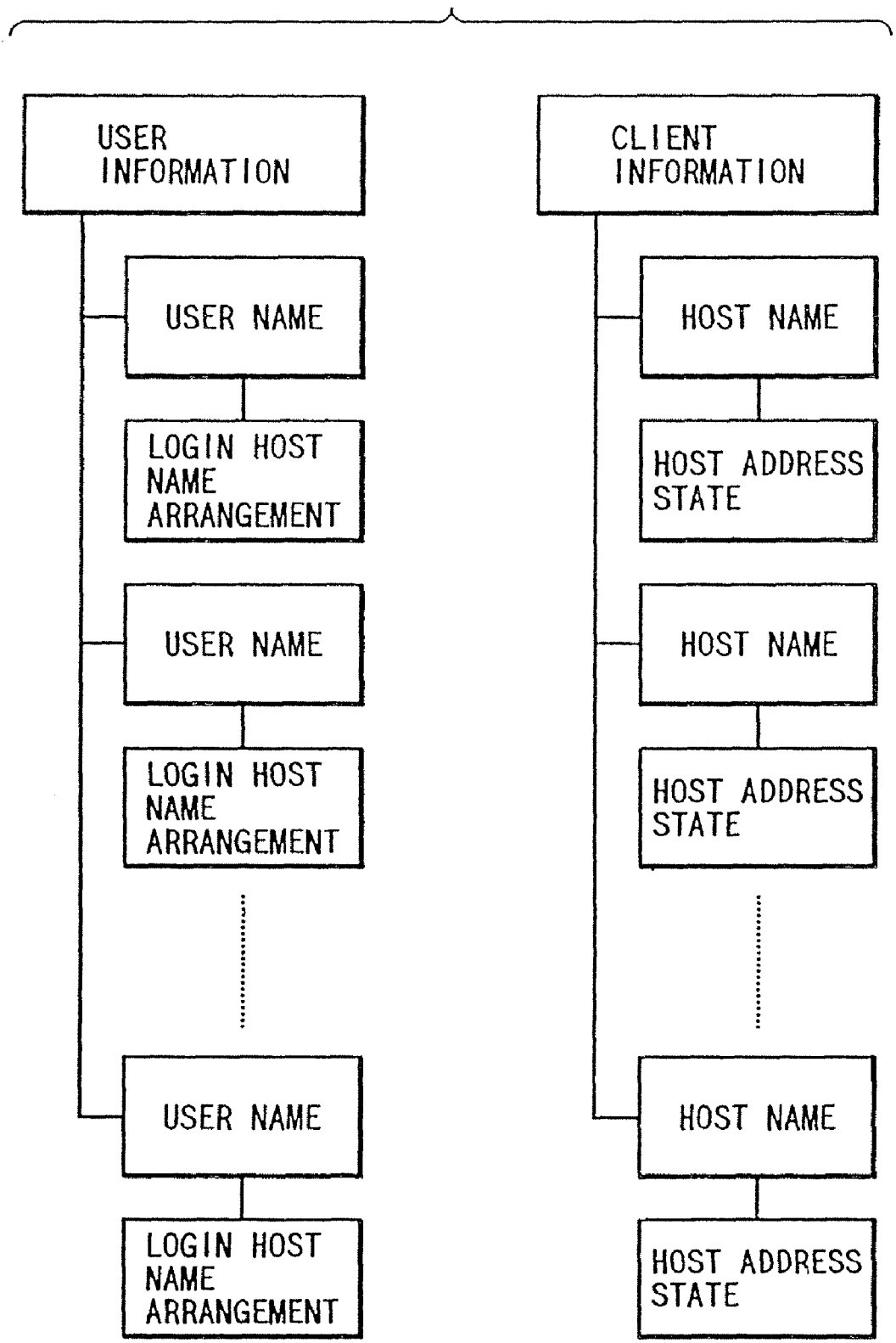
FIG. 18 is a view showing the content of information stored in a LAN information memory 127 of the facsimile apparatus shown in FIG. 16.

FIG. 18 shows the content of the user/client management information stored in the LAN information memory 127. This information is received through the communication with the server machine 202 and stored.

The user information contains the information on the users, permitted on the LAN. More specifically, for each user, there are managed a user name and a host name logged in by the user. Both the user name and the logged-in host name are text data readable by the CPU 101.

The client information contains the information on the client machines connected to the LAN. For each client, there are managed a host address of the client machine on the network and the status of the client machine. The host address is for example 123, 456, 789 or 001 in the TCP/IP protocol, and the host status is for example "connected" or "non-connected".

Figure 19:
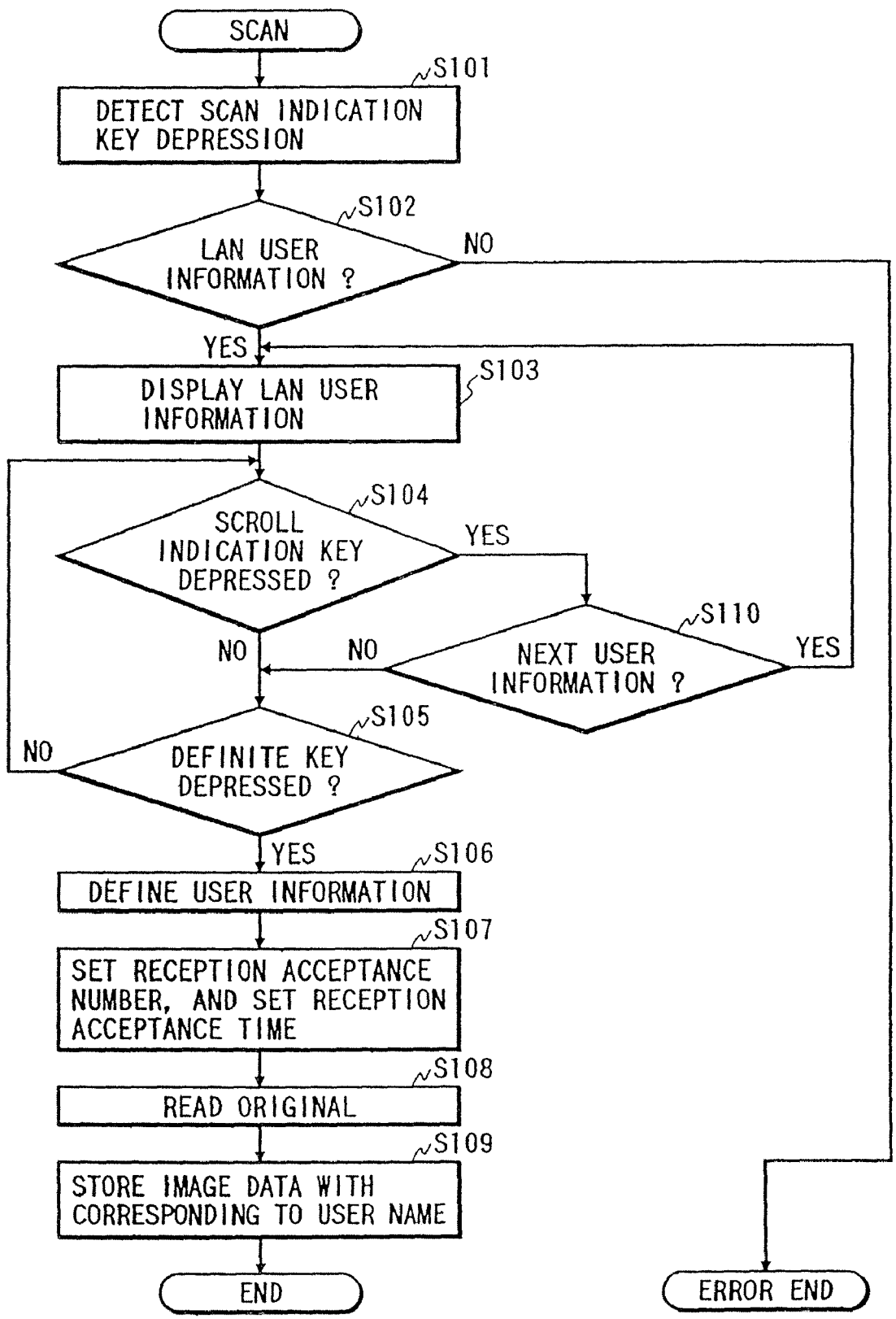
FIG. 19 is a flow chart showing a reading process of an original image in the fourth embodiment of the present invention.

FIG. 19 is a flow chart showing the control sequence of an original image scanning process in the fourth embodiment, corresponding to the operations executed by the CPU 101 according to a program stored in the ROM 102.

In the scanning process for reading an image to be transferred to a user on the LAN, there is at first detected the depression of a scanning key in the operation unit 112 (different from the instruction for ordinary copying or for reading the original for facsimile transmission) (step S101). After the detection of depression of the scanning key, there is discriminated whether the user information is stored in the LAN information memory 127 (step S102). If not, the sequence is terminated by an error. If stored, the user name of the user information stored at the top of the LAN information memory 127 is displayed on the external display unit 113 (step S103), and there are detected the depression of the scroll key and the fix key in the operation unit 112 (steps S104, S105). If the scroll key is depressed, there is discriminated whether user information is stored next to the displayed user information (step S110), and, if stored, such next user information is displayed (step S103). If there is not next user information, no operation is conducted. If the fix key is depressed, the currently displayed user information is fixed (step S106). Then, after the setting of necessary information such as a reception number and a time in the LAN information memory 127 (step S107), the original image reading is started by the scanner 111. After or simultaneous with the original reading, the read image data are stored in the image memory 104, in correspondence with the user name on the LAN, for use by the user fixed in the step S106. Also there is added information indicating the scanner 111 used for image reading (step S109). Subsequently the image data are transferred to an area, corresponding to the above-mentioned user name, in the memory managed by the server machine 202 of the LAN. Thus the logged-in user is informed of the presence of such data, and can obtain the data from the server machine 202, utilizing the client machine. It is also possible to transfer the image data from the image memory 104 to the memory of the client machine, utilizing the client name.

Figure 20:
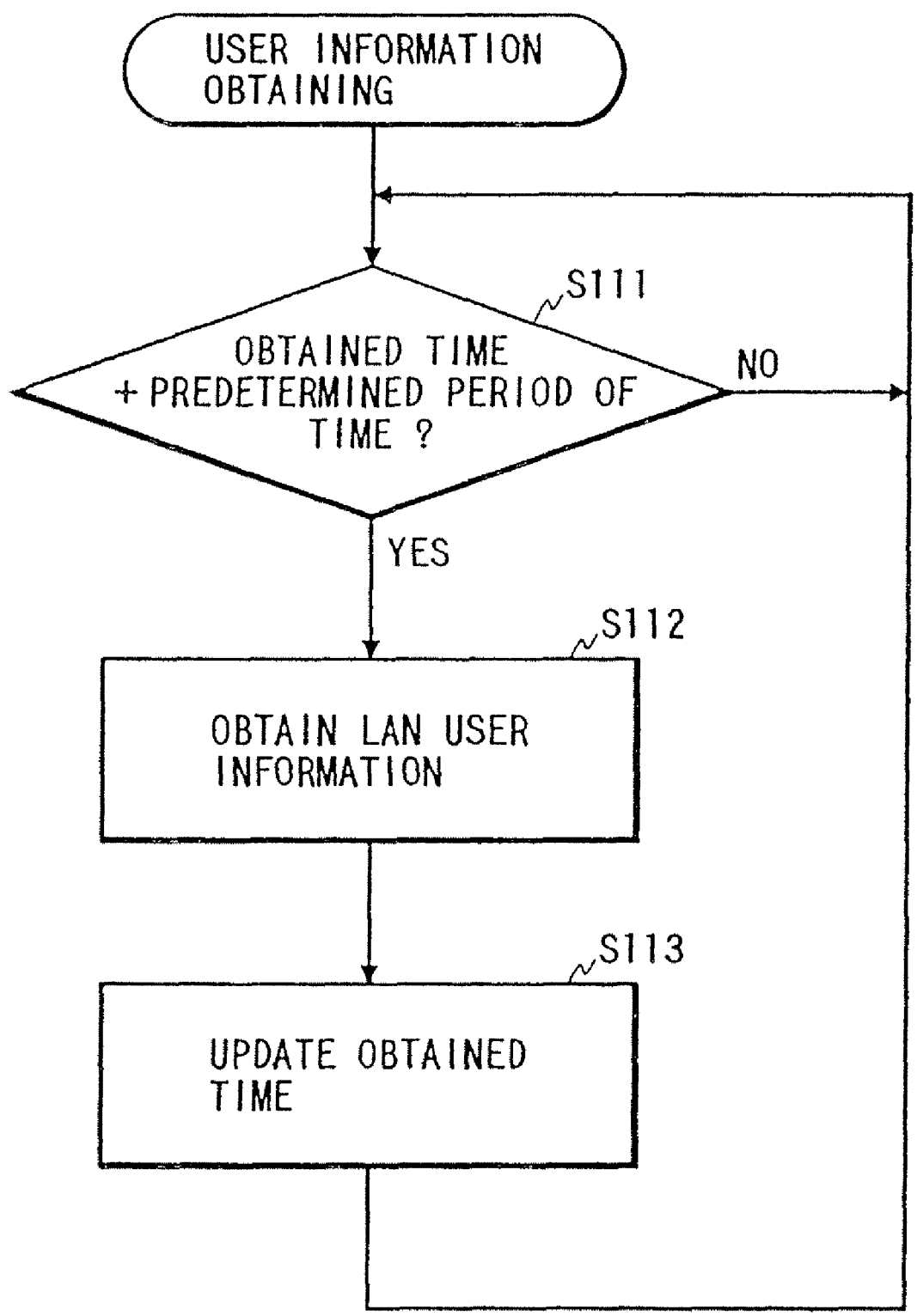
FIG. 20 is a flow chart showing an acquiring process of user information in the fourth embodiment.

FIG. 20 is a flow chart showing the method of acquiring the information on the user on the LAN.

At first there is monitored the lapse of a predetermined time from the previous acquisition of the user information (step S111). After the lapse of the predetermined time, a request is sent, for acquiring the information on the user on the LAN, to the server machine 202 and the requested information is obtained (step S112). The obtained information is stored in the LAN information memory 127 to renew the data stored therein. The user information may be obtained in classifications such as the information on all the users, new users, deleted users, altered users etc. After the acquisition of the information, the acquisition time of the user information is renewed (step S113).

Figure 21:
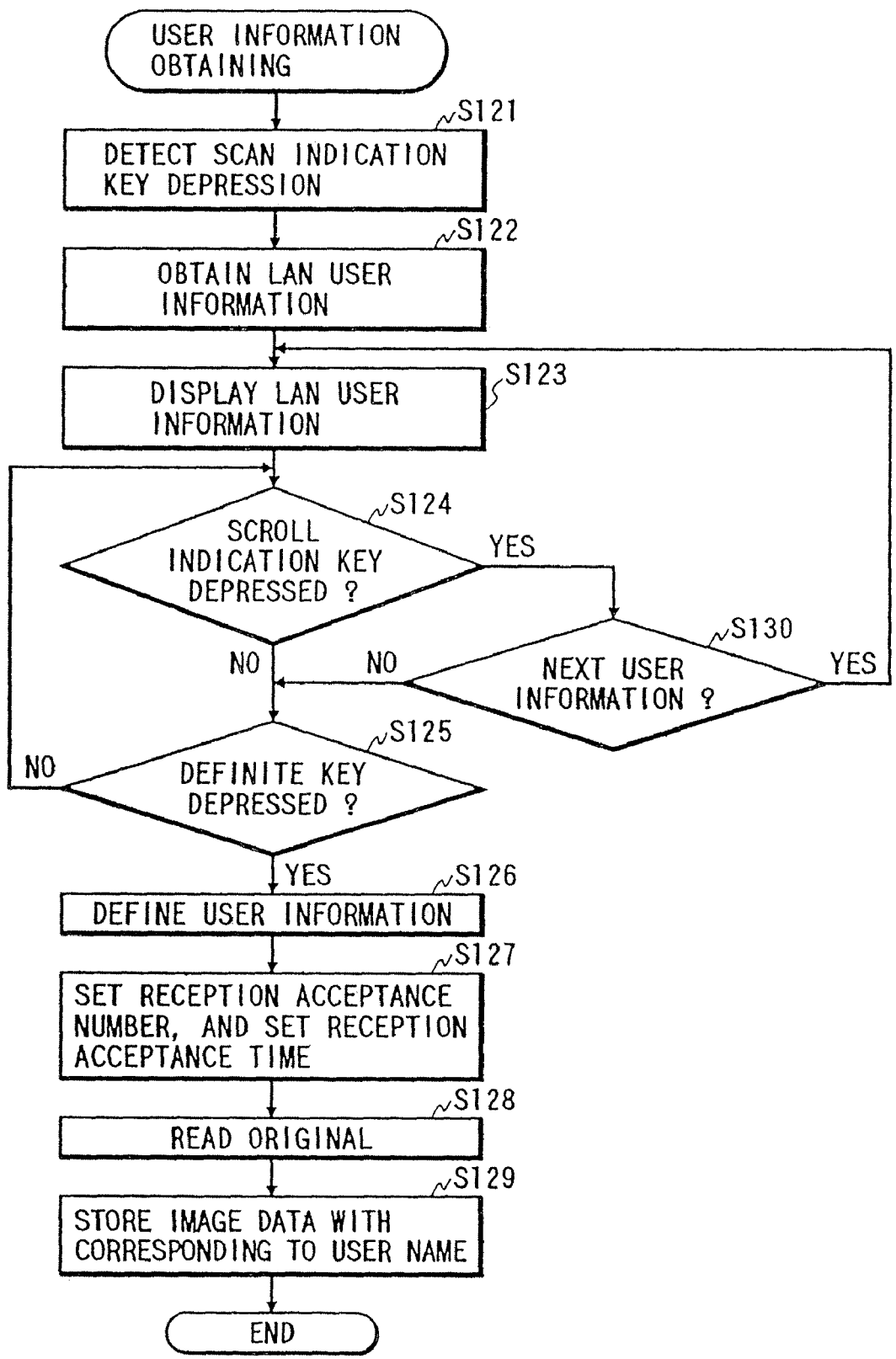
FIG. 21 is a flow chart showing another example of the reading process of the original image and the acquiring process of user information in the fourth embodiment.

FIG. 21 is a flow chart showing another example of the method for acquiring the information on the user on the LAN.

At first, in response to the detection of the depression of the scanning key, instructing the start of scanning operation, as explained in the foregoing (step S121), a request for the user information is sent to the user information managing processor of the server machine on the LAN, and the requested user information is received and stored in the LAN information memory 127 to renew the data stored therein (step S122). Subsequent steps S123 to S130 are same as the steps S103 to S110 explained in the foregoing and will not, therefore, be explained further.

Figure 22:
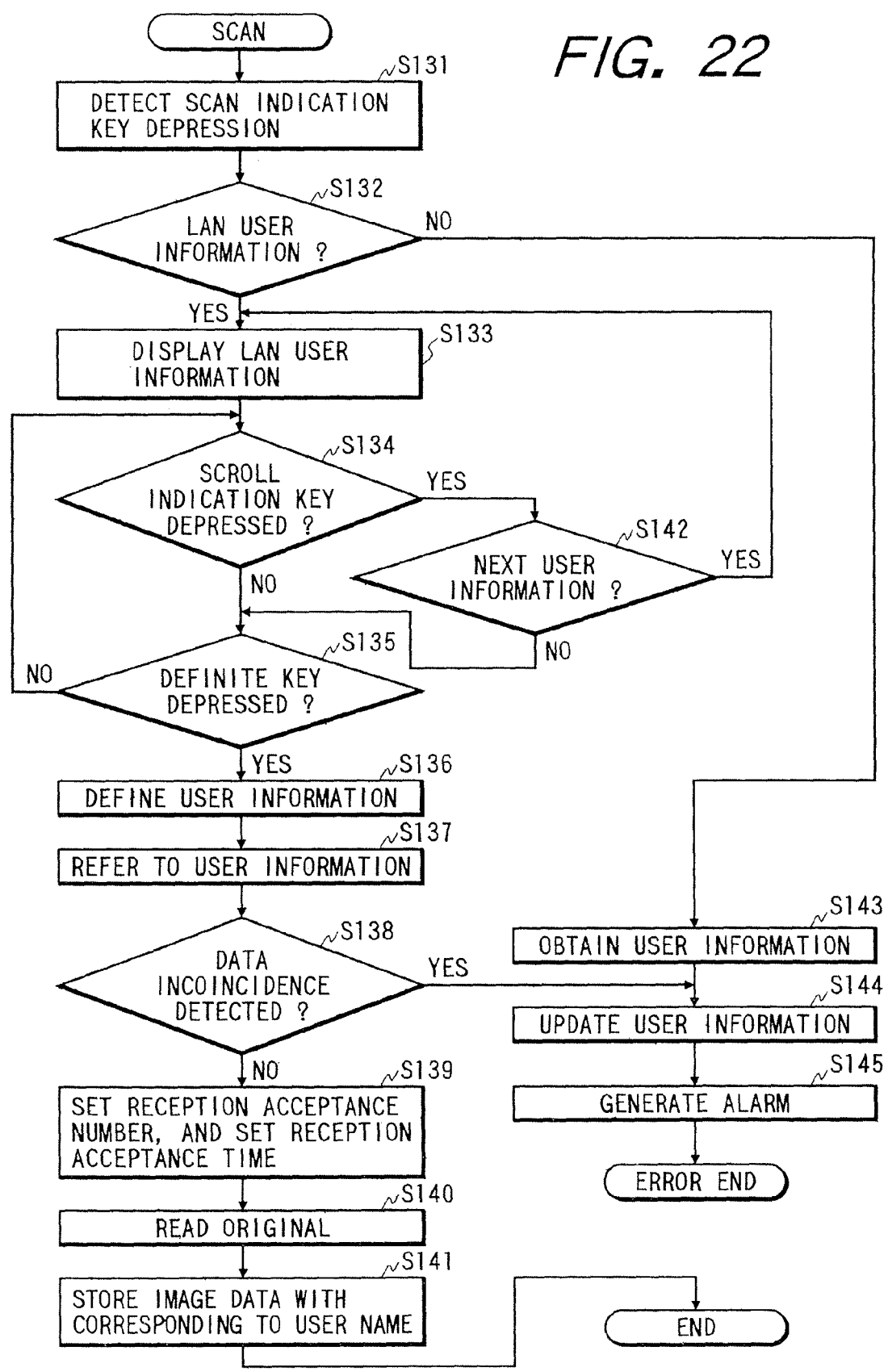
FIG. 22 is a flow chart showing still another example of the reading process of the original image and the acquiring process of user information in the fourth embodiment.

FIG. 22 is a flow chart showing still another example of the method for acquiring the information on the user on the LAN.

At first there is detected the depression of the scanning key (step S131) as explained in the foregoing. After the detection of key depression, there is discriminated whether user information is stored in the LAN information memory 127 (step S132). If not, a request for the user information is sent to the user information managing process of the server machine 202 on the LAN and the requested information is obtained (step S143). The received user information is stored in the LAN information memory 127 to renew the data stored therein (step S144). Then an alarm and display, indicating an error, are given (step S145) and the sequence is terminated by an error.

On the other hand, if the user information is stored, the user information stored at the top is displayed (step S133), and there is discriminated the depression of the scroll key and the fix key (steps S134, S135). If the scroll key is depressed, there is discriminated whether user information is stored next to the displayed user information (step S142), and, if there is such next user information, it is displayed (step S133). If there is no next user information, no operation is conducted. If the fix key is depressed, the currently displayed user information is fixed (step S136). With thus fixed user information, there is requested the reference of the user information to the user information managing process of the server machine 202 on the LAN to check the content (step S137). If the content is proper and coincides with the latest user management information (step S138), there is set necessary information such as a reception number and a time in the LAN information memory 127 (step S139), and the original reading operation is started with the scanner 111 (step S140). On the other hand, if the data do not coincide, the user information in the LAN information memory 127 is renewed according to the user information referred to in the step S137 (step S144). After or simultaneously with the original image reading operation, the read image data are stored in the image memory 104 in correspondence with the user name on the LAN, for the user fixed in the step S136 (S141). Subsequently the image data are transferred as a file to a memory area, corresponding to each user, managed by the server machine 202 of the LAN. The image data may be directly transferred to the memory of the client machine. Also the user name may be replaced by the host name of the client machine. The transfer of the image data is always executed in relation to the user name or the host name of the client machine. Also there is added information indicating the scanner 111 used for image reading.

Figure 23:
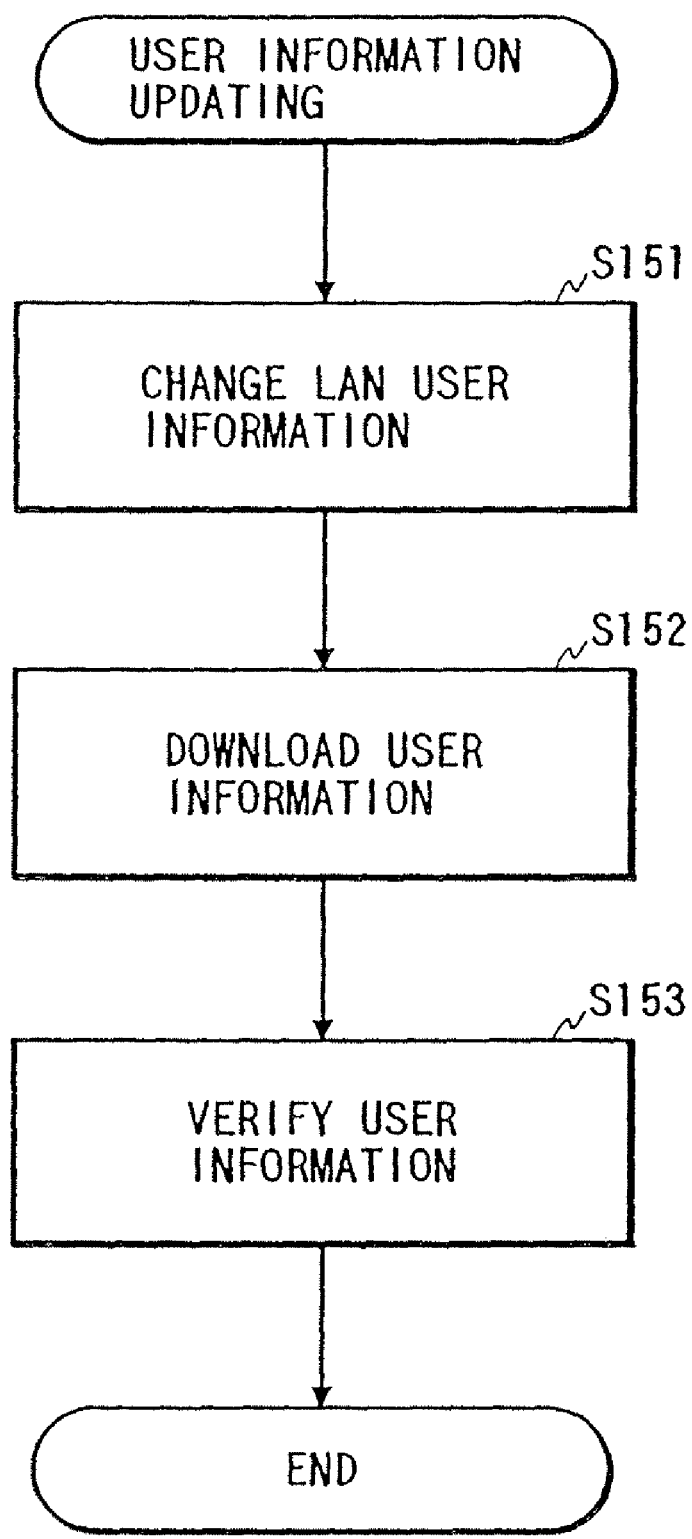
FIG. 23 is a flow chart showing the control process for renewing user information in the LAN information memory 127 in the facsimile apparatus 201, by a user information management processor in the server 202 in the fourth embodiment.

FIG. 23 is a flow chart showing the method for renewing the user information in the LAN information memory 127 of the facsimile apparatus 201, by the user information management processor of the server machine 202 on the LAN.

When a renewal operation of the user information, such as addition, alteration or deletion, is conducted (step S151), there is executed a downloading of the user data, for informing the facsimile apparatus 201 of the latest user information (step S152). The facsimile apparatus 201 stores the received data in the LAN information memory 127, and executes verification whether the data in the LAN information memory 127 coincide with the data of the management processor of the server machine 202 (step S153). In this manner the user information stored in the facsimile apparatus 201 can be maintained same as that on the LAN.

As explained in the foregoing, the present embodiment allows to designate the start of the original reading operation and the user on the LAN, to which the read image data are to be transferred, from the operation unit 112 of the facsimile apparatus 201, thereby eliminating the necessity of visiting the facsimile apparatus and the destination client machine repeatedly and thus significantly improving the operation characteristics. Also, since the read image data are correlated with the user name or the client machine of the destination, it is rendered possible to avoid undesired sojourn of the data within the network because of the unidentified destination. Furthermore, since the read image data are once stored in the image memory 104 in correlation with the user name or the client machine of the destination, the facsimile apparatus 201 can be prevented from being occupied for a prolonged time, resulting from repeated reading operations in case the destination client machine is incapable of reception for some reason. Furthermore, since the user information in the LAN information memory 127 is appropriately renewed, there can be prevented erroneous operations such as data transfer to a non-existing user. Also, since the data are associated with information indicating that the data are read with the scanner 111, the data can be easily distinguished from the data of facsimile reception.

Fifth Embodiment

The following embodiment is to perform various processing by using a digital copy machine.

Figure 24:
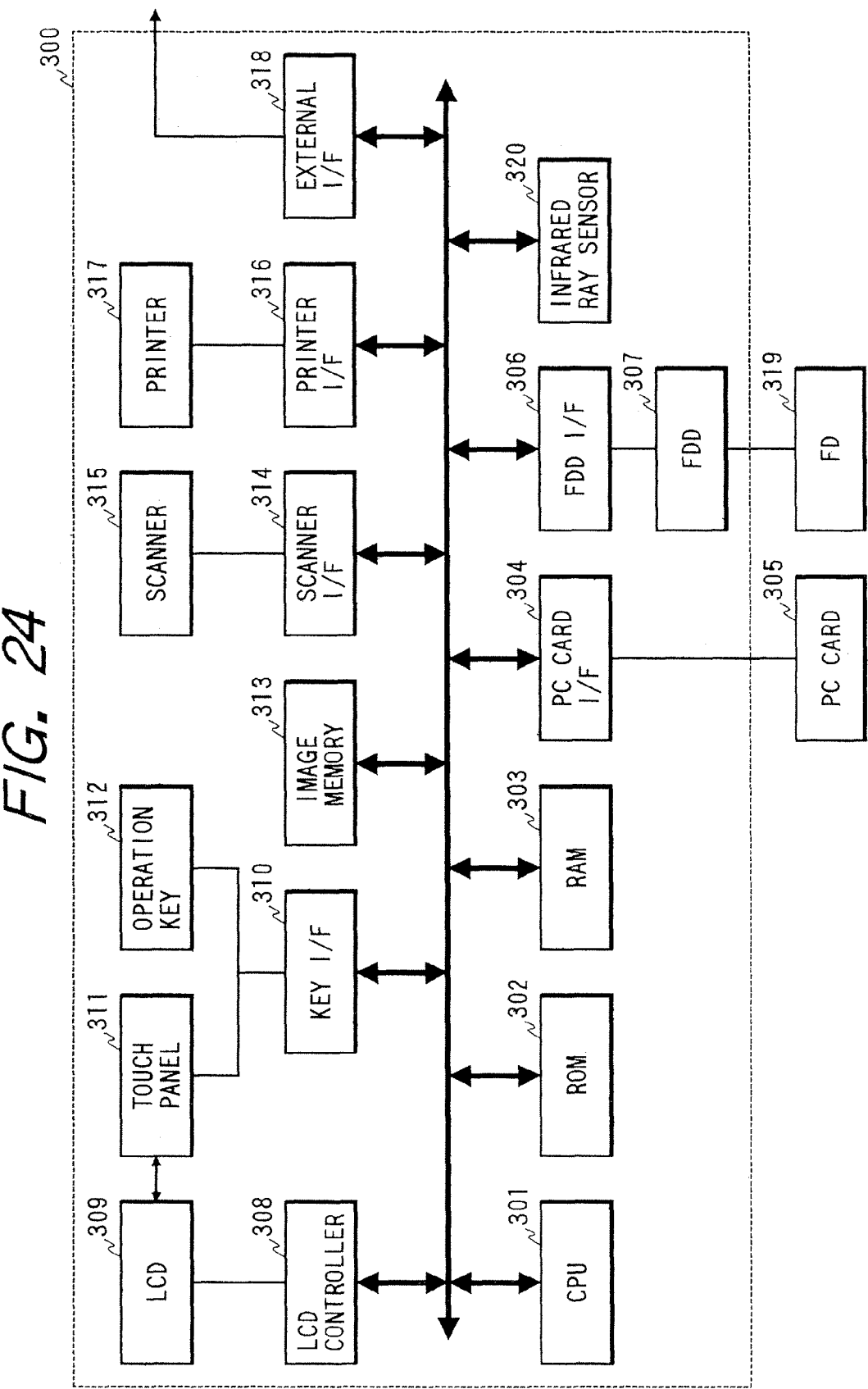
FIG. 24 is a block diagram showing the configuration of a copying apparatus constituting a fifth embodiment of the present embodiment.

FIG. 24 is a block diagram showing a schematic construction of a digital copy machine according to the fifth embodiment of the present invention.

In FIG. 24, reference numeral 300 denotes a copy machine (main body). The copy machine 300 consists of a central processing unit (CPU) 301, a read-only memory (ROM) 302, a random-access memory (RAM) 303, a PC card interface 304 for connecting a PC card, a detachable PC card 305, a floppy disk drive interface (FDD I/F) 306, a floppy disk drive (FDD) 307, a liquid crystal display (LCD) controller 308, a liquid crystal display (LCD) 309, a key input interface 310, a touch panel 311, an operation key 312, an image memory 313, a scanner interface 314, a scanner 315, a printer interface 316, a printer 317, an external interface 318, a floppy disk (FD) 319, and an infrared ray sensor 320.

The CPU 301 controls the apparatus as a whole in accordance with programs stored in the ROM 302, the RAM 303, the PC card 305 and the like. The ROM 302 constantly stores an execution program used for the control by the CPU 301 and various parameters, and consists of, e.g., a flash ROM or the like. If it is necessary to update the program or the like stored in the ROM 302, the ROM 302 can easily be updated at any time by writing thereinto updated data obtained from the mounted PC card 305, the floppy disk 319 or an external host computer via the external interface 318. The RAM 303 temporarily stores the program and data necessary for executing the program. The PC card interface 304 acts as an interface to be used for accessing the detachable PC card 305 from the CPU 301. The floppy disk drive interface 306 can read data stored in the floppy disk 319 inserted into the floppy disk drive 307 and newly write data into the floppy disk 319, by driving the floppy disk drive 307. The LCD controller 308 displays a character, a drawing and the like on the LCD 309, by receiving from the CPU 301 the data to be displayed. The touch panel 3.11 which is a pressure-sensitive transparent switch is mounted on the LCD 309 to detect a depression operation by a user. The key input interface 310 is used to read states of the touch panel 311 and the operation key 312. By combining the LCD 309 and the touch panel 311 with each other, an operation image plane can appropriately be changed according to various situations, whereby an operation unit or a console unit which is easy to be used by the user can be provided. The image memory 313 stores image data to be input/output by the scanner 315 and the printer 317. The scanner 315 and the printer 317 manage a command and the image data via the scanner interface 314 and the printer interface 316, respectively. The scanner 315 reads an original image by scanning an original placed on an original support plate. The printer 317 prints out the image data which is received via the external interface 318. Further, the printer 317 prints out the image read by the scanner 315, thereby copying the original. The external interface 318 is an interface to be used for communicating to one or plural computers, e.g., a personal computer, a work station and/or the like, which are placed outside the copy machine 300. The infrared ray sensor 320 is a sensor to be used for detecting whether or not an operator stands nearby the operation unit (the LCD 309, the touch panel 311 and the operation key 312) of the copy machine 300.

Figure 25:
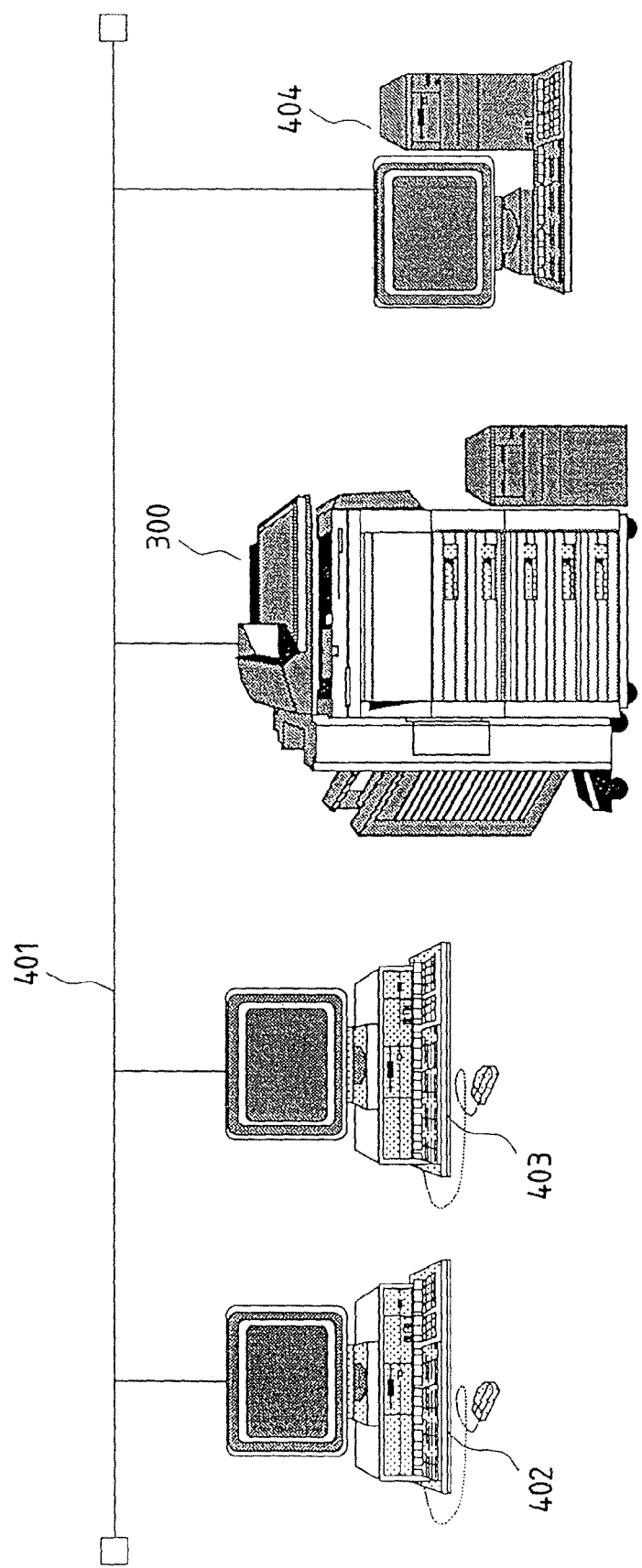
FIG. 25 is a view showing an example of connection of the copying apparatus 300 shown in FIG. 24.

FIG. 25 shows an example of the configuration in a case where the copy machine 300 in FIG. 24 is connected to a local area network (LAN). The copy machine 300 can act as a well-known digital copy machine such as a local copier and further send/receive the data to/from other devices in the LAN.

In FIG. 25, reference numeral 401 denotes a LAN which forms a network to which a plurality of computers, copy machines, facsimile machines, scanners, printers and the like are connected and in which data sending and receiving are performed among these devices.

Reference numerals 402, 403 and 404 denote personal computers which are connected to the LAN 401. However, computers which can be connected to the LAN 401 are not limited to these three computers 402, 403 and 404, but various computers can also be connected to the LAN 401.

Figure 26:
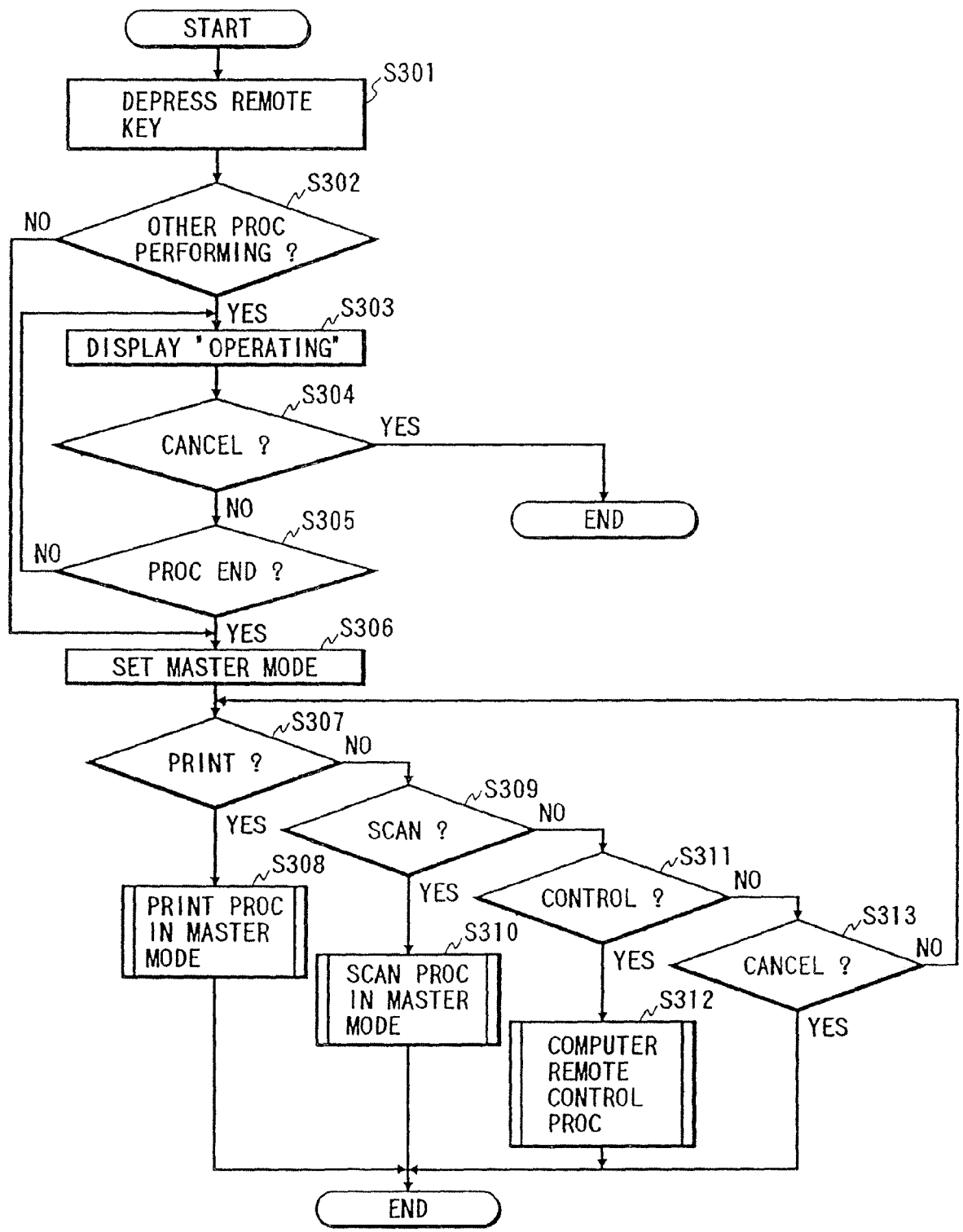
FIG. 26 is a flow chart showing the control sequence of the copying apparatus 300 of the fifth embodiment.

A process in case of accessing the external computer from the copy machine 300 will then be explained on the basis of a flow chart shown in FIG. 26. This flow chart is executed based on a program stored in the ROM 302. However, this flow chart can also be executed based on a program which is read from the PC card 305 or the floppy disk 319, or is sent via the external interface 318. It should be noted that the copy machine 300 has a slave mode and a master mode. In the slave mode, the copy machine 300 operates based on an instruction from the external computer. In the master mode, the computer is accessed from the operation key 312 of the copy machine 300, so that the copy machine 300 prints out a file stored in the computer by using the printer 317, and transfers data read by the scanner 315 to the computer.

Further, in the slave mode, the printer 317 is operated in response to a print order from the external computer to print out image data sent from the external computer, and the scanner 315 is operated in response to a scan start order for reading operation sent from the computer to read an image of an original and then to transfer the read image data to the computer. On the other hand, in the master mode, the copy machine 300 specifies or accesses the computer by depressing a remote key of the operation key 312 and then starts a process. This process will be explained in detail, hereinafter.

In FIG. 26, when the remote key is depressed in a step S301, it is judged in a step S302 whether or not another process is being performed. If the another process is being performed, the flow advances to a step S303. In the step S303, the LCD 309 displays that the another process is being performed, to notify the operator that, in such a state, a different process in the master mode cannot start. Then, in a step S304, it is displayed to inquire the operator whether or not the remote key depression should be cancelled. If a cancel is selected by the touch panel 311, the display state of the LCD 309 returns to an initial state. If the cancel is not selected, in a step S305, a stand-by state starts and is maintained until the another process presently performed terminates. When it is judged that the presently-performed another process terminates (in this case an alarm sound is generated), or if it is judged in the step S302 that the another process is not being performed, the displaying of the LCD 309 that the another process is being performed or the displaying of the LCD 309 indicating the initial state is switched to the displaying shown in FIG. 27, in order to set the master mode in a step S306.

Figure 27:
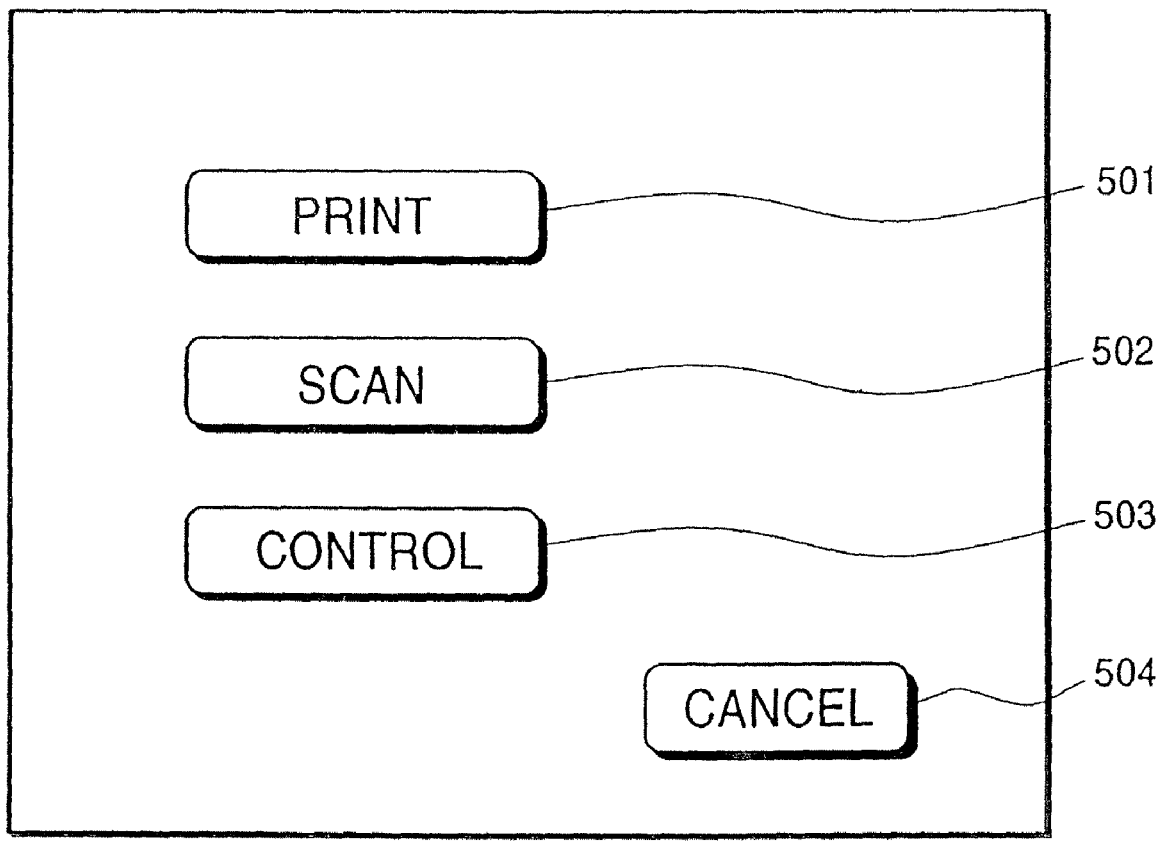
FIG. 27 is a view showing a display image for selecting the contents of process of the fifth embodiment.

In FIG. 27, a print button 501 is used for performing a print process in the master mode, a scan button 502 is used for performing a scan process in the master mode, a control button 503 is used for performing a remote control process of the computer, and a cancel button 504 is used for cancelling the process in the master mode. By depressing respective positions at which the buttons are displayed on the LCD 309, coordinates of pixels on the touch panel 311 are detected, and then it is judged by the CPU 301 via the key interface 310 which position of the button is depressed.

If it is judged in a step S307 that the print button is depressed, the flow advances to a step S308 to perform the print process in the master mode. If it is judged in a step S309 that the scan button 502 is depressed, the flow advances to a step S310 to perform the scan process in the master mode. If it is judged in a step S311 that the control button 503 is depressed, the flow advances to a step S312 to perform the remote control process of the computer. If it is judged in a step S313 that the cancel button 504 is depressed, the master mode is cancelled and the displaying of the LCD 309 returns to the initial state.

Then, the process in a case where the print button 501 is depressed in the step S307 of FIG. 26 will be explained hereinafter on the basis of the flow charts shown in FIGS. 28 and 29.

Figure 30:
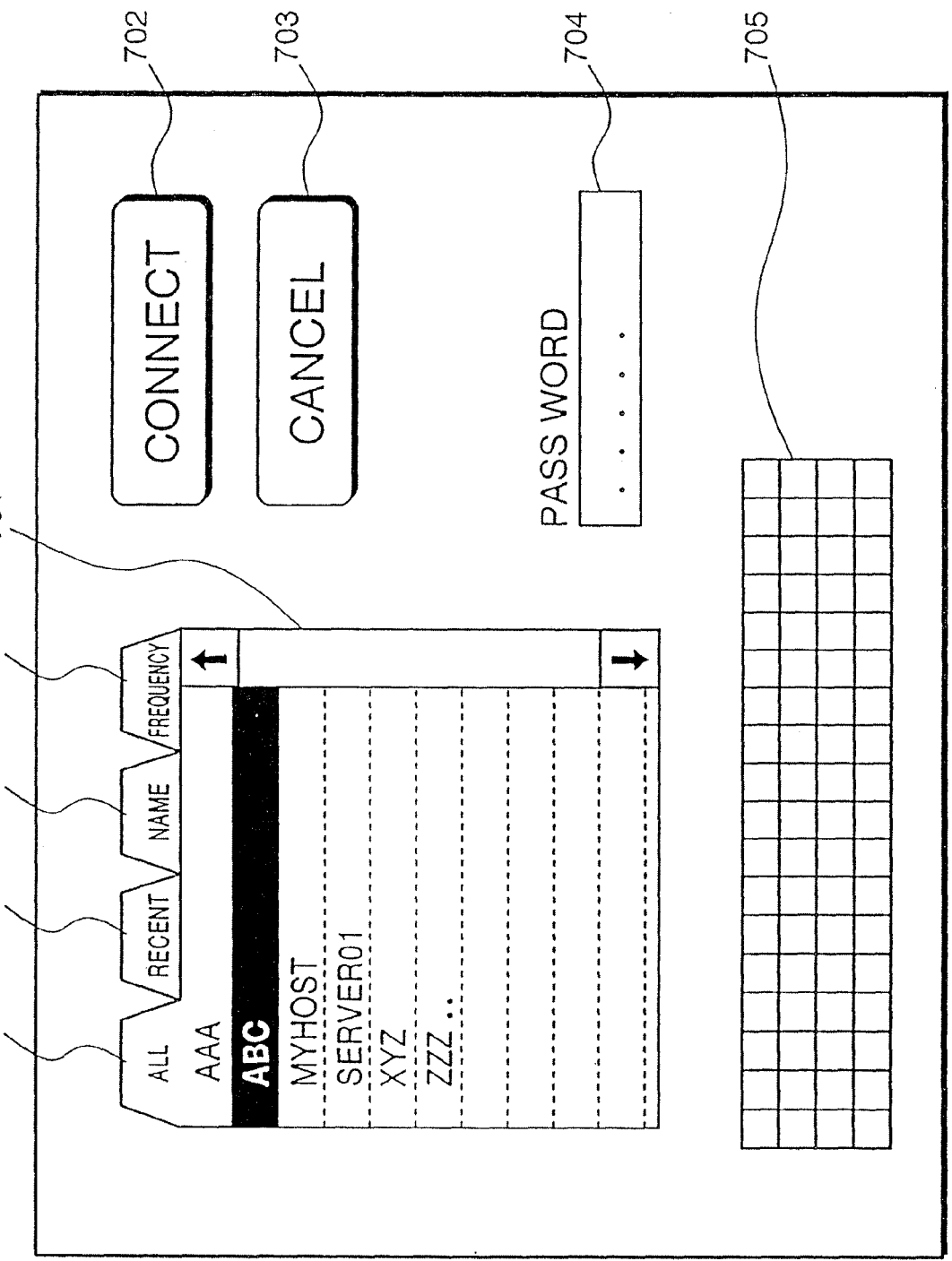
FIG. 30 is a view showing a display image for selecting computers in the fifth embodiment.

When the print button 501 is depressed in the step S307 of FIG. 26, the displaying of the LCD 309 is changed to that shown in FIG. 30.

In FIG. 30, a list 701 shows a list of the computers connected to the LAN 401, a connection button 702 is used to start an access to the computer, a cancel button 703 is used to cancel the print process, a password display column 704 shows an input password, a character palette 705 is used to input a character and the like, a tab 706 is used to display all of the accessible computers, a tab 707 is used to display the computer which has most-recently been accessed, a tab 708 is used to display the computers which had previously been accessed, in the order of name (i.e., in the order of smaller code number), and a tab 709 is used to display the computers which are frequently or often accessed.

When the print button 501 is depressed in the step S307 of FIG. 26, the CPU 301 forms the list of registered names of the computers accessible by inquiring a predetermined computer (e.g., a server or the like) connected to the LAN 401 via the external interface 318, and then displays as the list 701 of FIG. 30 in a step S501. This displaying corresponds to a state where the tab 707 for displaying all of accessible host computers is being selected. Then, in a step S502, the position at which the desired computer is displayed in the list 701 is depressed to select the desired computer. In this case, a name of the selected computer ("ABC" in FIG. 30) is inverse displayed. Then, in a step S503, a password corresponding to the computer selected in the step S502 is input by means of a character list of the character palette 705. The input password is displayed on the password display column 704 in a form of invisible character (or turned letter), so that an input operation can be confirmed. If an erroneous character is input when inputting the password, the input erroneous character can be deleted in unit of character by depressing a deletion key included in the character palette 705. In the above operation, the order of computer selection and password input may arbitrarily be set.

When both the computer selection and the password input terminate, in a step S504, the CPU 301 communicates with the selected computer on the basis of a network address in the LAN 401 by depressing the connection button 702, to confirm the password. Then, it is judged in a step S505 whether or not the input password coincides with a registered password, i.e., whether or not the input password is correct or not. If it is judged in the step S505 that the input password is correct, the selected computer can be accessed and the connection is established. Thereafter, the flow advances to a step S507. On the other hand, if the input password does not coincide with the registered password whereby it is judged that the input password is not correct, an error display is performed in a step S506, and the flow returns to the step S501. If the connection is established, information relating to the computer to which the connection is established is stored in a certain area, in the step S507. That is, the information relating to a name of the connected computer, a time when the access is performed, the number of previously-accessed times and the like is stored. Preferably, a storage media to which the information is stored is the RAM 303. However, a partial area of the ROM 302, the PC card 305 or the floppy disk 319 can also be used as the storage media.

As mentioned above, it has been explained the case where a destination to which the connection is performed is selected from among all of the connectable computers. However, it will be explained hereinafter a case where the destination to be connected is selected from among the computers to which the connection had previously been performed.

Figure 37:
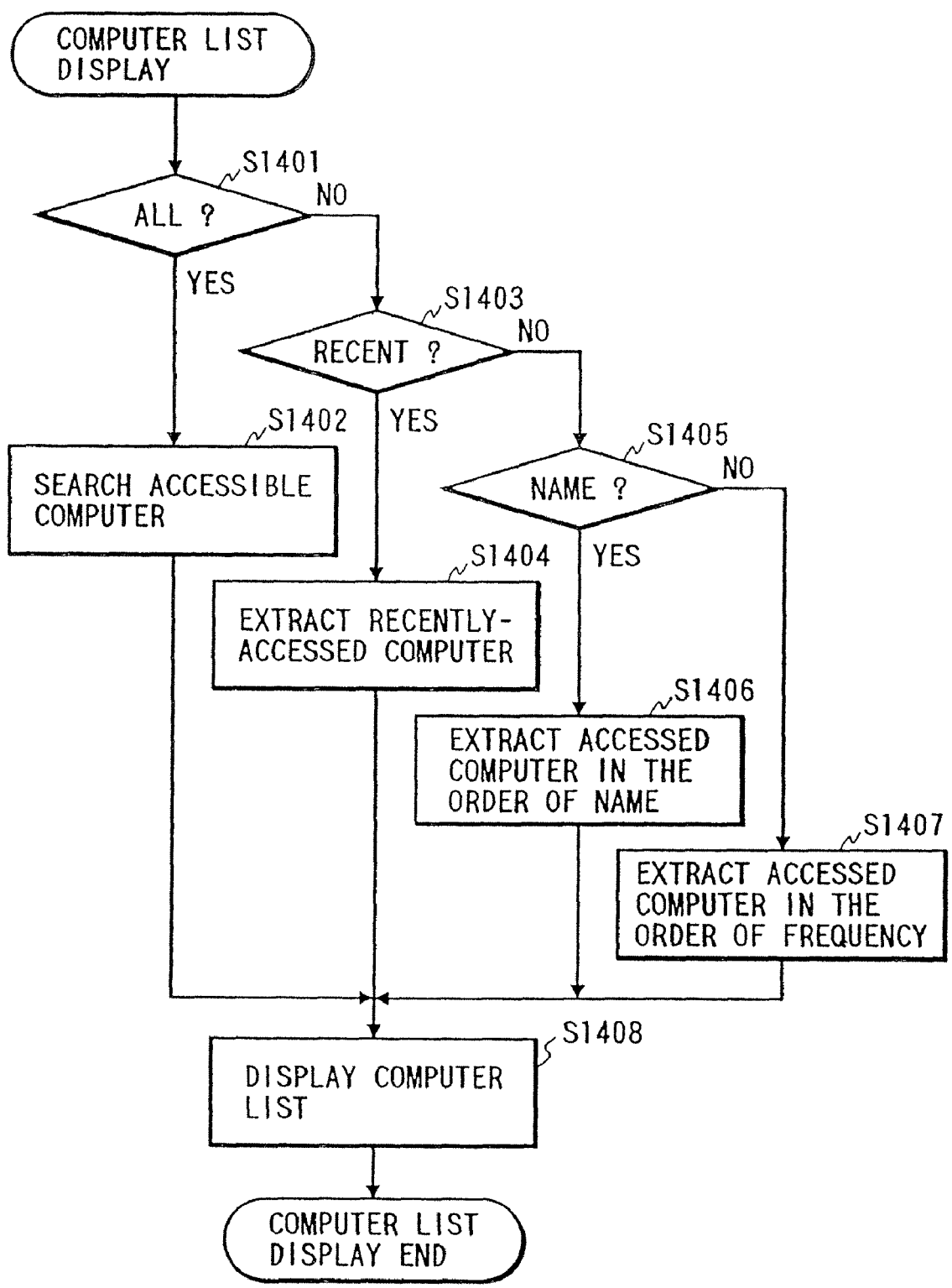
FIG. 37 is a flow chart showing a selection process of the computer in the master mode of the copying apparatus 300 in the fifth embodiment.

In the present embodiment, a display mode of the computer is changed by selecting the tabs 706, 707, 708 and 709 in accordance with a flow shown in FIG. 37. That is, if the tab 706 showing all of the accessible computers is being selected in a step S1401, the computers connected via the external interface 318 are searched in a step S1402, and then the list of the accessible computers is formed and displayed in a step S1408. If the tab 707 showing the most recently-accessed computer is being selected in a step S1403, the information relating to the previously-accessed computers is searched so that the computers are sequentially listed in the most recently-accessed order in a step S1404. Then, the formed list is displayed in the step S1408. If the tab 708 showing the previously-accessed computers (or showing the computers which have previously-accessed experience) in the order of name is being selected in a step S1405, it is formed in a step S1406 the list in which names of the previously-accessed computers are arranged in the order of name (i.e., the order of code), and then the formed list is displayed in the step S1408. If the tab 709 showing the frequently-accessed or often-accessed computers is being selected, it is formed in a step S1407 the list in which the previously-accessed computers are listed in the order of higher frequency, and then the formed list is displayed in the step S1408. According to the above operation, from among all of the accessible computers or the previously-accessed computers, the computer lists can be shown under a desired condition on the basis of a user's instruction and then the user can select the desired computer.

Figure 31:
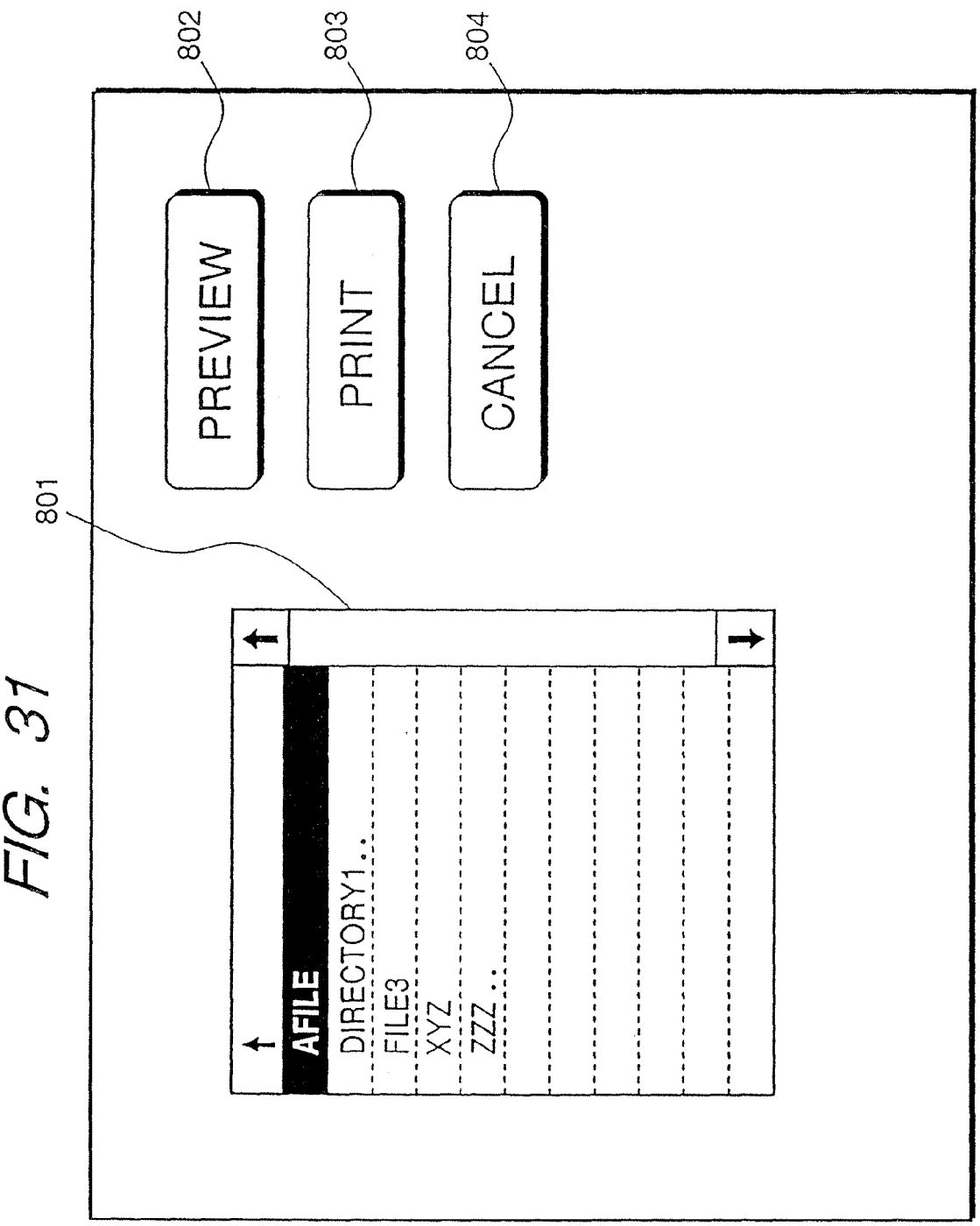
FIG. 31 is a view showing a display image for selecting files in the fifth embodiment.

When the selected computer is accessed according to the above procedure to establish the connection, the displaying of the LCD 309 is changed to that shown in FIG. 31.

In FIG. 31, a list 801 shows files which are managed by the selected computer, a preview button 802 is used to display an image of the selected file, a print button 803 is used to print out the image of the selected file, and a cancel button 804 is used to return a present image plane to the image plane used for computer selection shown in FIG. 30.

Figure 28:
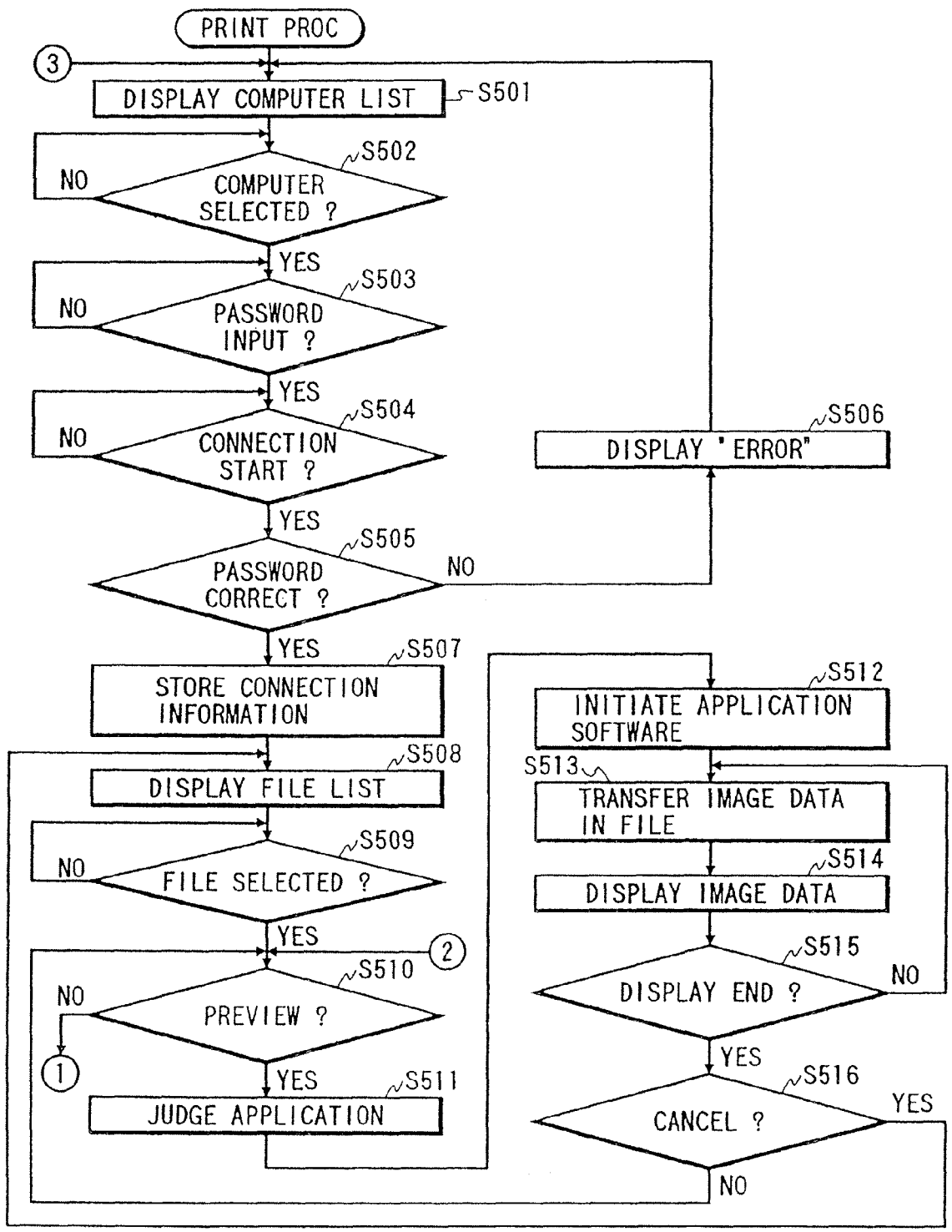
FIGS. 28 and 29 are flow charts showing a print process by a master mode of the copying apparatus 300 of the fifth embodiment.
Figure 29:
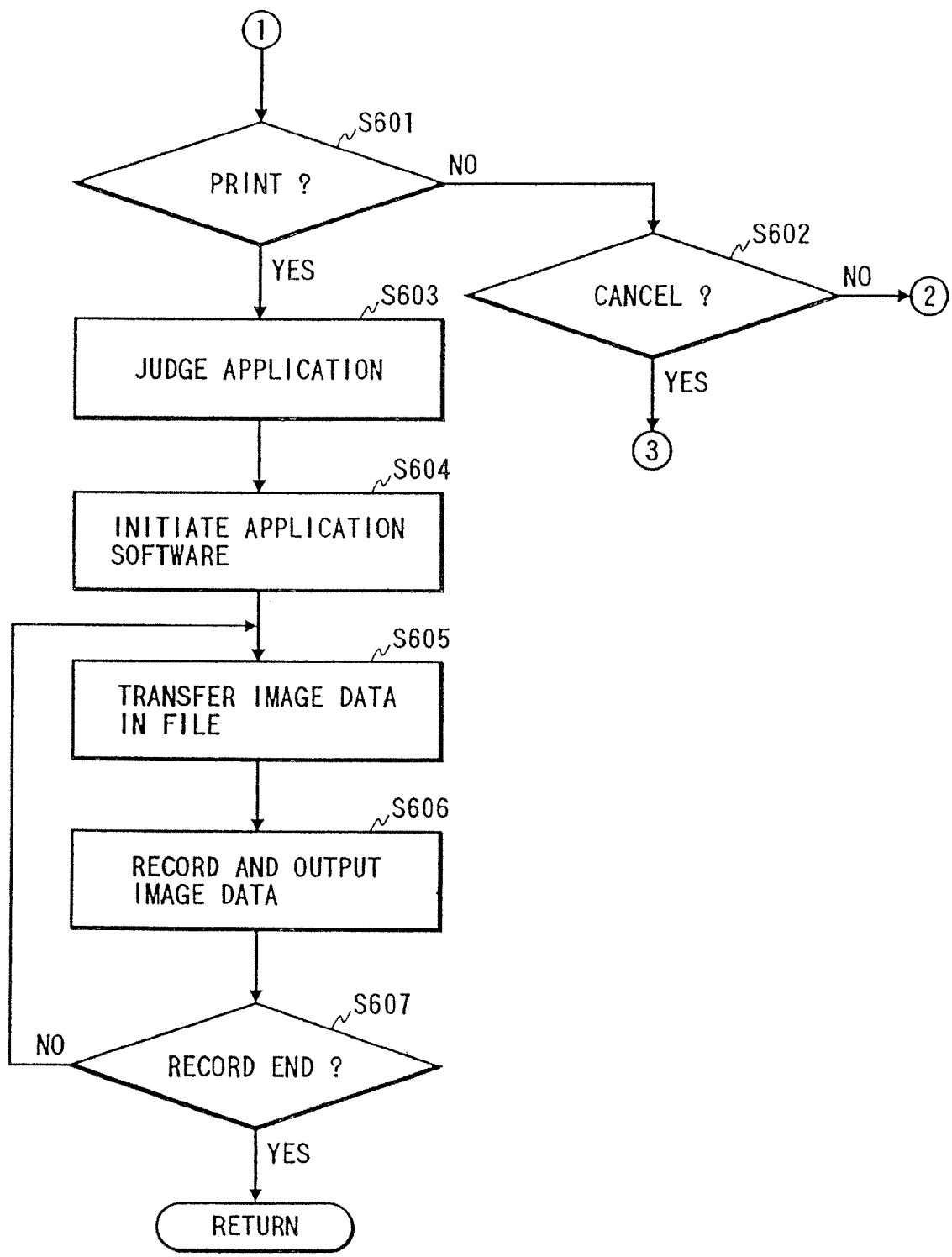

In a step S508 of FIG. 28, the file list is displayed as shown in the list 801 of FIG. 31. If the list does not exist in a directory including an objective file, the directory can be shifted by selecting a sub-directory (marked as ".." in FIG. 31) or an upper directory (marked as "↑" in FIG. 31).

When a position of the desired file in the file list is depressed in a step S509, a name of the depressed file is reverse displayed and the file is selected. When the file is selected, it is judged in a step S510 whether or not the preview button 802 is depressed. When depressed, in a step S511, the accessed computer is instructed to discriminate an application software which is used to form that file, on the basis of the selected file name. Further, in a step S512, the discriminated application software starts, and the data in the selected file is read out as bit map data. Then, in a step S513, the image data in the bit-mapped desired file is transferred, and the transferred image data is displayed on the LCD 309 in a step S514. In this case, an upper portion of first page is initially displayed, then a following portions are sequentially displayed in response to operations of a scroll key, a next page key, an entire display key (i.e., used for displaying a compressed one page) and the like (not shown). When the displaying terminates in a step S515, the flow waits for a next key input. When a cancel key (not shown) is depressed in a step S516, the flow returns to the step S508 to display the file list. If the cancel key is not depressed, the flow again waits for the depression of any one of the preview button 802, the print button 803 and the cancel button 804. Then, if it is judged in a step S601 that the print button is depressed, high-resolution image data for printing the selected file is transferred in steps S603 to S605 according to the same procedure as that shown in the steps S511 to S513. The transferred image data is printed out by the printer 317 in a step S606. It should be noted that the image data transferred in the step S513 or S605 is resolution converted if necessary.

On the other hand, if it is judged in the step S602 that the cancel button 804 is depressed, the flow returns to the step S501 to display the computer list.

Figure 32:
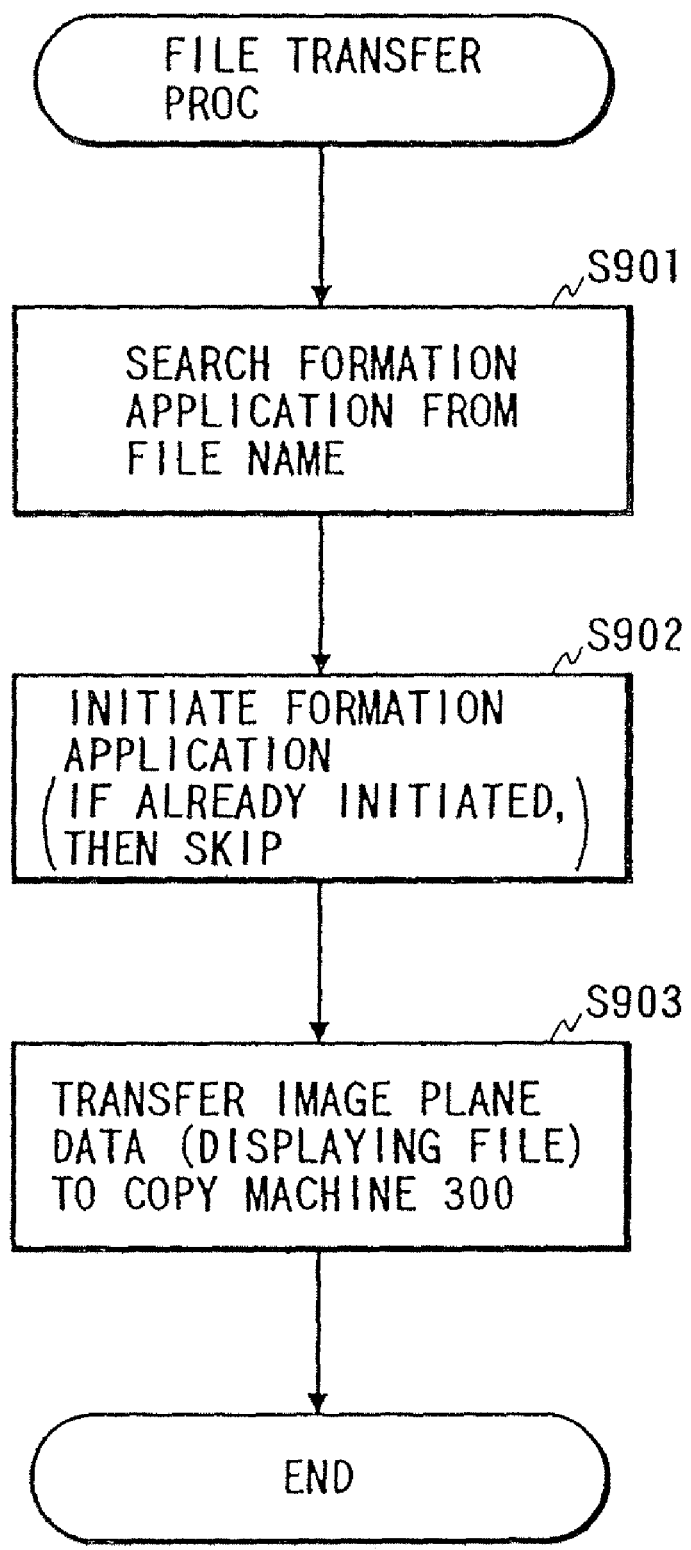
FIG. 32 is a flow chart showing a file transfer process in the computer in the fifth embodiment.

FIG. 32 is a flow chart showing an execution sequence at a computer side on the LAN 401. This execution sequence relates to the file transferring based on the instructions from the copy machine 300 in the steps S501 to S513 and the steps S603 to S605. If there are the instructions as in the steps S511 and S603, it is checked in a step S901 which application software is used to form the designated file, by referring the file held at the computer side and a data base corresponding to the application software used for forming the held file. Then, in a step S902, if the application software does not yet start the application software starts to read the designated file. Thereafter, in a step S903, the displayed image plane, e.g., window contents of a word processor, is obtained to generate data for the printing, and the generated data is transferred to the copy machine 300.

According to the above operation, a copy machine 300 side can obtain data of the image plane relating to the file contents displayed on the computer. Thus, even if the computer side has the file of any form, the copy machine 300 side receives the bit-mapped data, whereby the displaying and the printing of the received data can be performed at the copy machine 300 side.

It will be explained hereinafter a case where the user explicitly releases the accessing.

As explained above, since the operation can be returned to the one-previous operation by depressing the cancel button in each operation image plane, it is possible as one method to release the accessing by repeating the same operation. On the other hand, in the present invention, there is provided as the other (more easy) method a key for releasing the accessing.

FIG. 38 is a view showing an outer configuration of a console unit (including the LCD 309, the touch panel 311 and the operation key 312) of the copy machine 300 of the present invention. In FIG. 38, reference numeral 1501 denotes a display unit consisting of the LCD 309 and the touch panel 311, reference numeral 1502 denotes a reset key, reference numeral 1503 denotes a remote key (previously explained), reference numeral 1504 denotes a preheat key, reference numeral 1505 denotes a start key, reference numeral 1506 denotes a ten key and reference numeral 1507 denotes a stop key. It should be noted that these keys are hard keys which together construct the operation key 312. Each of the remote key 1503 and the preheat key 1504 has, at its upper portion, an LED display unit to show a presently-set operation mode.

The display unit 1501 displays an operation panel for the user in accordance with the above-mentioned various cases, to accept the user's key input. The reset key 1502 is a key which is used to return all of the presently-set various setting states to the initial setting state.

In the state where the computer is being accessed via the external interface 318 by depressing the remote key 1503, the CPU 301 turns on an LED of the remote key 1503. Therefore, the user can easily recognize that a computer access mode is being set. In the computer access mode, if the user wishes to release the accessing, he can obtain the same effect by using several keys in addition to the sequential depressing of the cancel key. That is, when the reset key 1502 is depressed, it is meant by this depressing that the user indicates to return the setting mode to the initial state. Therefore, the CPU 301 terminates the communication with the computer and returns the display unit 1501 to the initial image plane. When the preheat key 1504 is depressed, the copy machine 300 turns off a main power source to come to be in a preheat mode. In the preheat mode, to hold the computer accessing is meaningless, so that the accessing is similarly released and then the copy machine 300 comes to be in the preheat mode. When the remote key 1503 is again depressed in a state where the LED of the remote key 1503 is being turned on, it is meant by this depressing that the user indicates to access an other new computer. Therefore, the CPU 301 releases the accessing for the computer presently accessed.

As explained above, since the accessing can directly be released based on the instruction from the operation key 312, the user can immediately release the accessing if necessary.

Then, in a case where a standby state of the copy machine 300 continues for a predetermined period of time because the user does not operate the copy machine 300 for a long period of time, i.e., in a case where a setting mode reset timer or a preheat timer operates, if it is maintained the state that the computer is being accessed, the CPU 301 releases the accessing without any instruction by the user and operates to come to be in a mode reset state or in the preheat mode.

Further, when the infrared ray sensor 320 detects that the user does not stand nearby the copy machine 300 and the copy machine 300 is in the standby state for the predetermined period of time after terminating the designated operation, the present accessing is released and the copy machine 300 comes to be in the standby state in order to prevent a situation that a next user directly accesses the computer.

The above-explained various methods for releasing the accessing are also effective in a case where an operation explained below is being performed.

Figure 33:
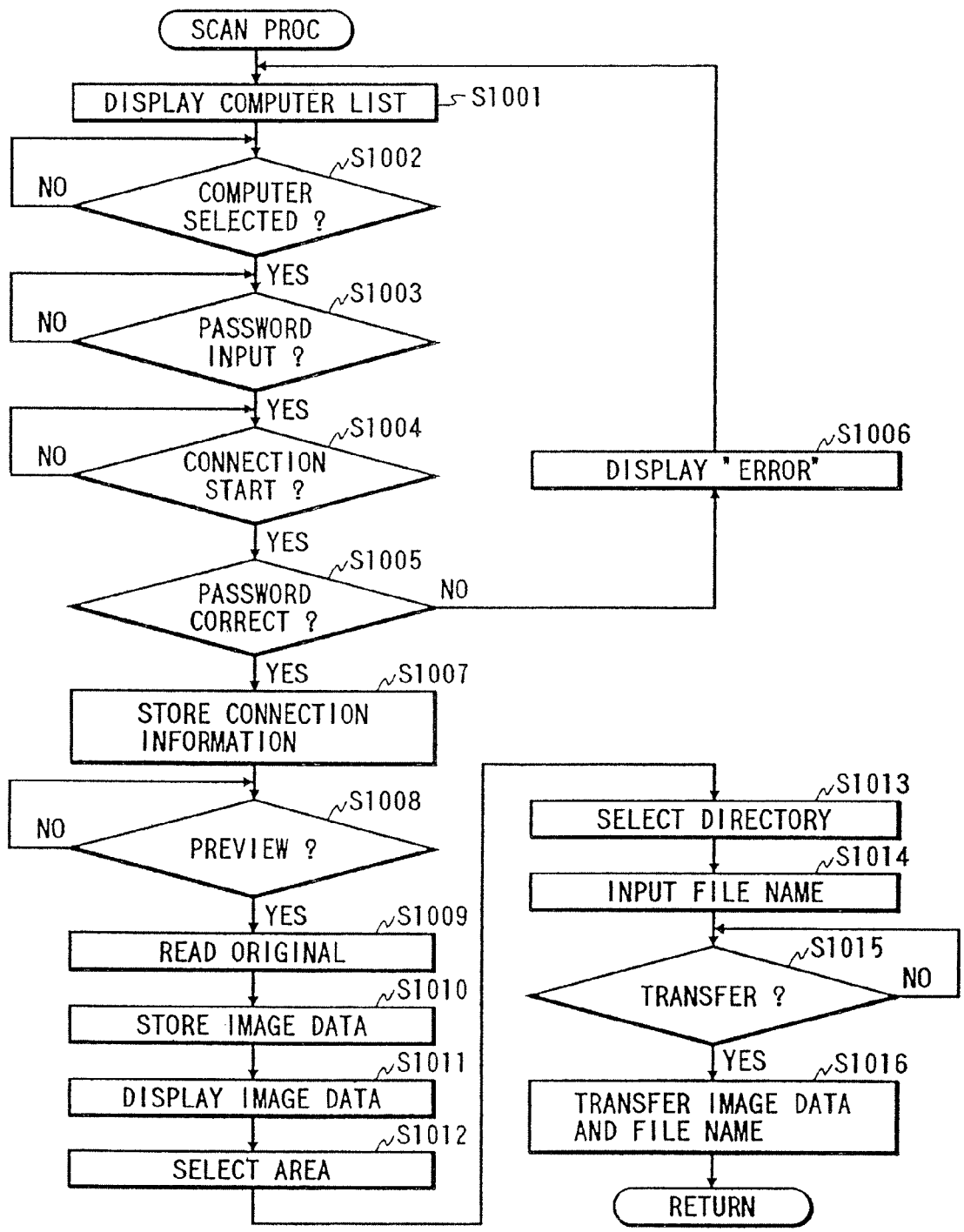
FIG. 33 is a flow chart showing an original image reading process in the master mode of the copying apparatus 300 in the fifth embodiment.

It will be explained hereinafter a flow of processing in case of depressing the scan button 502 in the step S309 of FIG. 26, on the basis of the flow chart shown in FIG. 33.

When the scan button 502 is depressed in the step S309 of FIG. 26, the displaying of the LCD 309 is changed or switched to that shown in FIG. 30.

In the processing, a procedure for accessing the computer shown in steps S1001 to S1005 is the same as that shown in the previously-explained steps S501 to S505, so that the detailed explanation thereof is omitted.

When the connection with the computer is established by selecting and accessing the computer, same as in the step S507, information concerning the computer to which the connection is established is stored in a step S1007. Then, the flow advances to a step S1008 to switch the displaying of the LCD 309 to that shown in FIG. 34.

Figure 34:
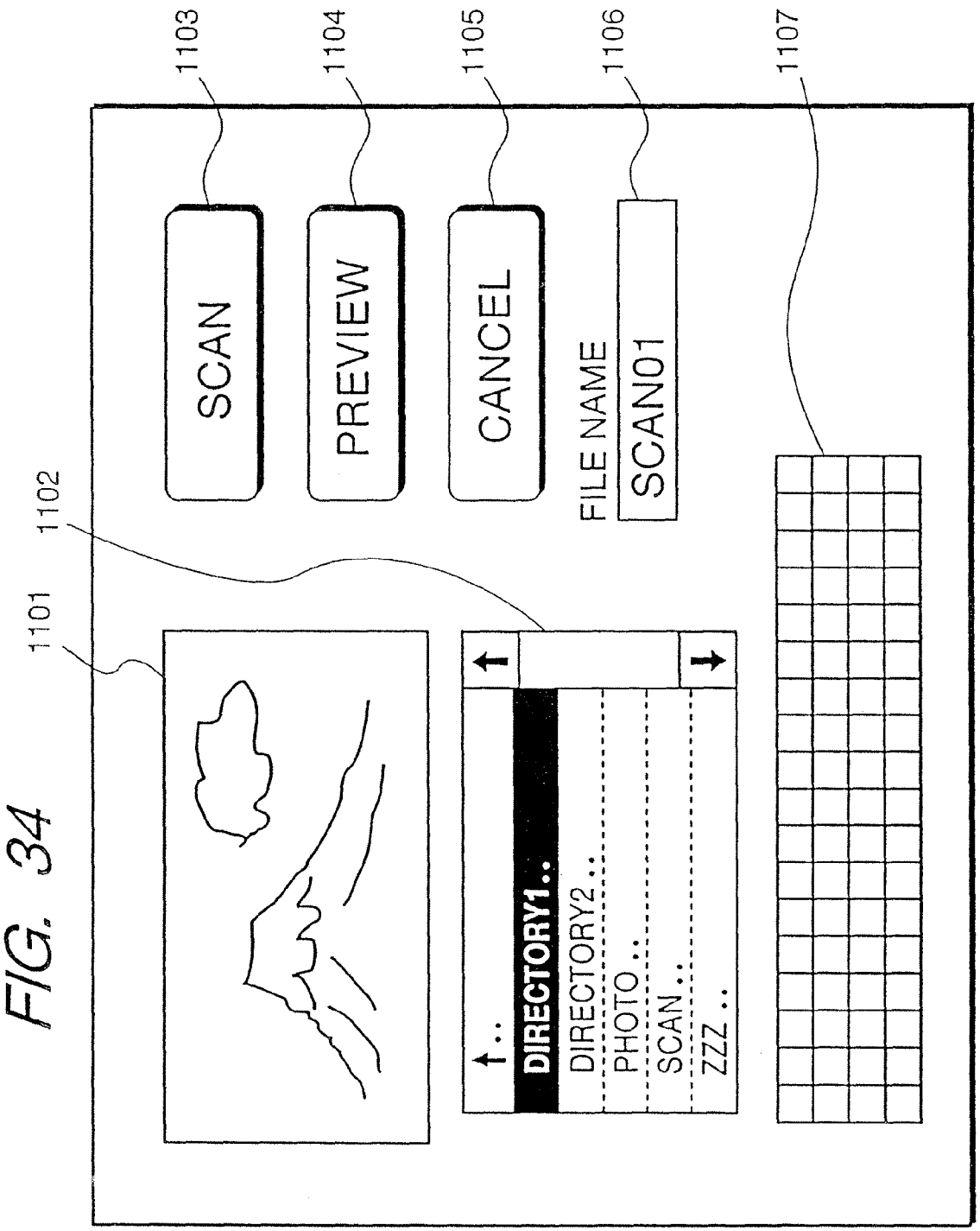
FIG. 34 is a view showing a display image in an original image reading process in the fifth embodiment.

In FIG. 34, reference numeral 1101 denotes a preview frame for displaying an image of a read original, reference numeral 1102 denotes a list of directories managed by the accessed computer, reference numeral 1103 denotes a scan button which is used for transferring read image data to the accessed computer, reference numeral 1104 denotes a preview button which is used for displaying the read image in the preview frame, reference numeral 1105 denotes a cancel button which is used for returning the image plane to that shown in FIG. 30 which is used to select the computer, reference numeral 1106 denotes a file name display frame for displaying an input file name, and reference numeral 1107 denotes a character palette which is used for inputting a character and the like.

When the original is placed on the original support plate and the preview button 1104 is depressed in the step S1008, the original placed on the original support plate is read by the scanner 315 in a step S1009. Then, read image data is stored in the image memory 313 in a step S1010 and is displayed on the preview frame 1101 in a step S1011. In a step S1012, if necessary, two points on the preview frame 1101 are designated for trimming a rectangular area of which a diagonal line is defined by the designated two points. In this case, address information of the designated or selected area is stored in the RAM 303. In a step S1013, the directory in which the read image data is to be stored is selected by depressing its position in the directory list 1102. Subsequently, the file name used for storing the read image data into the computer is selected from the character palette 1107. The file name input from the character palette 1107 is displayed on the file name display frame 1106 to be able to be confirmed by the user. After these designations and selections terminate, when the scan button 1103 is depressed in a step S1014, the area of the read image data selected in the step S1012 is read from the image memory 313 on the basis of the stored address information, and the read area as well as the input file name is transferred to the accessed computer and stored in the selected directory within a memory of the computer in steps S1015 and S1016.

It will be explained hereinafter a case where the control button 503 is depressed in the step S311 of FIG. 26.

Figure 35:
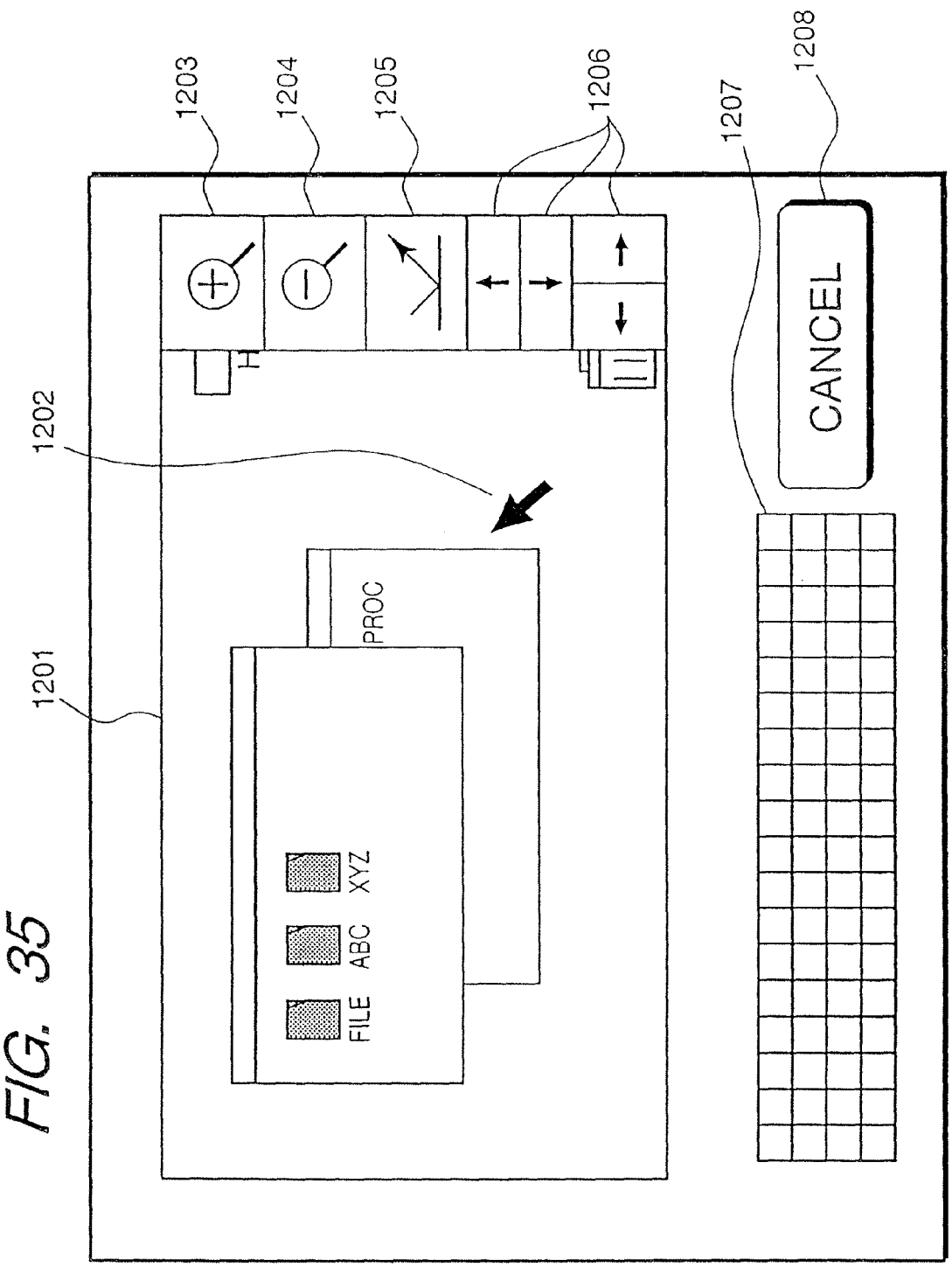
FIG. 35 is a view showing a display image at computer control in the copying apparatus 300 of the fifth embodiment.

When the control button 503 is depressed in the step S311 of FIG. 26, the operation image plane of the LCD 309 is changed or switched to the image plane which is used for selecting the computer shown in FIG. 30. The method for selecting the computer is the same as that in the selection operation already explained in the steps S501 to S505 and the steps S1001 to S1005, whereby the detailed explanation thereof is omitted. After the connection is established with the computer by the above method, the LCD 309 switches its displayed image plane to that shown in FIG. 35. In FIG. 35, reference numeral 1201 denotes a computer image plane display frame, reference numeral 1202 denotes an image on the computer, reference numeral 1203 denotes an enlargement icon, reference numeral 1204 denotes a reduction icon, reference numeral 1205 denotes a mouse crick icon, reference numeral 1206 denotes an image plane scroll cursor icon, reference numeral 1207 denotes a character palette used for inputting a character, and reference numeral 1208 denotes a cancel button used for returning the image plane to that shown in FIG. 30.

In FIG. 35, the contents same as those of the image displayed on the image plane of the connected computer are displayed on the computer image plane display frame 1202. However, since a size of the display device of the computer is generally larger than a size of the display device of the copy machine 300, the image to be displayed on the computer image plane display frame 1201 is limited to a part of the image originally displayed by the computer. In order to display other parts which are not essentially displayed on the computer image plane display frame 1201, the user may shift such the not-displayed parts to be within the frame with scrolling the image by the depressing of the image scroll icon 1206. If the user wishes to see the entire image, he may depress the reduction icon 1204 to perform the reduced displaying of the image. Further, if the user wishes to see the detailed portion of the image, he may depress the enlargement icon 1203 to perform the enlarged displaying of the image. In order to use from the copy machine 300 side a pointing device such as a mouse or the like at the computer side, a mouse cursor position can be indicated from the image input device by depressing the inside portion of the computer image plane display frame 1201, and also a mouse crick can be input by using the mouse crick icon 1205. If it is necessary to input the character on the computer, such the character can be input from the character palette 1207. All of these operations which are to change the displaying of the images and perform the character inputs are performed by the CPU 308. That is, the CPU 308 detects the user's operations for the touch panel 311 on the LCD 309 and judges the user's objective operation on the basis of the coordinate values on the touch panel 311.

Figure 36:
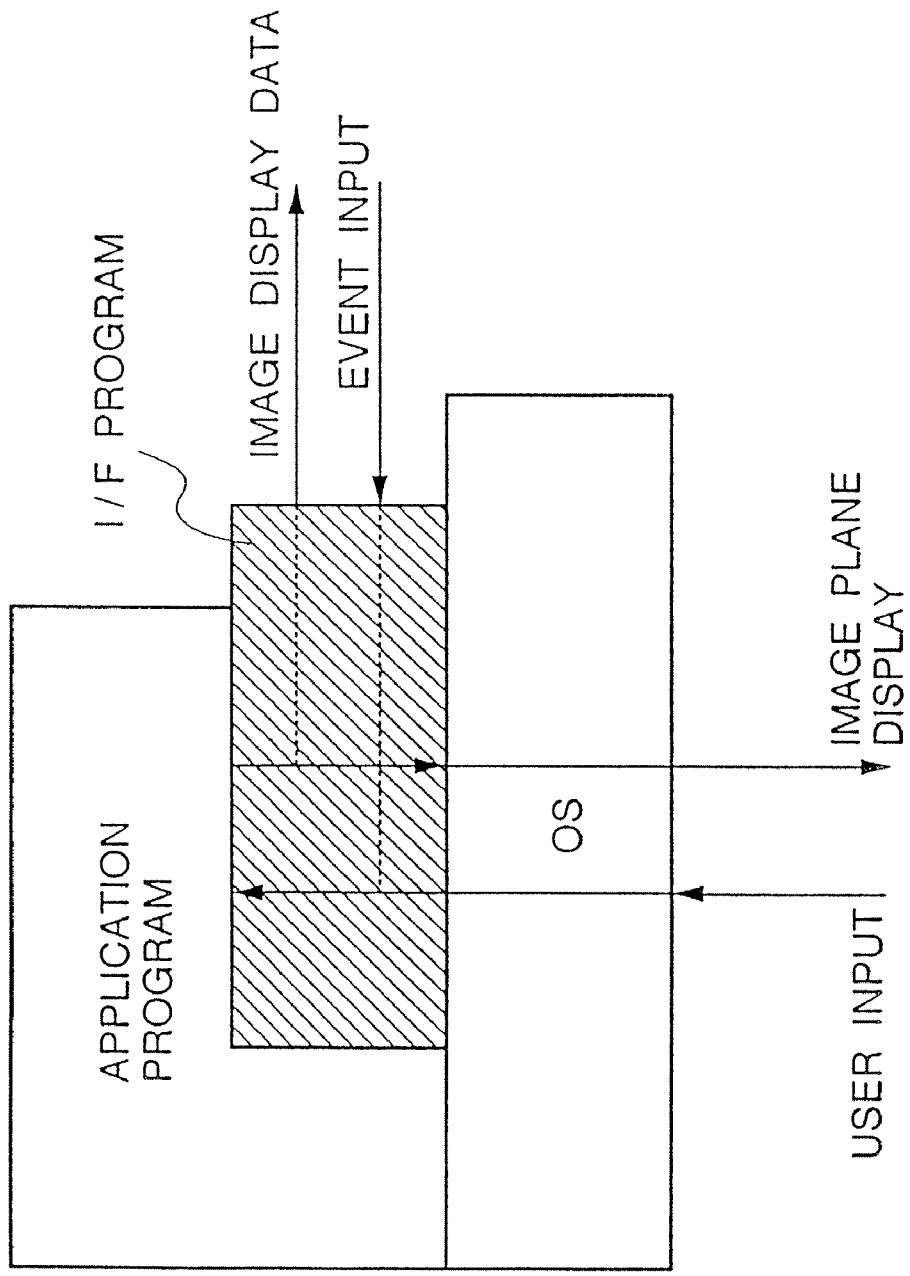
FIG. 36 is a view showing the configuration of an interface program of the computer with the copying apparatus 300 in the fifth embodiment.

In a software construction at the computer side, as shown in FIG. 36, there is an interface program for the copy machine 300 between an operating system (OS) and an application program. In a case where the application program transfers the image data to be drawn on the image plane to the OS, the interface program has a function to transfer the same image data to the copy machine 300, and also has a function to input the input operations such as the mouse input and the key input to the application program as well as an event input from the OS.

When the copy machine 300 side receives the image displayed on the computer, the copy machine 300 zooms the received image at a predetermined magnification such that the image can be displayed at a size suitable for the computer image plane display frame 1201. When the enlargement process, the reduction process or the scroll process is instructed by the user, the copy machine 300 converts a base displaying form into a new displaying form and then performs the displaying on the image plane display frame 1201. When the position within the computer image plane display frame 1201 is depressed by the user, the copy machine 300 calculates a relative position with respect to the image presently displayed on the computer and notifies the calculated position to the computer side. At the computer side, the interface program inputs the shift event of mouse cursor to the application program on the basis of the notified coordinate position, to inform the user's operation sent from the copy machine 300. This operation is the same as that with respect to a mouse crick.

It will be explained hereinafter a case where the operation is controlled by using a detachable storage medium such as a PC card, a floppy disk or the like.

In this case, when the connection is to be established with the computer, the PC card or the floppy disk of which contents have previously been set is used. When the remote key is depressed from the operation key 312 in a state where the PC card or the floppy disk is not inserted, it is displayed on the LCD 309 a message for urging the user to insert the PC card or the floppy disk which acts as a key. Then, when the user inserts the PC card or the floppy disk, the CPU 301 confirms the insertion of the storage medium and then accesses the inserted medium to fetch the computer information to be accesses. The computer information includes an address of the computer, as well as an identification code, a password or the like of the user who owns the PC card or the floppy disk. The copy machine 300 comes to be able to establish the connection with the computer by using such the information. The information concerning the plurality of connection destinations can be stored in the same medium as the computer information. When the CPU 301 confirms the storing of the plurality of connection destination information, the CPU 301 provides to the user the list of the connectable computers and requests the user to select the connection destination from among the computers in the list.

On the other hand, the information concerning the computer may not previously be stored in the PC card or the floppy disk, but only the user's information such as the user's identification code, the password and the like may previously be stored in the PC card or the floppy disk. In this case, the PC card or the floppy disk is inserted into the copy machine 300, and then the copy machine 300 specifies the user on the basis of the user's information. Thereafter, when the connection with the computer can be established in the step S505 of FIG. 28 and the step S1005 of FIG. 33, the computer information may be stored in the PC card or the floppy disk in correspondence with the user's information. Further, by referring the past access information of the user in the computer selecting procedure shown in FIG. 37, the list of the computers from among the computers to which the user had accessed can be formed in a designated form, to be presented.

When, the connection destination is designated by the user or there is essentially one connection destination, the CPU 301 intends to connect with the computer via the external interface 318. When the connection is established, the following procedure is the same as that explained above, so that the detailed explanation thereof is omitted. After the connection with the computer is established in the above manner, as explained above, the file in the computer is printed or the computer is operated by the copy machine 300.

Personal information of the computer and the user can be written into the PC card or the floppy disk used in the embodiment, in a manner explained as follows. That is, the user inserts the PC card or the floppy disk into the computer which is ordinarily used by him, and writes his own network connection password into the PC card or the floppy disk by using a data writing program, so that the PC card or the floppy disk to be used as the key in the copy machine 300 can be formed.

As the PC card or the floppy disk used in the embodiment, it can be utilized any medium which can store the computer connection information and is portable by the user. For example, a magnetic card, an IC card, an optical card can be utilized as the storage medium. Further, even a portable terminal can be utilized if an interface specifically used for the portable terminal is provided in the copy machine 300.

In a case where the computer is being accessed in the above manner, in addition to the previously-explained access releasing method, if the PC card 305 or the floppy disk 319 is released from the copy machine 300, the CPU 301 detects it and operates to release the access to the computer.

According to the above-mentioned copy machine 300, the desired computer can be accessed from the copy machine 300 side, and the image data of the file managed by the accessed computer can be fetched to be printed out. Further, since the printing can be performed after the preview operation, it can effectively be prevented that erroneous image data is printed out. Furthermore, since the accessing to the computer is allowed by inputting the password or inserting the storage medium including the password, a user's secret can effectively be protected. Furthermore, the accessing to the computer can immediately be released by the user's instruction.

Further, even if the user forgets to instruct the releasing of the accessing, the accessing can automatically be released by means of a predetermined timer. Therefore, since it can effectively be prevented that the computer accessing state is undesirably maintained due to the user's error, the user's secret can effectively be protected.

Furthermore, since the infrared ray sensor detects that there is no user nearby the copy machine, the accessing can automatically be released.

Furthermore, in the case where the accessing to the computer is performed by using the storage medium which stores the connection information, since the storage medium can be considered as the key, the accessing can be released by removing the storage medium (i.e., the key), so that the user's secret can effectively be protected.

Furthermore, the operation can be performed by selecting either one of the slave mode and the master mode, if necessary.

Furthermore, since the original can be read in response to the instruction from the copy machine 300 and then transferred, the read image data can effectively be stored in the desired computer. In this case, the file name can be input in the desired computer in response to the instruction from the copy machine 300.

Furthermore, the desired computer operation can be performed from the copy machine 300.

Furthermore, in the case where the desired computer is accessed from the copy machine 300 side, the user can easily select the computer which is often utilized by him, by providing to the user the list of the limited computers which has been past accessed by the user.

Furthermore, in the case where the computer is accessed by using the storage medium which stores the user's information, the user can easily select the computer by providing based on the user's information in the storage medium to the user the list of the computers which are to be exclusively accessed by such the user.

Furthermore, the data representing the program for controlling the above-mentioned operations can be stored in the detachable storage medium such as a magneto-optical disk or the like, and then the stored data can be read to be applied to other controllable devices.

As explained in the foregoing, the present invention enables efficient process in case of connecting a copying apparatus, a facsimile apparatus etc. to a network such as LAN and reading the image with a scanner.

In the foregoing description, the original image is read with the scanner of the copying apparatus or the facsimile apparatus, but it is naturally possible to utilize a scanner not associated with the printer but associated with an operation unit.

The present invention has been explained by the preferred embodiments thereof, but the present invention is not limited to such embodiments and is subject to various modifications within the scope and spirit of the appended claims.

What is claimed is:

1. An image reading apparatus comprising:
    a reading unit, adapted to read an image and to generate image data corresponding to the image;
    a connecting unit, adapted to connect said image reading apparatus to a network connectable to a plurality of external devices;
    a checking unit, adapted to check, in a case where a processing for outputting the image data generated by said reading unit is selected, whether each of the plurality of external devices to which the image data from the reading unit may be output exists on the network currently, the checking by the checking unit being performed before the reading unit reads the image;
    a display unit, adapted to identify which of the plurality of external devices have been checked as currently existing on the network and to display the identified external device(s);
    a selecting unit, adapted to select an external device from among the external device(s) displayed by said display unit; and
    an outputting unit, adapted to output the image data from said reading unit to the external device selected by said selecting unit.

2. The apparatus according to claim 1, further comprising a directory designating unit adapted to designate a directory for storing the image data in the selected external device,
    wherein said output unit outputs the image data from said reading unit with a directory name representing the designated directory designated by said directory designating unit.

3. The apparatus according to claim 1, further comprising a setting unit adapted to set a file name to the image data generated by said reading unit,
    wherein said output unit outputs the image data with the file name set by said setting unit.

4. The apparatus according to claim 3, wherein said setting unit sets the file name based on a default setting or a manipulation by a user.

5. The apparatus according to claim 1, wherein said display unit displays a name of the external device(s) in accordance with name information obtained from a predetermined computer on the network.

6. The apparatus according to claim 1, wherein said display unit displays size information of the image data to be output by said output unit.

7. The apparatus according to claim 6, wherein said display unit displays the size information based on a format of the image data.

8. A controlling method of an image reading apparatus connectable to a network, to which a plurality of external devices also are connectable, said method comprising:
    reading an image and generating image data corresponding to the image;
    checking, in a case where a processing for outputting the generated image data is selected, whether each of the plurality of external devices to which the generated image data may be output exists on the network currently, the checking being performed before the image is read;
    identifying which of the plurality of external devices have been checked as currently existing on the network and displaying the identified external device(s);
    selecting an external device from among the displayed external device(s); and
    outputting the generated image data to the selected external device.

9. A computer readable program stored in a storage medium, comprising:
    reading an image and generating image data corresponding to the image;
    checking, in a case where a processing for outputting the generated image data is selected, whether each of a plurality of external devices to which the generated image data may be output exists on a network currently, the checking being performed before the image is read;
    identifying which of the plurality of external devices have been checked as currently existing on the network and displaying the identified external device(s);
    selecting an external device from among the displayed external device(s); and
    outputting the generated image data to the selected external device.

* * * * *